(12) United States Patent
Kim et al.

(10) Patent No.: US 12,273,945 B2
(45) Date of Patent: *Apr. 8, 2025

(54) METHOD FOR PERFORMING MULTI-LINK COMMUNICATION IN WIRELESS COMMUNICATION SYSTEM

(71) Applicant: LG ELECTRONICS INC., Seoul (KR)

(72) Inventors: Namyeong Kim, Seoul (KR); Jeongki Kim, Seoul (KR); Jinsoo Choi, Seoul (KR); Sungjin Park, Seoul (KR); Taewon Song, Seoul (KR); Insun Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 274 days.

This patent is subject to a terminal disclaimer.

(21) Appl. No.: 17/908,794

(22) PCT Filed: Mar. 4, 2021

(86) PCT No.: PCT/KR2021/002686
§ 371 (c)(1),
(2) Date: Sep. 29, 2022

(87) PCT Pub. No.: WO2021/177749
PCT Pub. Date: Sep. 10, 2021

(65) Prior Publication Data
US 2023/0103810 A1    Apr. 6, 2023

(30) Foreign Application Priority Data

Mar. 4, 2020    (KR) .................. 10-2020-0027396
Jun. 22, 2020   (KR) .................. 10-2020-0076004

(51) Int. Cl.
*H04W 76/15*    (2018.01)
*H04W 36/00*    (2009.01)
(Continued)

(52) U.S. Cl.
CPC ..... *H04W 76/15* (2018.02); *H04W 36/00692* (2023.05); *H04W 36/08* (2013.01); *H04W 84/12* (2013.01)

(58) Field of Classification Search
CPC .......... H04W 76/15; H04W 36/00692; H04W 36/08; H04W 84/12; H04W 12/041;
(Continued)

(56) References Cited

U.S. PATENT DOCUMENTS 11,596,021 B2    2/2023  Cariou et al.
2018/0278697 A1  9/2018  Cariou et al.
(Continued)

FOREIGN PATENT DOCUMENTS

CN    106105275 A    11/2016
CN    108141876 A     6/2018
(Continued)

OTHER PUBLICATIONS

Li et al., "Multi-link Assocation", doc.: IEEE 802.11-19/1549r5, dated Sep. 5, 2019.
(Continued)

*Primary Examiner* — Will W Lin
(74) *Attorney, Agent, or Firm* — BRYAN CAVE LEIGHTON PAISNER LLP

(57) ABSTRACT

According to various embodiments, a multi-link device (MLD) operating in a plurality of links including a first link can transmit a request frame to a first AP of an AP MLD through a first STA (station), wherein the request frame includes an information field for requesting every element included in an element set designated for a second link. The
(Continued)

MLD can, on the basis of the request frame, receive every element included in the element set designated for the second link.

16 Claims, 44 Drawing Sheets

(51) Int. Cl.
  *H04W 36/08* (2009.01)
  *H04W 84/12* (2009.01)
(58) Field of Classification Search
  CPC . H04W 12/06; H04W 28/0247; H04W 88/10; H04W 28/08; H04W 76/19
  See application file for complete search history.

(56) References Cited

U.S. PATENT DOCUMENTS

| | | |
|---|---|---|
| 2019/0158385 A1 | 5/2019 | Patil et al. |
| 2019/0268956 A1 | 8/2019 | Xiao et al. |
| 2019/0335454 A1* | 10/2019 | Huang ................ H04W 72/542 |
| 2020/0021400 A1 | 1/2020 | Cherian et al. |
| 2020/0037288 A1 | 1/2020 | Huang et al. |
| 2021/0068171 A1 | 3/2021 | Hsu et al. |
| 2021/0144698 A1* | 5/2021 | Kwon .................... H04W 76/14 |
| 2022/0408506 A1* | 12/2022 | Kim ...................... H04W 28/20 |

FOREIGN PATENT DOCUMENTS

| | | |
|---|---|---|
| CN | 109890053 A | 6/2019 |
| JP | 2007067700 A | 3/2007 |
| JP | 2019508979 A | 3/2019 |
| KR | 102054189 | 12/2019 |
| WO | 2017/152421 A1 | 9/2017 |
| WO | 2019/099268 A1 | 5/2019 |
| WO | 2020/032664 A1 | 2/2020 |
| WO | 2020/040587 A1 | 2/2020 |

OTHER PUBLICATIONS

Kim et al., "MLO: Information Exchange for Link switching", doc,: IEEE 802.11-20/0411r0, dated Mar. 16, 2020.
Sharan Naribole (Samsung), "Multi-link Channel Access Follow-up", IEEE 802.11-19/1836r4, Nov. 11, 2019.
Cheng Chen (Intel), "Multi-link Policy Framework", IEEE 802.11-19/1932r1, Nov. 11, 2019.
Guogang Huang (Huawei), "Multi-link Association Follow up", IEEE 802.11-20/0030r2, Jan. 10, 2020.
Jason Yuchen Guo (Huawei), "Multi-Link Probe Request Design", IEEE 802.11-20/1396r1, Sep. 14, 2020.
Huang, Guogang et al., Multi-link Association Follow up. doc.: IEEE 802.11-20/0030r0, Jan. 11, 2020, see slides 4-6.
Patil, Abhishek et al., Multi-Link Operation: Design Discussion. doc.: IEEE 802.11-19/0823r2, Sep. 7, 2019, see slide 7.
Cariou, "CR for 6GHz—Discovery", IEEE 802.11-18/1227r3, Dec. 2024.

* cited by examiner

FIG. 1
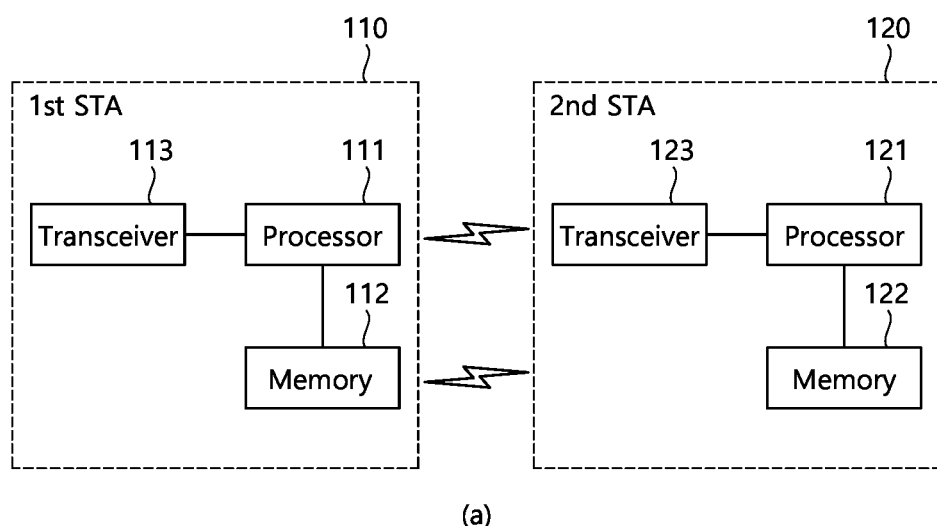
(a)
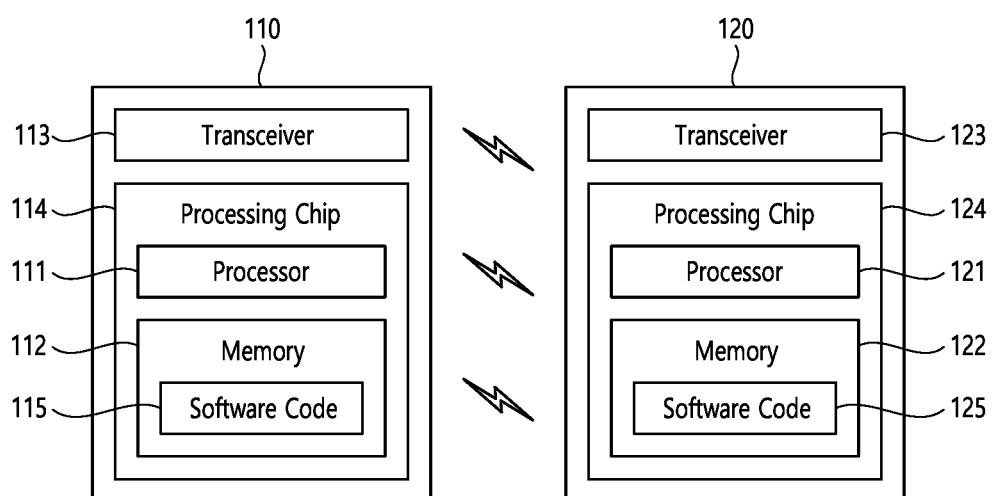
(b)

FIG. 2
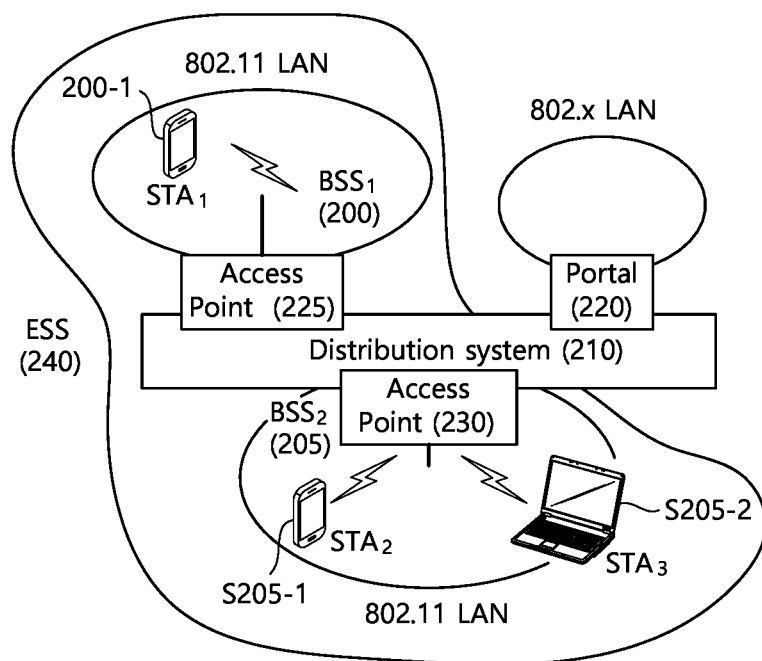
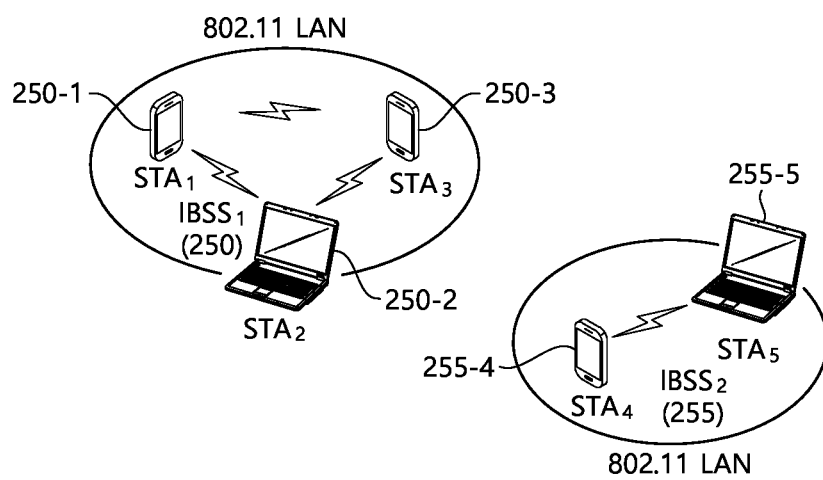

FIG. 22

| Multi-link STA | | |
|---|---|---|
| 5GHz | 6GHz | |
| STA 1 Link 1 | STA 2 Link 2 | STA 3 Link 3 |

FIG. 40

| Element ID | Length | Requested Element IDs |
|---|---|---|

Octets:      1            1            variable

FIG. 41

| Element ID | Length | Element ID Extension | Requested Element ID | Requested Element ID Extensions |
|---|---|---|---|---|
| 1 | 1 | 1 | 1 | variable |

Octets:

FIG. 42

| Element ID | Length | Probe Response Group Bitmap (optional) | Probe Response Option Bitmaps |
|---|---|---|---|
| 1 | 1 | 0 or 1 | variable |

Octets:

METHOD FOR PERFORMING MULTI-LINK COMMUNICATION IN WIRELESS COMMUNICATION SYSTEM

This application is the National Stage filing under 35 U.S.C. 371 of International Application No. PCT/KR2021/002686 filed on Mar. 4, 2021, which claims priority to Korean Patent Application Nos. 10-2020-0027396 filed on Mar. 4, 2020 and 10-2020-0076004 filed on Jun. 22, 2020, the contents of which are all hereby incorporated by reference herein in their entirety.

BACKGROUND OF THE DISCLOSURE

Field of the Disclosure

The present specification relates to a method for performing multi-link communication in a wireless local area network (WLAN) system and, most particularly, to a method for transmitting information on a link in a multi-link communication and a device for supporting the same.

Related Art

Wireless network technologies may include various types of wireless local area networks (WLANs). The WLAN employs widely used networking protocols and can be used to interconnect nearby devices together. The various technical features described herein may be applied to any communication standard, such as WiFi or, more generally, any one of the IEEE 802.11 family of wireless protocols. A wireless local area network (WLAN) has been enhanced in various ways. For example, the IEEE 802.11ax standard has proposed an enhanced communication environment by using orthogonal frequency division multiple access (OFDMA) and downlink multi-user multiple input multiple output (DL MU MIMO) schemes.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

SUMMARY OF THE DISCLOSURE

Technical Objects

In the EHT specification, in order to support high throughput and high data rate, a wide bandwidth (e.g., 160/320 MHz), 16 streams, and/or a multi-link (or multi-band) operation, and so on, may be used.

In the EHT specification, a device supporting multi-link (i.e., a multi-link device) may operate on a plurality of links. In order to switch a connected link, a multi-link device may need to receive information on another link that is not a link included in the plurality of links. Therefore, a technical characteristic enabling a multi-link device to receive information on another link that is not connected to the multi-link device may be required in the multi-link device.

Additionally, while performing communication through a first link, the multi-link device needs to receive information on at least one link among the plurality of links. Therefore, the multi-link device may require a technical characteristic enabling the multi-link device to receive information on another link.

Technical Solutions

According to various embodiments, a multi-link device (MLD) connected to a plurality of links including a first link may perform the steps of transmitting a request frame including an information field for requesting complete elements included in an element set designated for a second link to a first access point (AP) of an AP multi-link device, through a first station (STA) included in the multi-link device, wherein the first STA operates on the first link, and receiving a response frame from the first AP through the first STA, based on the request frame, wherein the response frame includes complete elements included in the element set designated for the second link.

Effects of the Disclosure

An STA included in a multi-link device may deliver information related to other STAs within the multi-link device together through one link. Therefore, overhead of frame exchange may be reduced. Additionally, link usage efficiency of the STA may be increased, and power consumption may be reduced.

Additionally, a first STA included in the multi-link device may request all information per link. For example, the first STA of the multi-link device may request all information related to a second link and may request only partial information related to a third link. Therefore, since the first STA may request all information per link, an AP multi-link device may transmit all information related to an indicated link.

BRIEF DESCRIPTION OF THE DRAWINGS

FIG. 1 shows an example of a transmitting apparatus and/or receiving apparatus of the present specification.

FIG. 2 is a conceptual view illustrating the structure of a wireless local area network (WLAN).

FIG. 22 shows an exemplary structure of a non-AP MLD.

FIG. 40 shows a detailed example of a Request element format.

FIG. 41 shows a detailed example of an Extended Request element format.

FIG. 42 shows a detailed example of a PV1 Probe Response Option element format.

DESCRIPTION OF EXEMPLARY EMBODIMENTS

Figure 3:
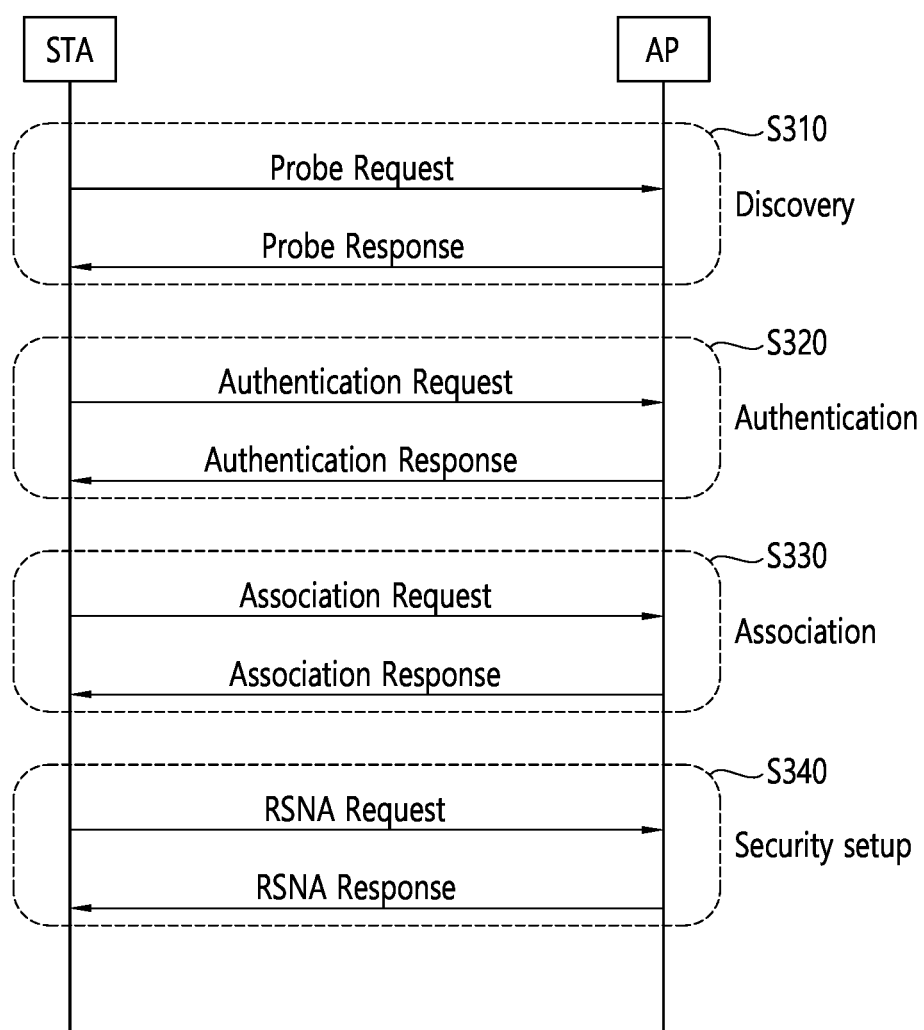
FIG. 3 illustrates a general link setup process.

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/ response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
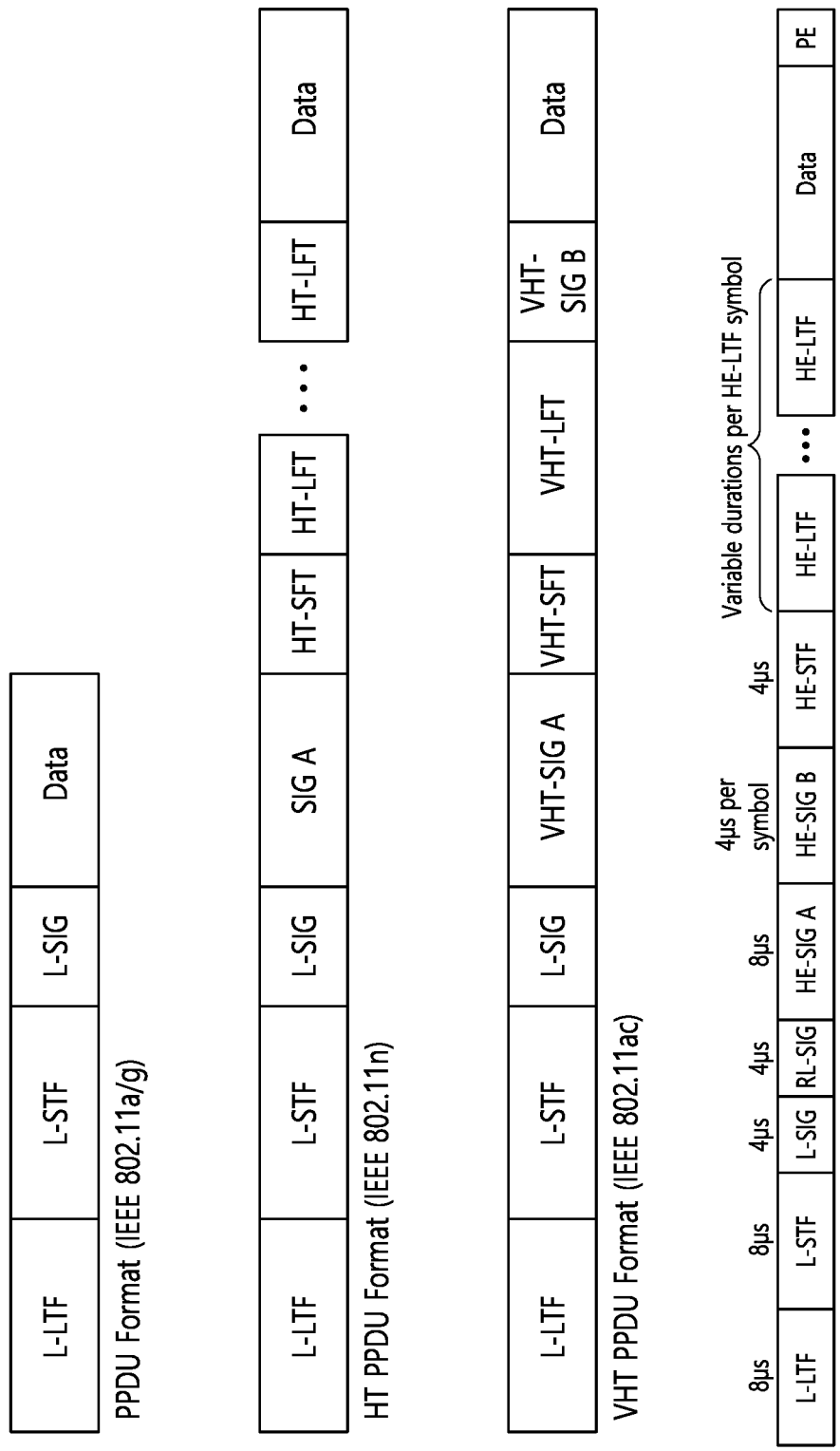
FIG. 4 illustrates an example of a PPDU used in an IEEE standard.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
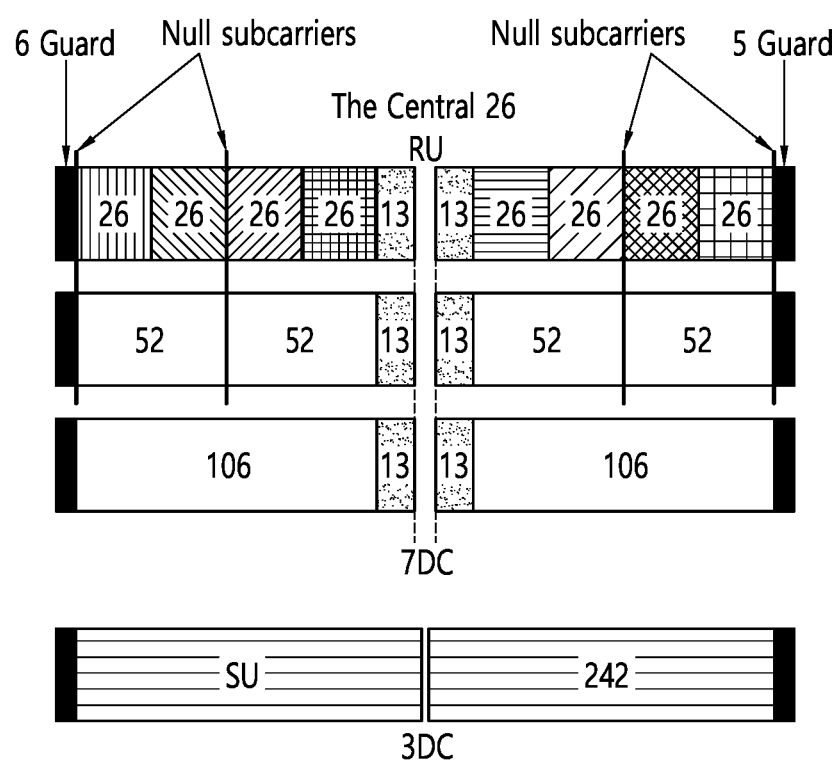
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed.

A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
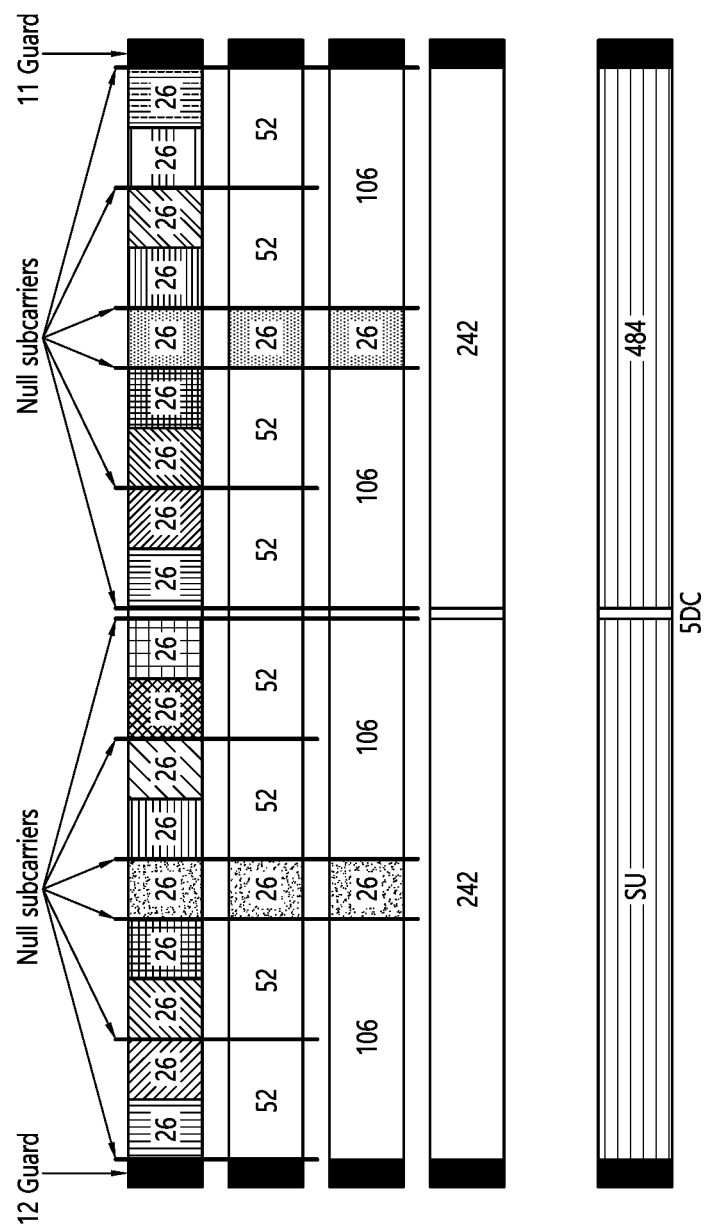
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
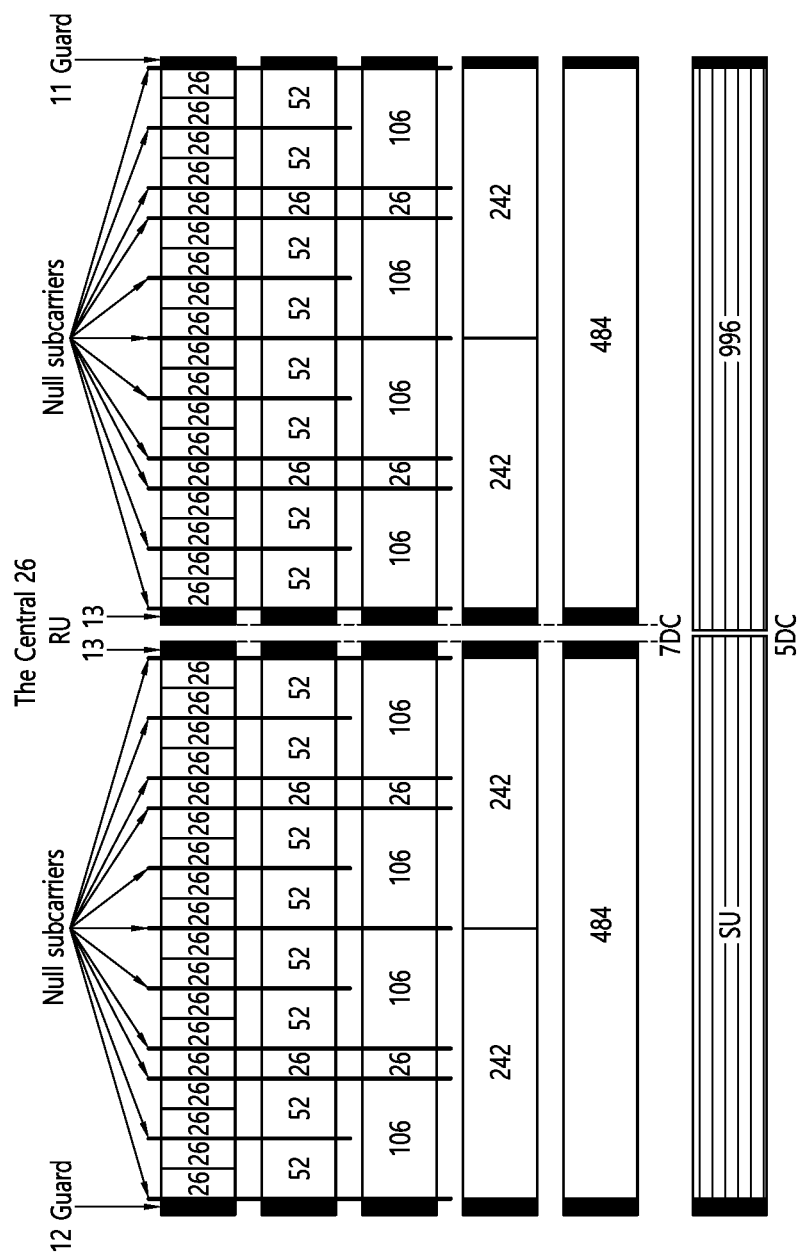
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
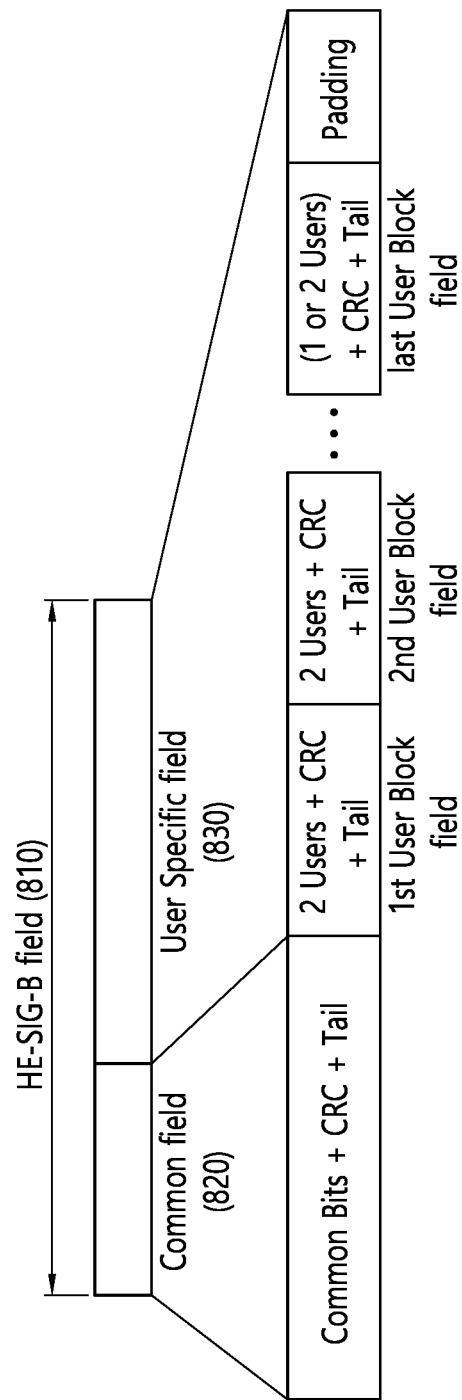
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ | | | 106 | | | 26 | 26 | 26 | 26 | 26 | 8 |
| 01001$y_2y_1y_0$ | | | 106 | | | 26 | 26 | 26 | 52 | | 8 |

"01000y2y1y0" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information ($y_2y_1y_0$). For example, when the 3-bit information ($y_2y_1y_0$) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

a result, since eight user STAs are allocated, the user-specific field 830 of HE-SIG-B may include eight user fields.

Figure 9:
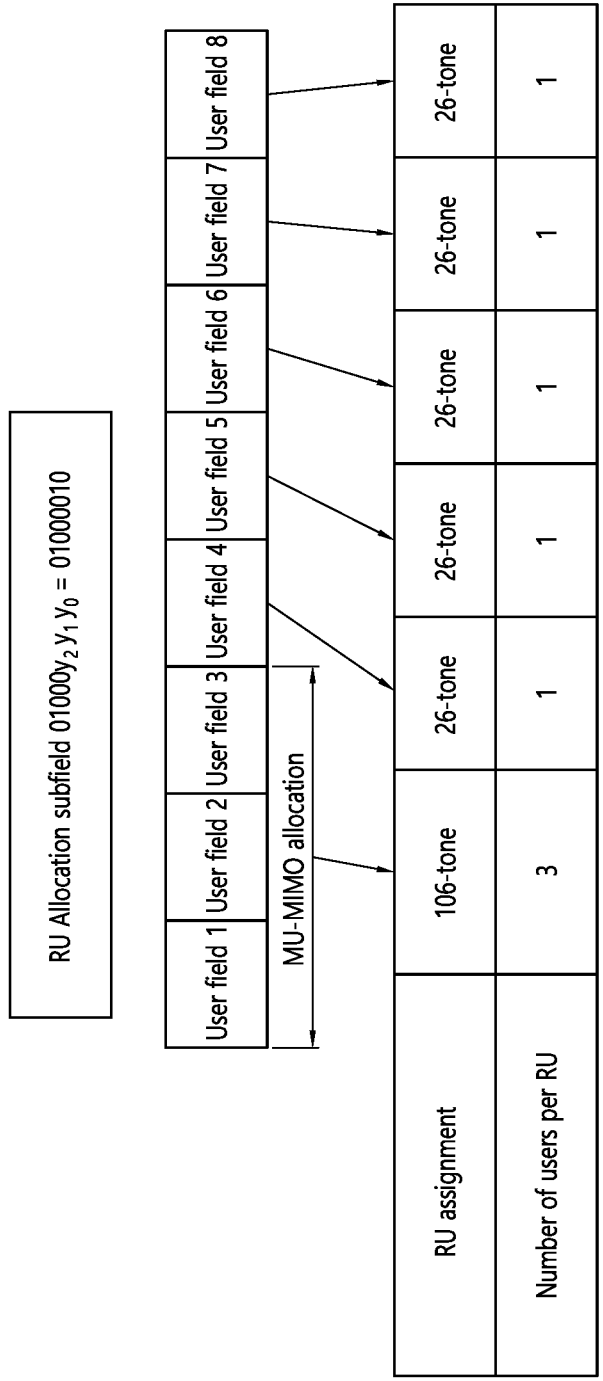
FIG. 9 illustrates an example in which a plurality of user STAs are allocated to the same RU through a MU-MIMO scheme.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

TABLE 3

| $N_{user}$ | B3 ... B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000-0011 | 1-4 | 1 | | | | | | | 2-5 | 10 |
|   | 0100-0110 | 2-4 | 2 | | | | | | | 4-6 | |
|   | 0111-1000 | 3-4 | 3 | | | | | | | 6-7 | |
|   | 1001 | 4 | 4 | | | | | | | 8 | |
| 3 | 0000-0011 | 1-4 | 1 | 1 | | | | | | 3-6 | 13 |
|   | 0100-0110 | 2-4 | 2 | 1 | | | | | | 5-7 | |
|   | 0111-1000 | 3-4 | 3 | 1 | | | | | | 7-8 | |
|   | 1001-1011 | 2-4 | 2 | 2 | | | | | | 6-8 | |
|   | 1100 | 3 | 3 | 2 | | | | | | 8 | |
| 4 | 0000-0011 | 1-4 | 1 | 1 | 1 | | | | | 4-7 | 11 |
|   | 0100-0110 | 2-4 | 2 | 1 | 1 | | | | | 6-8 | |
|   | 0111 | 3 | 3 | 1 | 1 | | | | | 8 | |
|   | 1000-1001 | 2-3 | 2 | 2 | 1 | | | | | 7-8 | |
|   | 1010 | 2 | 2 | 2 | 2 | | | | | 8 | |

TABLE 4

| $N_{user}$ | B3 ... B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
|   | 0100-0101 | 2-3 | 2 | 1 | 1 | 1 | | | | 7-8 | |
|   | 0110 | 2 | 2 | 2 | 1 | 1 | | | | 8 | |
| 6 | 0000-0010 | 1-3 | 1 | 1 | 1 | 1 | 1 | | | 6-8 | 4 |
|   | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N_user is set to "3". Therefore, values of N_STS[1], N_STS[2], and N_STS [3] may be determined as shown in Table 3. For example, when a value of the second bit (B11-B14) is "0011", it may be set to N_STS[1]=4, N_STS[2]=1, N_STS[3]=1. That is, in the example of FIG. 9, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., 1/2, 2/3, 3/4, 5/6e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
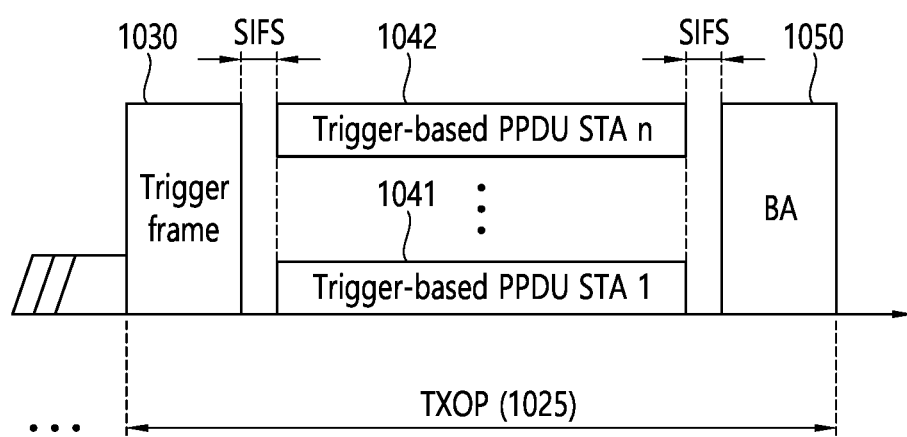
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
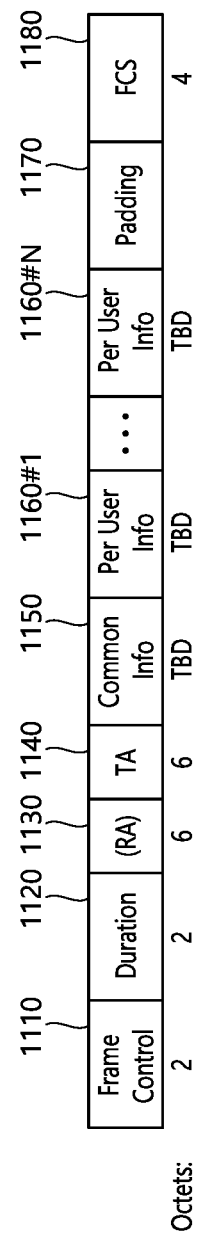
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160 #1 to 1160 #N shown in FIG. 11 may include a plurality of subfields.

Figure 12:
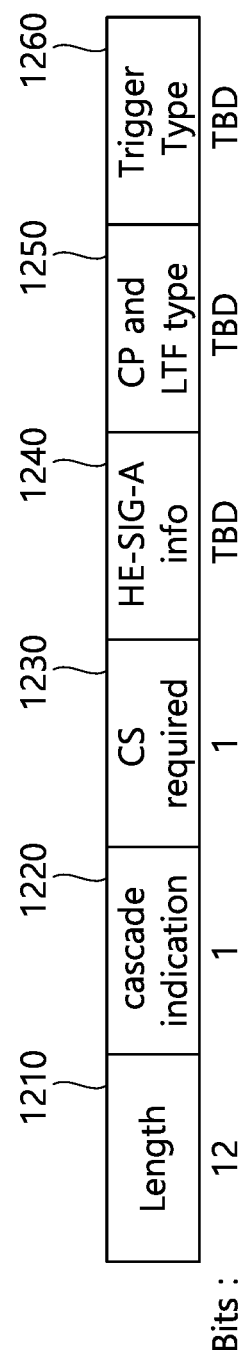
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
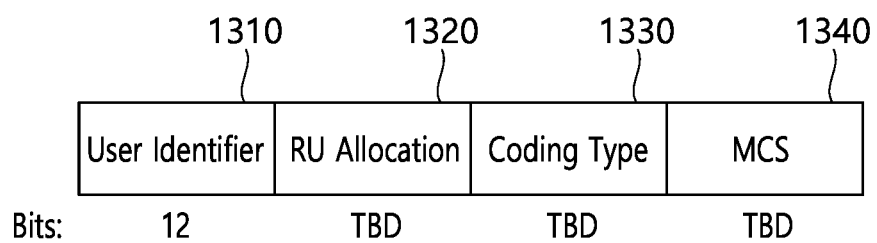
FIG. 13 illustrates an example of a subfield included in a per user information field.

FIG. 13 illustrates an example of a subfield included in a per user information field. A user information field 1300 of FIG. 13 may be understood as any one of the per user information fields 1160 #1 to 1160 #N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
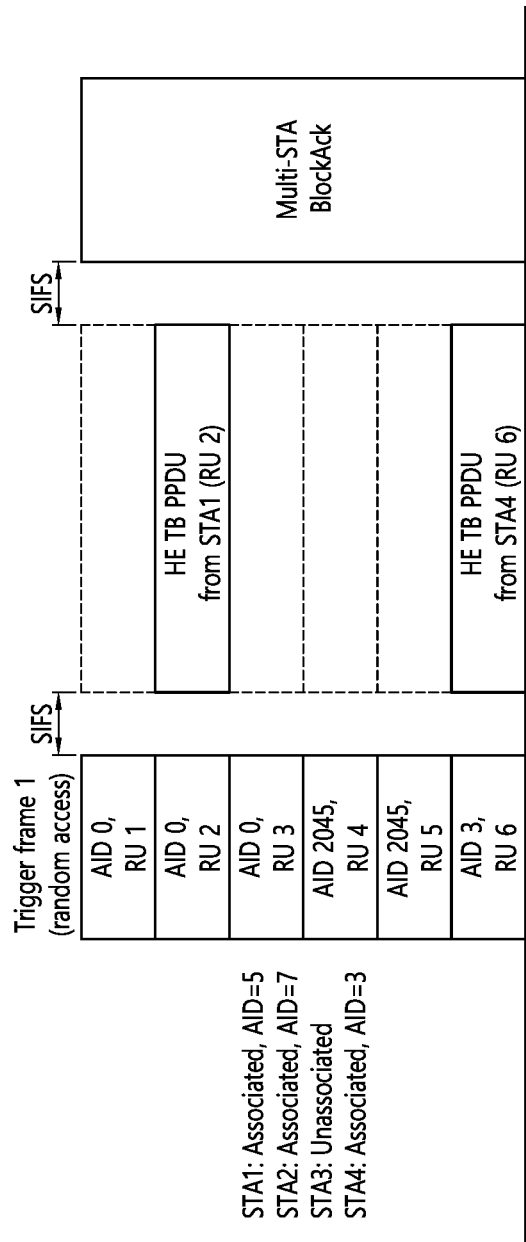
FIG. 14 describes a technical feature of the UORA scheme.

FIG. 14 describes a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
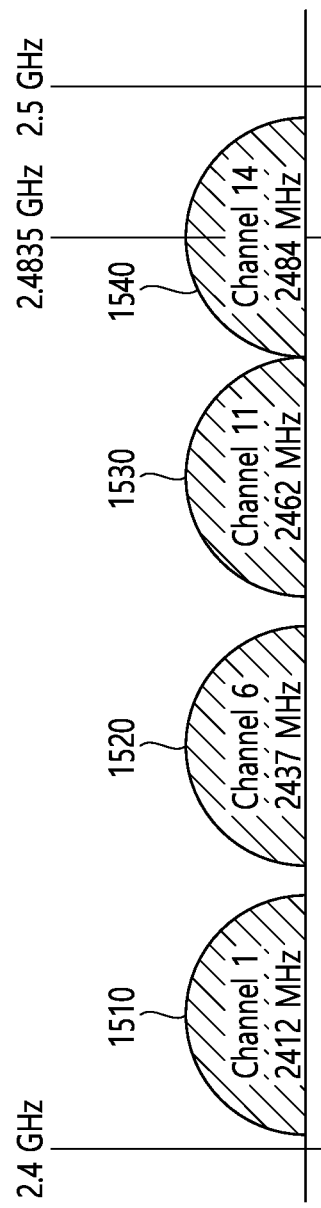
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
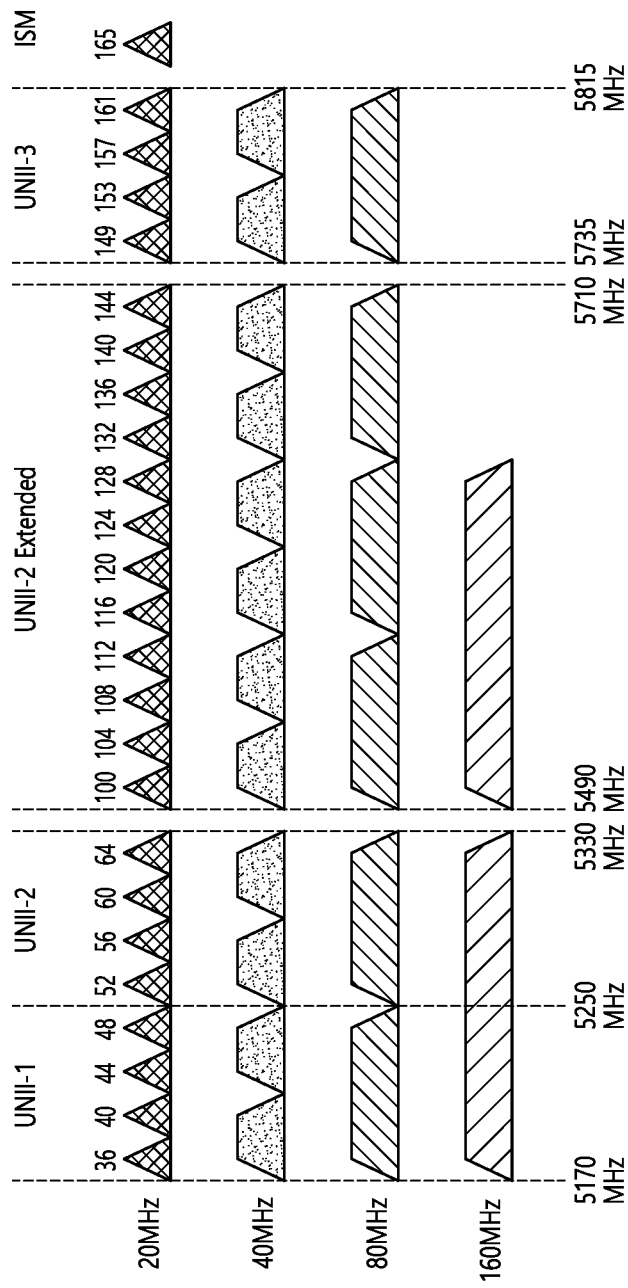
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
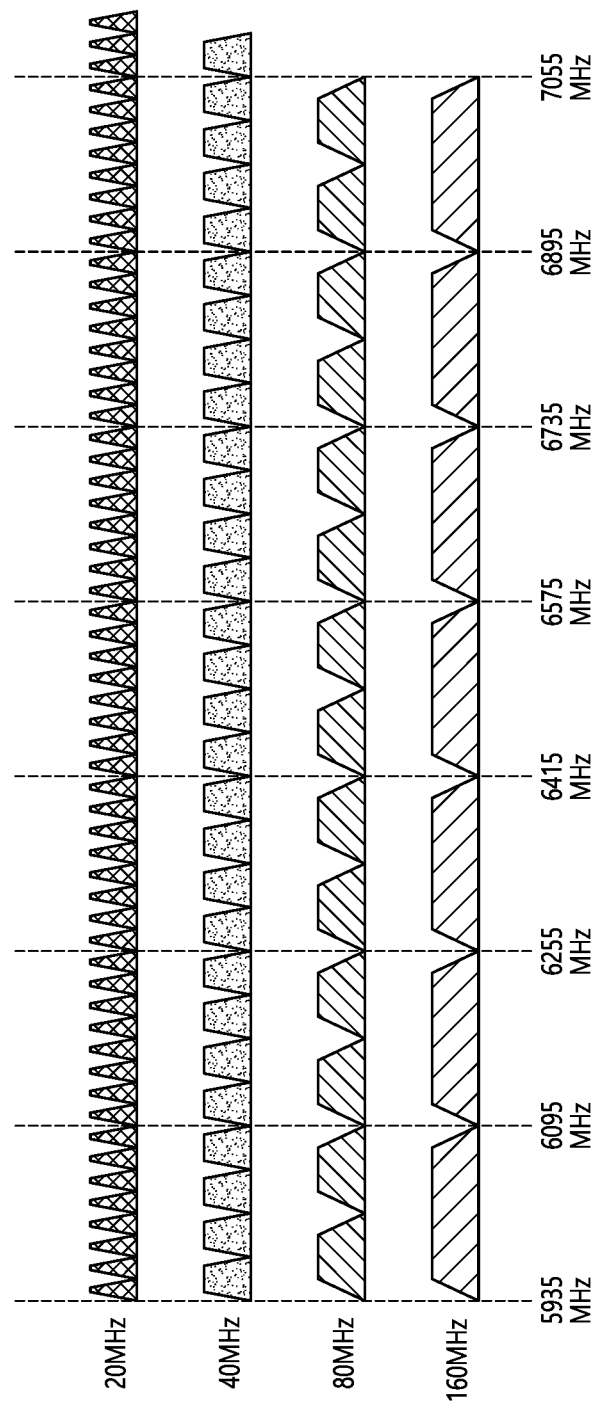
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N)GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

Figure 18:
FIG. 18 illustrates an example of a PPDU used in the present specification.

FIG. 18 illustrates an example of a PPDU used in the present specification.

The PPDU of FIG. 18 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 18 may indicate the entirety or part of a PPDU type used in the EHT system. For example, the example of FIG. 18 may be used for both of a single-user (SU) mode and a multi-user (MU) mode. In other words, the PPDU of FIG. 18 may be a PPDU for one receiving STA or a plurality of receiving STAs. When the PPDU of FIG. 18 is used for a trigger-based (TB) mode, the EHT-SIG of FIG. 18 may be omitted. In other words, a STA which has received a trigger frame for uplink-MU (UL-MU) may transmit the PPDU in which the EHT-SIG is omitted in the example of FIG. 18.

In FIG. 18, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 18 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 18, the L-LTE and the L-STF may be the same as those in the conventional fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier{subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index{−28, −27, +27, +28}. The aforementioned signal may be used for channel estimation on a frequency domain corresponding to −28, −27, +27, +281.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 18. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 us. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g., 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=1/2 to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 18. The preamble puncturing implies that puncturing is applied to part (e.g., a secondary 20 MHz band) of the full band. For example, when an 80 MHz PPDU is transmitted, a STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 18 may include control information for the receiving STA. The EHT-SIG may be transmitted through at least one symbol, and one symbol may have a length of 4 us. Information related to the number of symbols used for the EHT-SIG may be included in the U-SIG.

The EHT-SIG may include a technical feature of the HE-SIG-B described with reference to FIG. 8 and FIG. 9. For example, the EHT-SIG may include a common field and a user-specific field as in the example of FIG. 8. The common field of the EHT-SIG may be omitted, and the number of user-specific fields may be determined based on the number of users.

As in the example of FIG. 8, the common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. As in the example of FIG. 9, each user field may be related to MU-MIMO allocation, or may be related to non-MU-MIMO allocation.

As in the example of FIG. 8, the common field of the EHT-SIG may include a CRC bit and a tail bit. A length of the CRC bit may be determined as 4 bits. A length of the tail bit may be determined as 6 bits, and may be set to '000000'.

As in the example of FIG. 8, the common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1.

The example of Table 5 to Table 7 is an example of 8-bit (or N-bit) information for various RU allocations. An index shown in each table may be modified, and some entries in Table 5 to Table 7 may be omitted, and entries (not shown) may be added.

The example of Table 5 to Table 7 relates to information related to a location of an RU allocated to a 20 MHz band. For example, 'an index 0' of Table 5 may be used in a situation where nine 26-RUs are individually allocated (e.g., in a situation where nine 26-RUs shown in FIG. 5 are individually allocated).

Meanwhile, a plurality or RUs may be allocated to one STA in the EHT system. For example, regarding 'an index 60' of Table 6, one 26-RU may be allocated for one user (i.e., receiving STA) to the leftmost side of the 20 MHz band, one 26-RU and one 52-RU may be allocated to the right side thereof, and five 26-RUs may be individually allocated to the right side thereof.

TABLE 5

| Indices | #1 | #2 | #3 | #4 | #5 | #6 | #7 | #8 | #9 | Number of entries |
|---|---|---|---|---|---|---|---|---|---|---|
| 0 | 26 | 26 | 26 | 26 | 26 | 26 | 26 | 26 | 26 | 1 |
| 1 | 26 | 26 | 26 | 26 | 26 | 26 | 26 | 52 | | 1 |
| 2 | 26 | 26 | 26 | 26 | 26 | 52 | | 26 | 26 | 1 |
| 3 | 26 | 26 | 26 | 26 | 26 | 52 | | 52 | | 1 |
| 4 | 26 | 26 | | 52 | 26 | 26 | 26 | 26 | 26 | 1 |
| 5 | 26 | 26 | | 52 | 26 | 26 | 26 | 52 | | 1 |
| 6 | 26 | 26 | | 52 | 26 | 52 | | 26 | 26 | 1 |
| 7 | 26 | 26 | | 52 | 26 | 52 | | 52 | | 1 |
| 8 | | 52 | 26 | 26 | 26 | 26 | 26 | 26 | 26 | 1 |
| 9 | | 52 | 26 | 26 | 26 | 26 | 26 | 52 | | 1 |
| 10 | | 52 | 26 | 26 | 26 | 52 | | 26 | 26 | 1 |
| 11 | | 52 | 26 | 26 | 26 | 52 | | 52 | | 1 |
| 12 | | 52 | | 52 | 26 | 26 | 26 | 26 | 26 | 1 |
| 13 | | 52 | | 52 | 26 | 26 | 26 | 52 | | 1 |
| 14 | | 52 | | 52 | 26 | 52 | | 26 | 26 | 1 |
| 15 | | 52 | | 52 | 26 | 52 | | 52 | | 1 |
| 16 | 26 | 26 | 26 | 26 | 26 | | 106 | | | 1 |
| 17 | 26 | 26 | | 52 | 26 | | 106 | | | 1 |
| 18 | | 52 | 26 | 26 | 26 | | 106 | | | 1 |
| 19 | | 52 | | 52 | 26 | | 106 | | | 1 |

TABLE 6

| Indices | #1 | #2 | #3 | #4 | #5 | #6 | #7 | #8 | #9 | Number of entries |
|---|---|---|---|---|---|---|---|---|---|---|
| 20 | | 106 | | | 26 | 26 | 26 | 26 | 26 | 1 |
| 21 | | 106 | | | 26 | 26 | 26 | 52 | | 1 |
| 22 | | 106 | | | 26 | 52 | | 26 | 26 | 1 |
| 23 | | 106 | | | 26 | 52 | | 52 | | 1 |
| 24 | 52 | | 52 | | — | | 52 | 52 | | 1 |
| 25 | 242-tone RU empty (with zero users) | | | | | | | | | 1 |
| 26 | | 106 | | | 26 | | 106 | | | 1 |
| 27-34 | | | | | 242 | | | | | 8 |
| 35-42 | | | | | 484 | | | | | 8 |
| 43-50 | | | | | 996 | | | | | 8 |
| 51-58 | | | | | 2*996 | | | | | 8 |
| 59 | 26 | 26 | 26 | 26 | 26 | | 52 + 26 | | 26 | 1 |
| 60 | 26 | | 26 + 52 | | 26 | 26 | 26 | 26 | 26 | 1 |
| 61 | 26 | | 26 + 52 | | 26 | 26 | 26 | 52 | | 1 |
| 62 | 26 | | 26 + 52 | | 26 | 52 | | 26 | 26 | 1 |
| 63 | 26 | 26 | | 52 | 26 | | 52 + 26 | | 26 | 1 |
| 64 | 26 | | 26 + 52 | | 26 | | 52 + 26 | | 26 | 1 |
| 65 | 26 | | 26 + 52 | | 26 | 52 | | 52 | | 1 |

TABLE 7

| 66 | 52 | | 26 | 26 | 26 | | 52 + 26 | | 26 | 1 |
|---|---|---|---|---|---|---|---|---|---|---|
| 67 | 52 | | | 52 | 26 | | 52 + 26 | | 26 | 1 |
| 68 | 52 | | | 52 + 26 | | 52 | | 52 | | 1 |
| 69 | 26 | 26 | 26 | 26 | | 26 + 106 | | | | 1 |

TABLE 7-continued

| 70 | 26 |    | 26 + 52 | 26 | 106      |    |    |    | 1 |
|----|----|----|---------|----|----------|----|----|----|---|
| 71 | 26 | 26 | 52      |    | 26 + 106 |    |    |    | 1 |
| 72 | 26 |    | 26 + 52 |    | 26 + 106 |    |    |    | 1 |
| 73 |    | 52 | 26      | 26 | 26 + 106 |    |    |    | 1 |
| 74 |    | 52 | 52      |    | 26 + 106 |    |    |    | 1 |
| 75 |    |    | 106 + 26 |   | 26       | 26 | 26 | 26 | 1 |
| 76 |    |    | 106 + 26 |   | 26       | 26 | 52 |    | 1 |
| 77 |    |    | 106 + 26 |   | 52       |    | 26 | 26 | 1 |
| 78 |    |    | 106     | 26 | 52 + 26 |    |    | 26 | 1 |
| 79 |    |    | 106 + 26 |   | 52 + 26 |    |    | 26 | 1 |
| 80 |    |    | 106 + 26 |   | 52      |    | 52 |    | 1 |
| 81 |    |    | 106 + 26 |   | 106     |    |    |    | 1 |
| 82 |    |    | 106     |    | 26 + 106 |    |    |    | 1 |

A mode in which the common field of the EHT-SIG is omitted may be supported. The mode in which the common field of the EHT-SIG is omitted may be called a compressed mode. When the compressed mode is used, a plurality of users (i.e., a plurality of receiving STAs) may decode the PPDU (e.g., the data field of the PPDU), based on non-OFDMA. That is, the plurality of users of the EHT PPDU may decode the PPDU (e.g., the data field of the PPDU) received through the same frequency band. Meanwhile, when a non-compressed mode is used, the plurality of users of the EHT PPDU may decode the PPDU (e.g., the data field of the PPDU), based on OFDMA. That is, the plurality of users of the EHT PPDU may receive the PPDU (e.g., the data field of the PPDU) through different frequency bands.

The EHT-SIG may be configured based on various MCS schemes. As described above, information related to an MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of contiguous tones, and a second modulation scheme may be applied to the remaining half of the contiguous tones. That is, a transmitting STA may use the first modulation scheme to modulate specific control information through a first symbol and allocate it to half of the contiguous tones, and may use the second modulation scheme to modulate the same control information by using a second symbol and allocate it to the remaining half of the contiguous tones. As described above, information (e.g., a 1-bit field) regarding whether the DCM scheme is applied to the EHT-SIG may be included in the U-SIG.

An HE-STF of FIG. 18 may be used for improving automatic gain control estimation in a multiple input multiple output (MIMO) environment or an OFDMA environment. An HE-LTF of FIG. 18 may be used for estimating a channel in the MIMO environment or the OFDMA environment.

The EHT-STF of FIG. 18 may be set in various types. For example, a first type of STF (e.g., 1×STF) may be generated based on a first type STF sequence in which a non-zero coefficient is arranged with an interval of 16 subcarriers. An STF signal generated based on the first type STF sequence may have a period of 0.8 μs, and a periodicity signal of 0.8 μs may be repeated 5 times to become a first type STF having a length of 4 μs. For example, a second type of STF (e.g., 2×STF) may be generated based on a second type STF sequence in which a non-zero coefficient is arranged with an interval of 8 subcarriers. An STF signal generated based on the second type STF sequence may have a period of 1.6 μs, and a periodicity signal of 1.6 μs may be repeated 5 times to become a second type STF having a length of 8 μs. Hereinafter, an example of a sequence for configuring an EHT-STF (i.e., an EHT-STF sequence) is proposed. The following sequence may be modified in various ways.

The EHT-STF may be configured based on the following sequence M.

$$M=\{-1,-1,-1,1,1,1,-1,1,1,1,-1,1,1,-1,1\} \quad \text{<Equation 1>}$$

The EHT-STF for the 20 MHz PPDU may be configured based on the following equation. The following example may be a first type (i.e., 1×STF) sequence. For example, the first type sequence may be included in not a trigger-based (TB) PPDU but an EHT-PPDU. In the following equation, (a:b:c) may imply a duration defined as b tone intervals (i.e., a subcarrier interval) from a tone index (i.e., subcarrier index) 'a' to a tone index 'c'. For example, the equation 2 below may represent a sequence defined as 16 tone intervals from a tone index −112 to a tone index 112. Since a subcarrier spacing of 78.125 kHz is applied to the EHT-STR, the 16 tone intervals may imply that an EHT-STF coefficient (or element) is arranged with an interval of 78.125*16=1250 kHz. In addition, * implies multiplication, and sqrt( ) implies a square root. In addition, j implies an imaginary number.

$$EHT\text{-}STF(-112:16:112)=\{M\}*(1+j)/\text{sqrt}(2)$$

$$EHT\text{-}STF(0)=0 \quad \text{<Equation 2>}$$

The EHT-STF for the 40 MHz PPDU may be configured based on the following equation. The following example may be the first type (i.e., 1×STF) sequence.

$$EHT\text{-}STF(-240:16:240)=\{M,0,-M\}*(1+j)/\text{sqrt}(2) \quad \text{<Equation 3>}$$

The EHT-STF for the 80 MHz PPDU may be configured based on the following equation. The following example may be the first type (i.e., 1×STF) sequence.

$$EHT\text{-}STF(-496:16:496)=\{M,1,-M,0,-M,1,-M\}* \\ (1+j)/\text{sqrt}(2) \quad \text{<Equation 4>}$$

The EHT-STF for the 160 MHz PPDU may be configured based on the following equation. The following example may be the first type (i.e., 1×STF) sequence.

$$EHT\text{-}STF(-1008:16:1008)=\{M,1,-M,0,-M,1,-M,0,- \\ M,-1,M,0,-M,1,-M\}*(1+j)/\text{sqrt}(2) \quad \text{<Equation 5>}$$

In the EHT-STF for the 80+80 MHz PPDU, a sequence for lower 80 MHz may be identical to Equation 4. In the EHT-STF for the 80+80 MHz PPDU, a sequence for upper 80 MHz may be configured based on the following equation.

$$EHT\text{-}STF(-496:16:496)=\{-M,-1,M,0,-M,1,-M\}* \\ (1+j)/\text{sqrt}(2) \quad \text{<Equation 6>}$$

Equation 7 to Equation 11 below relate to an example of a second type (i.e., 2×STF) sequence.

$$EHT\text{-}STF(-120:8:120)=\{M,0,-M\}*(1+j)/\text{sqrt}(2) \quad \text{<Equation 7>}$$

The EHT-STF for the 40 MHz PPDU may be configured based on the following equation.

$$EHT\text{-}STF(-248:8:248)=\{M,-1,-M,0,M,-1,M\}*(1+j)/ \\ \text{sqrt}(2)$$

$$EHT\text{-}STF(-248)=0$$

$$EHT\text{-}STF(248)=0 \quad \text{<Equation 8>}$$

The EHT-STF for the 80 MHz PPDU may be configured based on the following equation.

$$EHT\text{-}STF(-504:8:504)=\{M,-1,M,-1,-M,-1,M,0,-M, \\ 1,M,1,-M,1,-M\}*(1+j)/\text{sqrt}(2) \quad \text{<Equation 9>}$$

The EHT-STF for the 160 MHz PPDU may be configured based on the following equation.

$$EHT\text{-}STF(-1016{:}16{:}1016)=\{M,-1,M,-1,-M,-1,M,0,-$$
$$M,1,M,1,-M,1,-M,0,-M,1,-M,1,M,1,-M,0,-M,1,$$
$$M,1,-M,1,-M\}*(1+j)/\text{sqrt}(2)$$

$$EHT\text{-}STF(-8)=0,\ EHT\text{-}STF(8)=0,$$

$$EHT\text{-}STF(-1016)=0,\ EHT\text{-}STF(1016)=0 \qquad \text{<Equation 10>}$$

In the EHT-STF for the 80+80 MHz PPDU, a sequence for lower 80 MHz may be identical to Equation 9. In the EHT-STF for the 80+80 MHz PPDU, a sequence for upper 80 MHz may be configured based on the following equation.

$$EHT\text{-}STF(-504{:}8{:}504)=\{-M,1,-M,1,M,1,-M,0,-M,1,$$
$$M,1,-M,1,-M\}*(1+j)/\text{sqrt}(2)$$

$$EHT\text{-}STF(-504)=0,$$

$$EHT\text{-}STF(504)=0 \qquad \text{<Equation 11>}$$

The EHT-LTF may have first, second, and third types (i.e., 1×, 2×, 4×LTF). For example, the first/second/third type LTF may be generated based on an LTF sequence in which a non-zero coefficient is arranged with an interval of 4/2/1 subcarriers. The first/second/third type LTF may have a time length of 3.2/6.4/12.8 μs. In addition, a GI (e.g., 0.8/1/6/3.2 μs) having various lengths may be applied to the first/second/third type LTF.

Information related to a type of STF and/or LTF (information related to a GI applied to LTF is also included) may be included in a SIG-A field and/or SIG-B field or the like of FIG. 18.

A PPDU (e.g., EHT-PPDU) of FIG. 18 may be configured based on the example of FIG. 5 and FIG. 6.

For example, an EHT PPDU transmitted on a 20 MHz band, i.e., a 20 MHz EHT PPDU, may be configured based on the RU of FIG. 5. That is, a location of an RU of EHT-STF, EHT-LTF, and data fields included in the EHT PPDU may be determined as shown in FIG. 5.

An EHT PPDU transmitted on a 40 MHz band, i.e., a 40 MHz EHT PPDU, may be configured based on the RU of FIG. 6. That is, a location of an RU of EHT-STF, EHT-LTF, and data fields included in the EHT PPDU may be determined as shown in FIG. 6.

Since the RU location of FIG. 6 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 7 but the RU of FIG. 6 is repeated twice.

When the pattern of FIG. 6 is repeated twice, 23 tones (i.e., 11 guard tones+12 guard tones) may be configured in a DC region. That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 6 is repeated several times.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "modulo 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "modulo 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frame, the management frame, and the data frame.

Figure 19:
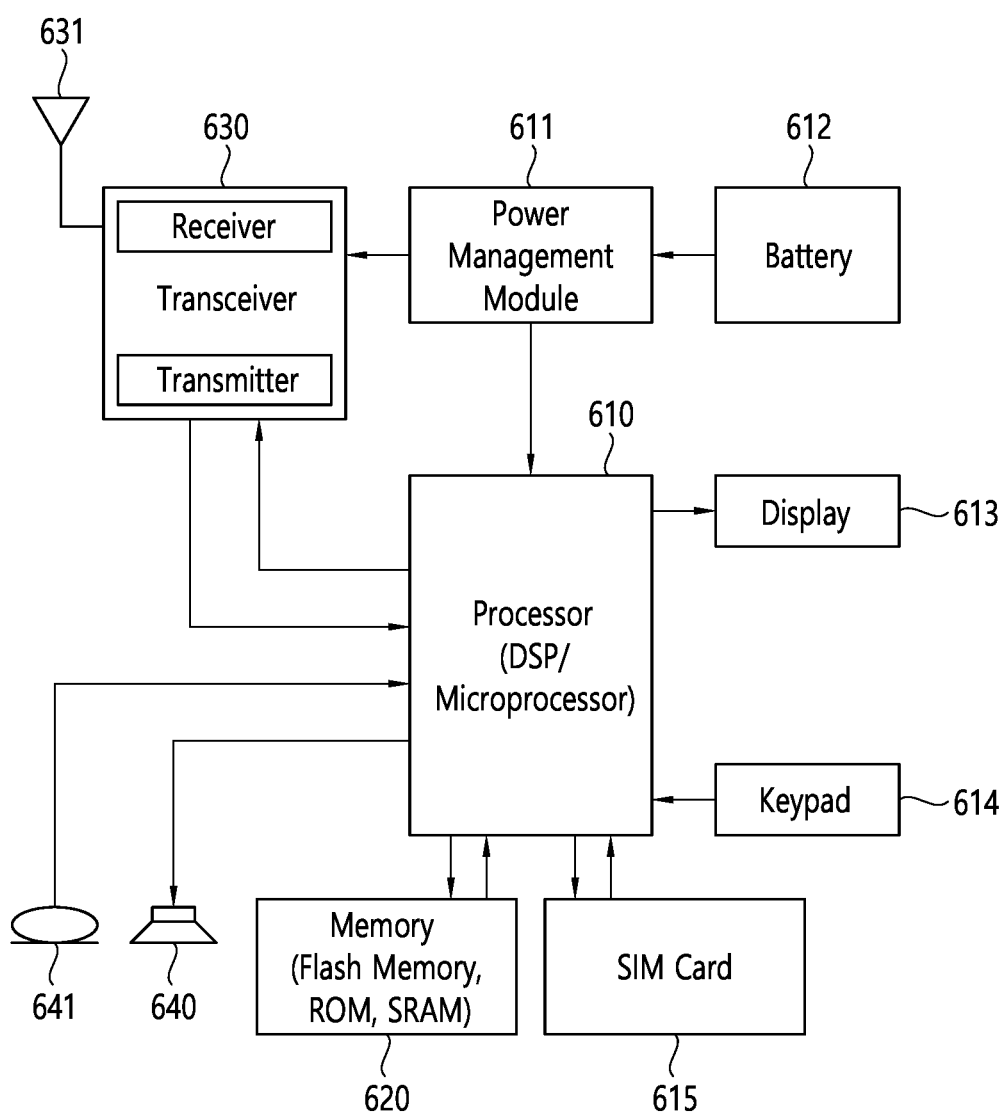
FIG. 19 illustrates an example of a modified transmission device and/or receiving device of the present specification.

FIG. 19 illustrates an example of a modified transmission device and/or receiving device of the present specification.

Each device/STA of the sub-figure (a)/(b) of FIG. 1 may be modified as shown in FIG. 19. A transceiver 630 of FIG. 19 may be identical to the transceivers 113 and 123 of FIG. 1. The transceiver 630 of FIG. 19 may include a receiver and a transmitter.

A processor 610 of FIG. 19 may be identical to the processors 111 and 121 of FIG. 1. Alternatively, the processor 610 of FIG. 19 may be identical to the processing chips 114 and 124 of FIG. 1.

A memory 620 of FIG. 19 may be identical to the memories 112 and 122 of FIG. 1. Alternatively, the memory 620 of FIG. 19 may be a separate external memory different from the memories 112 and 122 of FIG. 1.

Referring to FIG. 19, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 19, a speaker 640 may output a result related to a sound processed by the processor 610. A microphone 641 may receive an input related to a sound to be used by the processor 610.

Figure 20:
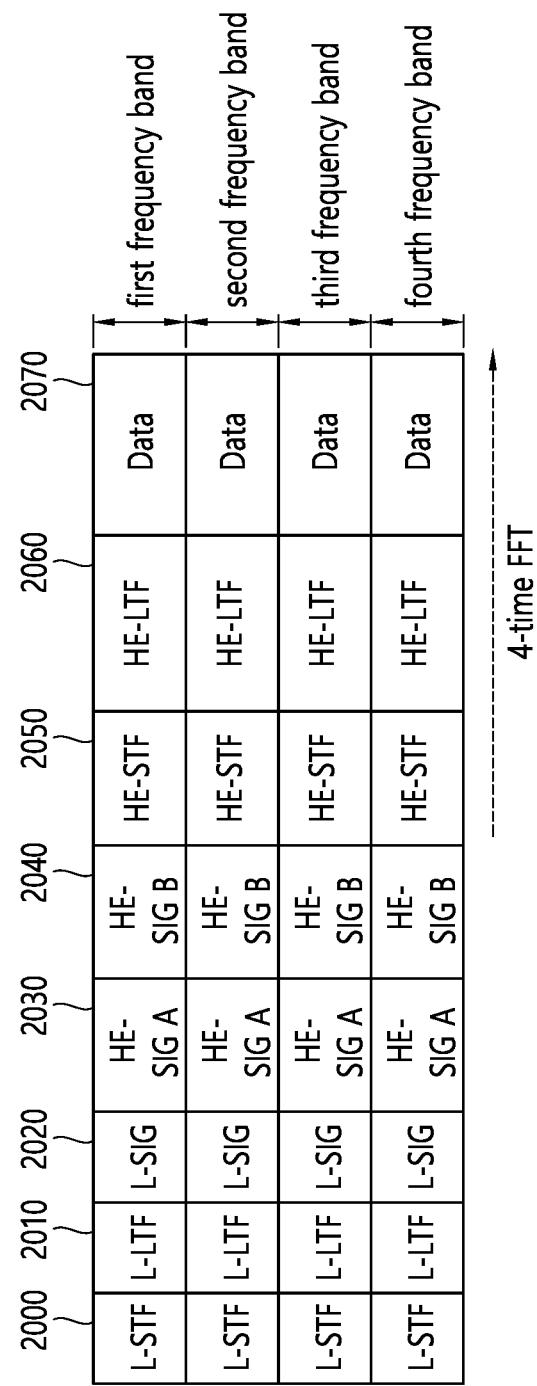
FIG. 20 shows an example of a HE-PPDU.

FIG. 20 shows an example of a HE-PPDU.

The illustrated L-STF 2000 may include a short training orthogonal frequency division multiplexing symbol (OFDM). The L-STF 2000 may be used for frame detection, automatic gain control (AGC), diversity detection, and coarse frequency/time synchronization.

The L-LTF 2010 may include a long training orthogonal frequency division multiplexing symbol (OFDM). The L-LTF 2010 may be used for fine frequency/time synchronization and channel estimation.

The L-SIG 2020 may be used to transmit control information. The L-SIG 2020 may include information related to a data transmission rate and a data length. Also, the L-SIG 2020 may be repeatedly transmitted. That is, the L-SIG 2020 may be configured in a repeated format (e.g., may be referred to as R-LSIG).

The HE-SIG-A 2030 may include control information common to the receiving station(s).

Specifically, the HE-SIG-A 2030 may include information related to: 1) a DL/UL indicator; 2) a BSS color field that is an identifier of the BSS; 3) a field indicating the remaining time of the current TXOP duration/period; 4) a Bandwidth field indicating whether 20, 40, 80, 160, 80+80 MHz; 5) a field indicating MCS scheme applied to the HE-SIG-B; 6) an indication field indicating whether modulation dual subcarrier modulation (DCM) is applied to the HE-SIG-B for MCS; 7) a field indicating the number of symbols used for HE-SIG-B; 8) a field indicating whether the HE-SIG-B is generated over the full/entire band; 9) a field indicating the number of symbols of the HE-LTF; 10) a field indicating a length of the HE-LTF and a CP length; 11) a field indicating whether additional OFDM symbols exist for LDPC coding; 12) a field indicating control information on Packet Extension (PE); and/or 13) a field indicating information related to a CRC field of the HE-SIG-A, and the like. At least one field of the HE-SIG-A may be omitted or changed. In addition, some fields may be added or omitted in other environments where the HE-SIG-A is not a multi-user (MU) environment.

Also, the HE-SIG-A 2030 may be composed of two parts: HE-SIG-A1 and HE-SIG-A2. The HE-SIG-A1 and HE-SIG-A2 included in the HE-SIG-A may be defined in the following format structure (field) according to a corresponding PPDU. First, the HE-SIG-A field of the HE SU PPDU may be defined as follows.

TABLE 8

| Two Parts of HE-SIG-A | Bit | Field | Number of bits | Description |
|---|---|---|---|---|
| HE-SIG-A1 | B0 | Format | 1 | Differentiate an HE SU PPDU and HE ER SU PPDU from an HE TB PPDU: Set to 1 for an HE SU PPDU and HE ER SU PPDU |
| | B1 | Beam Change | 1 | Set to 1 to indicate that the pre-HE modulated fields of the PPDU are spatially mapped differently from the first symbol of the HE-LTF. Equation (28-6), Equation (28-9), Equation (28-12), Equation (25-14), Equation (28-16) and Equation (28-18) apply if the Bean Change field is set to 1. Set to 0 to indicate that the pre-HE modulated fields of the PPDU are spatially mapped the same way as the first symbol of the HE-LTF on each tone. Equation (28-8), Equation (28-10), Equation (28-13), Equation (28-15), Equation (28-17) and Equation (28-19) apply if the Beam Change field is set to 0 |
| | B2 | UL/DL | 1 | Indicates whether the PPDU is sent UL ot DL. Set to the value indicated by the TXVECTOR parameter UPLINK_FLAG. |
| | B3-B6 | MCS | 4 | For an HE SU PPDU: Set to n for MCSn, where n = 0, 1, 2, . . . 11 Values 12-25 are reserved For HE ER SU PPDU with Bandwidth field set to 0 (242-tone RU): Set to n for MCSn, where n = 0, 1, 2 Values 3-15 are reserved For HE ER SU PPDU with Bandwidth field set to 1 (upper frequency 106-tone RU): Set to 0 for MCS 0 Values 1-15 are reserved |

TABLE 9

| Two Parts of HE-SIG-A | Bit | Field | Number of bits | Description |
|---|---|---|---|---|
| | B7 | DCM | 1 | Indicates whether or not DCM is applied to the Data field for the MCS indicated.<br>If the STBC field is 0, then set to 1 to indicate that DCM is applied to the Data field. Neither DCM nor STBC shall be applied if both the DCM and STBC are set to 1.<br>Set to 0 indicate that DCM is not applied to the Data field.<br>NOTE-DCM is applied only to HE-MCSs 0, 1, 3 and 4. DCM is applied only to 1 and 2 spatial streams. DCM is not applied in combination with STBC |
| | B8-B13 | BSS Color | 6 | The BSS Color field is an identifier of the BSS.<br>Set so the value of the TXVECTOR parameter BSS_-COLOR. |
| | B14 | Reserved | 1 | Reserved and set to 1 |
| | B15-B18 | Spatial Reuse | 4 | Indicates whether or not spatial reuse is allowed during the transmission of this PPDU<br>Set to a value from Table 28.21 (Spatial Reuse field encoding for an HE SU PPDU, HE ER SU PPDU, and HE MU PPDU), see 27.11.6 (SPATIAL_REUSE).<br>Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. FOR the interpretation of other values see 27.11.6 (SPATIAL_REUSE) and 27.9 (Spatial reuse operation). |
| | B19-B20 | Bandwidth | 2 | For an HE SU PPDU:<br>Set to 0 for 20 MHz<br>Set to 1 for 40 MHz<br>Set to 2 for 80 MHz<br>Set to 3 for 160 MHz and 80 + 80 MHz<br>For an HE ER SU PPDU:<br>set to 0 for 242-tone RU<br>Set to 1 for upper frequency 106-tone RU within the primary 20 MHz<br>Values 2 and 3 are reserved |

TABLE 10

| Two Parts of HE-SIG-A | Bit | Field | Number of bits | Description |
|---|---|---|---|---|
| | B21-B22 | GI + LTF Size | 2 | Indicates the GI duration and HE-LTF size.<br>Set to 0 to indicate a 1x HE-LTF and 0.8 μs GI<br>Set to 1 to indicate a 2x HE-LTF and 0.3 μs GI<br>Set to 2 to indicate 3 2x HE-LTF and 1.6 μs GI<br>Set to 3 to indicate:<br>a 4x HE-LTF and 0.8 μs GI if both the DCM and STBC fields are 1. Neither DCM nor STBC shall be applied if both the DCM and STBC fields ate set to 1.<br>a 4x HE-LTF and 3.2 μs GI, otherwise |
| | B23-B25 | NSTS And Midamble Perodicity | 3 | If the Doppler field is 0, indicates the number of space-time streams.<br>Set to the number of space-time streams minus 1<br>For an HE ER SU PPDU, values 2 to 7 are reserved<br>If the Doppler field is 1, then B23-B24 indicates the number of space time streams, up to 4, and B25 indicates the midamble periodicity.<br>B23-B24 is set to the number of space time streams minus 1.<br>For an HE ER SU PPDU, values 2 and 3 are reserved<br>B25 is set to 0 if TXVECTOR parameter MIDAMBLE_PERIODICITY is 10 and set to 1 if TXVECTOR parameter MIDAMBLE_PERIODICITY is 20. |
| HE-SIG-A2 (HE SU PPDU) or HE-SIG-A3 (HE ER SU PPDU) | B0-B6 | TXOP | 7 | Set to 127 to indicated no duration information if TXVECTOR parameter TXOP_DURATON is set to UXSPECIFIED.<br>Set to a value less than 127 to indicate duration information for NAV setting and protection of the TXOP as follows:<br>If TXVECTOR parameter TXOP_DURATION is |

TABLE 10-continued

| Two Parts of HE-SIG-A | Bit | Field | Number of bits | Description |
|---|---|---|---|---|
| | | | | less than 512, then B0 is set to 0 and B1-B6 is set to floor(TXOP_DURATION/8)<br>Otherwise, B0 is set to 1 and B1-B6 is set to floor ((TXOP DURATION-512)/128)<br>where<br>B0 indicates the TXOP length granularity. Set to 0 for 8 μs; otherwise set to 1 for 128 μs.<br>B1-B6 indicates the sealed value of the TXOP_DURATION |
| | B7 | Coding | 1 | Indicates whether BCC or LDPC is used:<br>Set to 0 to indicate BCC<br>Set to 1 to indicate LDPC |

TABLE 11

| Two Parts of HE-SIG-A | Bit | Field | Number of bits | Description |
|---|---|---|---|---|
| | B8 | LDPC Extra Symbol Segment | 1 | Indicates the presence of the extra OFDM symbol segment for LDPC:<br>Set to 1 if an extra OFDM symbol segment for LDPC is present<br>Set to 0 if an extra OFDM symbol segment for LDPC is not present<br>Reserved and set to 1 if the Coding field is set to 0 |
| | B9 | STBC | 1 | If the DCM field is set 0, then set to 1 if space time block coding is used. Neither DCM nor STBC shall be applied if both the DCM field ad STBC field are set to 1.<br>Set to 0 otherwise. |
| | B10 | Beam-formed | 1 | Set to 1 if a beamforming steering matrix is applied to the waveform in an SU transmission.<br>Set to 0 otherwise. |
| | B11-B12 | Pre-FEC Padding Factor | 2 | Indcates the pre-FEC padding factor.<br>Set to 0 to indicate a pre-FEC padding factor of 4<br>Set to 1 to indicate a pre-FEC padding factor of 1<br>Set to 2 to indicate a pre-FEC padding factor of 2<br>Set to 3 to indicate a pre-FEC padding factor of 3 |
| | B13 | PE Disambiguity | 1 | Indicates PE disambiguity as defined in 28.3.12 (Packet extension). |
| | B14 | Reserved | 1 | Reserved and set to 1 |
| | B15 | Doppler | 1 | Set to 1 if one of the following applies:<br>The number of OFDM symbols in the Data field is larger than the signaled midamble periodicity plus 1 and the midamble is present<br>The number of OFDM symbols in the Data field is less than or equal to the signaled midamble periodicity plus 1 (see 28.3.11.16 Midamble), the midamble is not present, but the channel is fast varying. It recommends that midamble may be used for to PPDUs of the reverse link.<br>Set to 0 otherwise. |
| | B16-B19 | CRC | 4 | CRC for bits 0-41 of the HE-SIG-A field (see 28.3.10.7.3 (CRC computation)). Bits 0-41 of the HE-SIG-A field correspond to bits 0-25 of HE-SIG-A1 followed by bits 0-15 of HE-SIG-A2). |
| | B20-B25 | Tail | 6 | Used to terminate to trellis of the convolutional decoder.<br>Set to 0. |

In addition, the HE-SIG-A field of the HE MU PPDU may be defined as follows.

TABLE 12

| Two Parts of HE-SIG-A | Bit | Field | Number of bits | Description |
|---|---|---|---|---|
| HE-STG-A1 | B0 | UL/DL | 1 | Indicates whether the PPDU is sent UL or DL. Set to the value indicated by the TXVECTOR parameter UPLINK_FLAG. |

TABLE 12-continued

| Two Parts of HE-SIG-A | Bit | Field | Number of bits | Description |
|---|---|---|---|---|
| | | | | NOTE-The TDLS peer can identify the TDLS frame by To DS and From DS fields is the MAC header of the MPDU. |
| | B1-B3 | SIGB MCS | 3 | Indicates the MCS of the HE-SIG-B field: Set to 0 for MCS 0 Set to 1 for MCS 3 Set to 2 for MCS 3 Set to 3 for MCS 3 Set to 4 for MCS 4 Set to 5 for MCS 5 The values 6 and 7 are reserved |
| | B4 | SIGB DCM | 1 | Set to 1 indicates that the HE-SIG-B is modulated with DCM for the MCS. Set to 0 indicates that the HE-SIG-B is not modulated with DCM for the MCS. NOTE-DCM is only applicable to MCS 0, MCS 1, MCS 3, and MCS 4 |
| | B5-B10 | BSS Color | 6 | The BSS Color field is an identifier of the BBS. Set to the value of the TXVECTOR parameter BSS_-COLOR. |
| | B11-B14 | Spatial Reuse | 4 | Indicates whether or not spatial reuse is allowed during the transmission of this PPDU Set to the value of the SPATIAL_REUSE parameter of the TXVECTOR, which contains a value from Table 28-21 (Spatial Reuse field encoding for an HE SU PPDU, HE ER SV PPDU, and HE MU PPDU) (see 27.11.6 (SPATIAL_REUSE)). Set to SRP_DISALLOW to prohibit SRP-based spatial reuse during this PPDU. Set to SRP_AND_NON_ SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |

TABLE 13

| Two Parts of HE-SIG-A | Bit | Field | Number of bits | Description |
|---|---|---|---|---|
| | B15-B17 | Bandwidth | 3 | Set to 0 for 20 MHz. Set to 1 for 40 MHz. Set to 2 for 80 MHz non-preamble puncturing mode. Set to 3 for 160 MHz and 80 + 80 MHz non-preamble puncturing mode. If the SIGB Compression field is 0: Set to 4 for preamble puncturing in 80 MHz, where in the preamble only the secondary 20 MHz is punctured. Set to 5 for preamble puncturing in 80 MHz, where in the preamble only one of the two 20 MHz sub-channels in secondary 40 MHz is punctured. Set to 6 for preamble puncturing in 160 MHz or 80 + 80 MHz, where in the primary 80 MHz of the preamble only the secondary 20 MHz is punctured. Set to 7 for preamble puncturing in 160 MHz or 80 + 80 MHz, where in the primary 80 MHz of the preamble the primary 40 MHz is present. If the SIGB Compression field is 1 then values 4-7 are reserved. |
| | B18-B21 | Number Of HE-SIG-B Symbols Or MU-MIMO Users | 4 | If the HE-SIG-B Compression field is set to 0, indicates the number of OFDM symbols in the HE-SIG-B field: Set to the number of OFDM symbols in the HE-SIG-B field minus 1 if the number of OFDM symbols in the HE-SIG-B field is less than 16: Set to 15 to indicate that the number of OFDM symbols in the HE-SIG-B field is equal to 16 if Longer Than 16 HE SIG-B OFDM Symbols Support sub-field of the HE Capabilities element transmitted by at least on recipient STA is 0; Set to 15 to indicate that the number of OFDM symbols in the HE-SIG-B field is greater than or equal to 16 if the Longer Than 16 HE SIG-B OFDM Symbols |

TABLE 13-continued

| Two Parts of HE-SIG-A | Bit | Field | Number of bits | Description |
|---|---|---|---|---|
| | | | | Support subfield of the HE Capabilities element transmitted by all the recipients STAs are 1 and if the HE-SIG-B data rate is less than MCS 4 without DCM. The exact number of OFDM symbols in the HE-SIG-B field is calclulated based on the number of User fields in the HE-SIG-B content channel which is indicated by HE-SIG-B common field in this case. If the HE-SIG-B Compression field is set to 1, indicates the number of MU-MIMO users and is set to the number of NU-MIMO users minus 1 |
| | B22 | SIGB Compression | 1 | Set to 0 if the Common field in HE-SIG-B is present. Set to 1 if the Common field it HE-SIG-B is not present. |

TABLE 14

| Two Parts of HE-SIG-A | Bit | Field | Number of bits | Description |
|---|---|---|---|---|
| | B23-B24 | GI + LTF Size | 2 | Indicates the GI duration and HE-LTF size: Set to 0 to indicate a 4x HE-LTF and 0.8 μs GI Set to 1 to indicate a 2x HE-LTF and 0.8 μs GI Set to 3 to indicate a 2x HE-LTF and 1.6 μs GI Set to 3 to indicate a 4x HE-LTF and 3.2 μs GI |
| | B25 | Doppler | 1 | Set to 1 if one of the following applies: The number of OFDM symbols in the Data field is larger than the signaled midamble periodicity plus 1 and the midamble is present The number of OFDM symbols in the Data field is less than or equal to the signaled midamble periodicity plus 1 (see 28.3.11.16 Midamble), the midamble is not present, but the channel is fast varying. It recommends that midamble may be use for the PPDUs of the reverse link. Set to 0 otherwise. |
| HE-SIG-A2 | B0-B6 | TXOP | 7 | Set to 127 to indicate no duration information if TXVECTOR parameter TXOP_DURATION is set to UNSPECIFIED. Set to a value less than 127 to indicate duration information for NAV setting and protection of the TXOP as follows: If TXVECTOR parameter TXOP_DURATION is less than 512, then B0 is set to 0 and B1-B6 is set to floor(TXOP_DURATION/8) Otherwise, B0 is set to 1 and B1-B6 is set to floor ((TXOP_DURATION-512/128) where B0 indicates the TXOP length granularity. Set to 0 for 8 μs; otherwise set to 1 for 128 μs. B1-B6 indicates the scaled value of the TXOP_DURATION |
| | B7 | Reserved | 1 | Reserved and set to 1 |

TABLE 15

| TwoParts of HE-SIG-A | Bit | Field | Number of bits | Description |
|---|---|---|---|---|
| | B8-B10 | Number of HE-LTF Symbols And Midamble Periodicity | 3 | If the Doppler field is set to 0, indicates the number of HE-LTF symbols: Set to 0 for 1 HE-LTF symbol Set to 1 for 2 HE-LTF symbols Set to 2 for 4 HE-LTF symbols Set to 3 for 6 HE-LTF symbols Set to 4 for 8 HE-LTF symbols Other values are reserved. If the Doppler field is set to 1 B8-B9 indicates the number of HE-LTF symbols and B10 indicates midamble periodicity. |

TABLE 15-continued

| Two Parts of HE-SIG-A | Bit | Field | Number of bits | Description |
|---|---|---|---|---|
| | | | | B8-B9 is encoded as follows:<br>0 indicates 1 HE-LTF symbol<br>1 indicates 2 HE-LTF symbols<br>2 indicates 4 HE-LTF symbols<br>3 is reserved<br>B10 is set to 0 if the TXVECTOR prameter MIDAMBLE_PERIODICITY is 10 and set to 1 if the TXVECTOR parameter PREAMBLE_PERIODICITY is 20. |
| | B11 | LDPC Extra Symbol Segment | 1 | Indication of the presence of the extra OFDM symbol segment for LDPC.<br>Set to 1 if an extra OFDM symbol segment for LDPC is present.<br>Set to 0 otherwise. |
| | B12 | STBC | 1 | In an HE MU PPDU where each RU includes no more than 1 user, set to 1 to indicate all RUs are STBC encoded in the payload, set to 0 to indicate all RUs are not STBC encoded in the payload.<br>STBC does not apply to HE-SIG-B.<br>STBC is not applied if one or more RUs are used for MU-MIMO allocation. |
| | B13-B14 | Pre-FEC Padding Factor | 2 | Indicates the pre-FEC padding factor.<br>Set to 0 to indicate a pre-FEC padding factor of 4<br>Set to 1 to indicate a pre-FEC padding factor of 1<br>Set to 2 to indicate a pre-FEC padding factor of 2<br>Set to 3 to indicate a pre-FEC padding factor of 3 |
| | B15 | PE Disambiguity | 1 | Indicates PE disambiguity as defined in 28.3.12 (Packet extension) |
| | B16-B19 | CRC | 4 | CRC for bits 0-41 of the HE-SIG-A field (see 28.3.10.7.3 (CRC compuation)). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder.<br>Set to 0. |

In addition, the HE-SIG-A field of the HE TB PPDU may be defined as follows.

TABLE 16

| Two Parts of HE-SIG-A | Bit | Field | Number of bits | Description |
|---|---|---|---|---|
| HE-SIG-A1 | B0 | Format | 1 | Differentiate an HE SU PPDU and HE ER SU PPDU from an HE TB PPDU:<br>Set to 0 for an HE TB PPDU |
| | B1-B6 | BSS Color | 6 | The BSS Color field is an identifier of the BSS.<br>Set to the value of the TXVECTOR parameter BSS_-COLOR. |
| | B7-B10 | Spatial Reuse 1 | 4 | Indicates whether or not spatial reuse is allowed in a subband of the PPDU during the transmission of this PPDU, and if allowed, indicates a value that is used to determine a limit on the transmit power of a spatial reuse transmission.<br>If the Bandwidth field indicates 20 MHz, 40 MHZ, or 80 MHZ then this Spatial Reuse field applies to the first 20 MHz subband.<br>If the Bandwidth field indicates 160/80 + 80 MHz then this Spatial Reuse field applies to the first 40 MHz subband of the 160 MHz operating band.<br>Set to the value of the SPATIAL_REUSE(1) parameter of the TXVECTOR, which contains a value from Table 28-22 (Spatial Reuse field encoding for an HE TB PPDU) for an HE TB PPDU (see 27.11.6 (SPATIAL_REUSE))<br>Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |

TABLE 17

| Two Parts of HE-SIG-A | Bit | Field | Number of bits | Description |
|---|---|---|---|---|
| | B11-B14 | Spatial Reuse 2 | 4 | Indicates whether or not spatial reuse is allowed in a subband of the PPDU during the transmission of this PPDU, and if allowed, indicates a value that is used to determine a limit on the transmit power of a spatial resuse transmission.<br>If the Bandwidth field indicates 20 MHz, 40 MHz, or 80 MHz:<br>This Spatial Reuse field applies to the second 20 MHz subband.<br>If the STA operating channel with is 20 MHz. then this field is set to the same value as Spatial Reuse 1 field.<br>If the STA operating channel width is 40 MHz. in the 2.4 GHz band, this field is set to the same value as Spatial Reuse 1 field.<br>If the Bandwidth field indicates 160/80 + 80 MHz the this Spatial Reuse field applies to the second 40 MHz subband of the 160 MHz operating band.<br>Set to the value of the SPATIAL_REUSE(2) parameter of the TXVECTOR, which contains a value from Table 28-22 (Spatial Reuse field encoding for an HE TB PPDU) for an HE TB PPDU (see 27.11.6 (SPATAL_REUSE))<br>Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |

TABLE 18

| Two Parts of HE-SIG-A | Bit | Field | Number of bits | Description |
|---|---|---|---|---|
| | B15-B18 | Spatial Reuse 3 | 4 | Indicates whether or not spatial reuse is allowed in a subband of the PPDU during the transmission of this PPDU, and if allowed, indicates a value that is used to determine a limit on the transmit power of a spatial reuse transmsission.<br>If the Bandwidth field indicates 20 MHz, 40 MHz, or 80 MHz:<br>This Spatial Reuse field applies to the third 20 MHz subband.<br>If the STA operating channel width is 20 MHz or 40 MHz, is field is set to the same value as Spatial Reuse 1 field.<br>If the Bandwidth field indicates 160/80 + 80 MHz:<br>This Spatial Reuse field applies to the third 40 MHz subband of the 160 MHz operating band.<br>If the STA operating channel width is 80 + 80 MHz this field is set to the same value as Spatial Reuse 1 field.<br>Set to the value of the SPATIAL_REUSE(3) parameter of the TXVECTOR, which contains a value from Table 28-22 (Spatial Reuse field encoding for an HE TB PPDU) for an HE TB PPDU (see 27.11.6 (SPATIAL_REUSE)).<br>Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |

TABLE 19

| Two Parts of HE-SIG-A | Bit | Field | Number of bits | Description |
|---|---|---|---|---|
| | B19-B22 | Spatial Reuse 4 | 4 | Indicates whether or not spatial reuse is allowed in a subband of the PPDU during the transmission of this PPDU, and if allowed, indicates a value that is used to determine a limit on the transmit power of a spatial resuse transmission.<br>If the Bandwidth field indicates 20 MHZ, 40 MHz or 80 MHz:<br>This Spatial Reuse field applies to the fourth 20 MHz subband.<br>If the STA operating channel width is 20 MHz, then this field is set to the same value as Spatial Reuse 1 field.<br>If the STA operating channel width is 40 MHz, then this field is set to the same value as Spatial Reuse 2 field.<br>If the Bandwidth field indicates 160/80 + 80 MHz.<br>This Spatial Reuse field applies to the fourth 40 MHz subband of the 160 MHz operating band.<br>If the STA operating channel width is 80 + 80 MHz, then this field is set to same value as Spatial Reuse 2 field.<br>Set to the value of the SPATIAL_REUSE(4) parameter of the TXVECTOR, which contains a value from Table 28-22 (Spatial Reuse field encoding for an HE TB PPDU) for an HE TB PPDu (see 27.11.6 (SPATIAL_REUSE)).<br>Set to SRP_DISALLOW to prohibit SRP-based spatial reuse during this PPDU. Set to SRP_AND_NON_SRB_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.0 (Spatial reuse operation). |
| | B23 | Reserved | 1 | Reserved and set to 1.<br>NOTE-Unlike other Reserved fields in HE-SIG-A of the HE TB PPDU, B23 does not have a corresponding bit in the Trigger frame. |
| | B24-B25 | Bandwidth | 2 | Set to 0 for 20 MHz<br>Set to 1 for 40 MHz<br>Set to 2 for 80 MHz<br>Set to 3 for 160 MHz and 80 + 80 MHz |

TABLE 20

| Two Parts of HE-SIG-A | Bit | Field | Number of bits | Description |
|---|---|---|---|---|
| HE-SIG-A2 | B0-B6 | TXOP | 7 | Set to 127 to indicate no duration information if TXVECTOR parameter TXOP_DURATION is set to UNSPECIFIED.<br>Set to a value less than 127 to indicate duration information for NAX setting and protection of the TXOP as follows:<br>if TXVECTOR parameter TXOP_DURATION is less than 512, then B0 is set to 0 and B1-B6 is set to floor(TXOP_DURATION/8)<br>Otherwise, B0 is set to 1 and B1-B6 is set to floor((TXOP DURATION-512)/128)<br>where<br>B0 indicates the TXOP length granularity. Set to 0 for 8 μs; otherwise set to 1 for 128 μs.<br>B1-B6 indicates the scaled value of the TXOP_DURATON |
| | B7-B15 | Reserved | 9 | Reserved and set to value indicated in the UL HE-SIG-A2 Reserved subfield in the Trigger frame. |
| | B16-B19 | CRC | 4 | CRC of bits 0-41 of the HE-SIG-A field. See 28.3.10.7.3 (CRC computation). Bits 0-41 of the HE-SIG-A field correspond to bits 0-25 of HE-SIG-A1 followed by bits 0-15 of HE-SIG-A2) |
| | B20-B25 | Tail | 6 | Used to terminate the trellis of the convolutional decoder.<br>Set to 0. |

The HE-SIG-B 2040 may be included only for a multiple-user (MU) PPDU as described above. Basically, the HE-SIG-A 2050 or the HE-SIG-B 2060 may include resource allocation information (or virtual resource allocation information) for at least one receiving STA.

Hereinafter, technical features of channel bonding supported by the STA of the present disclosure will be described.

For example, in an IEEE 802.11n system, 40 MHz channel bonding may be performed by combining two 20 MHz channels. In addition, 40/80/160 MHz channel bonding may be performed in the IEEE 802.11ac system.

For example, the STA may perform channel bonding for a primary 20 MHz channel (P20 channel) and a secondary 20 MHz channel (S20 channel). A backoff count/counter may be used in the channel bonding process. The backoff count value may be chosen as a random value and decremented during the backoff interval. In general, when the backoff count value becomes 0, the STA may attempt to access the channel.

During the backoff interval, when the P20 channel is determined to be in the idle state and the backoff count value for the P20 channel becomes 0, the STA, performing channel bonding, determines whether an S20 channel has maintained an idle state for a certain period of time (for example, point coordination function interframe space (PIFS)). If the S20 channel is in an idle state, the STA may perform bonding on the P20 channel and the S20 channel. That is, the STA may transmit a signal (PPDU) through a 40 MHz channel (that is, a 40 MHz bonding channel) including a P20 channel and the S20 channel.

Figure 21:
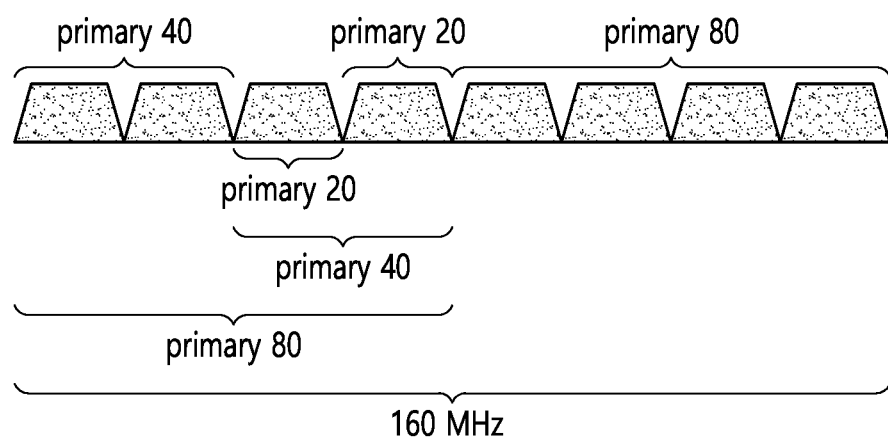
FIG. 21 shows an example of channel bonding.

FIG. 21 shows an example of channel bonding. As shown in FIG. 21, a primary 20 MHz channel and a secondary 20 MHz channel may configure a primary 40 MHz channel through channel bonding. That is, a bonded 40 MHz channel may include a primary 20 MHz channel and a secondary 20 MHz channel.

Channel bonding may be performed when a channel that is contiguous to a primary channel is in an idle state. That is, a primary 20 MHz channel, a secondary 20 MHz channel, a secondary 40 MHz channel, and a secondary 80 MHz channel may be sequentially bonded. However, when the secondary 20 MHz channel is determined to be in a busy state, even if the other secondary channels are all in an idle state, the channel bonding may not be performed. Additionally, when the secondary 20 MHz channel is determined to be in an idle state and the Secondary 40 MHz channel is determined to be in a busy state, channel bonding may be performed only on the primary 20 MHz channel and the secondary 20 MHz channel.

Hereinafter, preamble puncturing that is supported by a station (STA) of the present specification will be described.

For example, in the example of FIG. 21, when a primary 20 MHz channel, a secondary 40 MHz channel, and a secondary 80 MHz channel are all in an idle state, while the secondary 20 MHz channel is in a busy state, bonding between the secondary 40 MHz channel and the secondary 80 MHz channel may be impossible. In this case, the STA may configure a 160 MHz PPDU and puncture preambles (or perform preamble puncturing on preambles) (e.g., L-STF, L-LTF, L-SIG, RL-SIG, U-SIG, HE-SIG-A, HE-SIG-B, HE-STF, HE-LTF, EHT-SIG, EHT-STF, EHT-LTF, and so on) that are transmitted through the secondary 20 MHz channel, thereby being capable of transmitting a signal through a channel that is in an idle state. In other words, the STA may perform preamble puncturing on part of the band of the PPDU. Information on the preamble puncturing (e.g., information on the 20/40/80 MHz channel(s)/band(s) having puncturing applied thereto) may be included in a signal field (e.g., HE-SIG-A, U-SIG, EHT-SIG) of the PPDU.

Hereinafter, technical features of a multi-link (ML) supported by an STA of the present disclosure will be described.

The STA (AP and/or non-AP STA) of the present disclosure may support multi-link (ML) communication. ML communication may refer to communication supporting a plurality of links. The link related to ML communication may include channels of the 2.4 GHz band shown in FIG. 15, the 5 GHz band shown in FIG. 16, and the 6 GHz band shown in FIG. 17 (for example, 20/40/80/160/240/320 MHz channels).

A plurality of links used for ML communication may be set in various ways. For example, a plurality of links supported by one STA for ML communication may be a plurality of channels in a 2.4 GHz band, a plurality of channels in a 5 GHz band, and a plurality of channels in a 6 GHz band. Alternatively, a plurality of links supported by one STA for ML communication may be a combination of at least one channel in the 2.4 GHz band (or 5 GHz/6 GHz band) and at least one channel in the 5 GHz band (or 2.4 GHz/6 GHz band). Meanwhile, at least one of the plurality of links supported by one STA for ML communication may be a channel to which preamble puncturing is applied.

The STA may perform an ML setup to perform ML communication. The ML setup may be performed based on a management frame or control frame such as a Beacon, a Probe Request/Response, an Association Request/Response, and the like. For example, information about ML setup may be included in an element field included in a Beacon, a Probe Request/Response, an Association Request/Response, and the like.

When ML setup is completed, an enabled link for ML communication may be determined. The STA may perform frame exchange through at least one of a plurality of links determined as an enabled link. For example, the enabled link may be used for at least one a management frame, a control frame, and a data frame.

When one STA supports a plurality of links, a transceiver supporting each link may operate as one logical STA. For example, one STA supporting two links could be expressed as one multi-link device (MLD) including a first STA for a first link and a second STA for a second link. For example, one AP supporting two links could be expressed as one AP MLD including a first AP for a first link and a second AP for a second link. In addition, one non-AP supporting two links may be expressed as one non-AP MLD including a first STA for the first link and a second STA for the second link.

Hereinafter, more specific features related to the ML setup are described.

The MLD (the AP MLD and/or the non-AP MLD) may transmit information about a link that the corresponding MLD can support through ML setup. Link information may be configured in various ways. For example, information about the link may include at least one of 1) information on whether the MLD (or STA) supports simultaneous RX/TX operation, 2) information on the number/upper limit of uplink/downlink links supported by the MLD (or STA), 3) information about the location/band/resource of the uplink/downlink link supported by the MLD (or STA), 4) information on available or preferred frame types (management, control, data, etc.) in at least one uplink/downlink link, 5) ACK policy information available or preferred in at least one uplink/downlink link, and 6) information on available or preferred traffic identifier (TID) in at least one uplink/downlink link. The TID is related to the priority of traffic data and is expressed as eight types of values according to the conventional wireless LAN standard. That is, eight TID values corresponding to four access categories (AC) (AC_BK(background), AC_BE(best effort), AC_VI(video), AC_VO(voice)) according to the conventional WLAN standard may be defined.

For example, it may be pre-configured in advance that all TIDs are mapped for uplink/downlink link. Specifically, when negotiation is not made through ML setup, all TIDs are used for ML communication. If the mapping between the uplink/downlink link and the TID is negotiated through additional ML settings, the negotiated TID may be used for ML communication.

A plurality of links usable by the transmitting MLD and the receiving MLD related to ML communication may be configured through ML setup, and this may be referred to as an "enabled link". The "enabled link" may be called differently in various expressions. For example, it may be referred to as various expressions such as a first link, a second link, a transmission link, and a reception link.

After the ML setup is completed, the MLD may update the ML setup. For example, the MLD may transmit information about a new link when it is necessary to update information about the link. Information on the new link may be transmitted based on at least one a management frame, a control frame, and a data frame.

According to an embodiment, the MLD may include a non-AP MLD and an AP-MLD. The non-AP MLD and the AP-MLD may be classified according to the function of an access point (AP). The non-AP MLD and the AP-MLD may be physically separated or logically separated. For example, when the MLD performs an AP function, it may be referred to as an AP MLD, and when the MLD performs an STA function, it may be referred to as a non-AP MLD.

Hereinafter, in the present specification, an MLD has one or more STAs connected thereto and one MAC service access point (SAP) that is connected to a logical link control (LLC). The MLD may mean a physical device or mean a logical device. Hereinafter, the term device may mean an MLD.

Additionally, an MLD may include at least one STA being connected to each link of a multi-link. For example, a processor of an MLD may control the at least one STA. For example, the at least one STA may each be independently configured and may operate independently. The at least one STA may each include a processor and a transceiver. For example, the at least one STA may operate independently regardless of the processor of the MLD.

Hereinafter, for simplicity in the description, it will be described in the present disclosure that an MLD (or a processor of an MLD) controls at least one STA. However, the present disclosure will not be limited to this. As described above, the at least one STA may independently transmit and/or receive signals regardless of the MLD.

According to an embodiment, an AP MLD or a non-AP MLD may be configured to have a structure having multiple links. In other words, a non-AP MLD may support multiple links. A non-AP MLD may include a plurality of STAs. The plurality of STAs may have a link per STA.

The EHT specification (802.11be specification) considers a multi-link device (MLD) structure, wherein one AP/non-AP MLD supports multiple links, as a main technology. An STA that is included in a non-AP MLD may deliver (or transfer) information on other STAs within the non-AP MLD together through one link. Accordingly, this has an effect of reducing overhead of a frame exchange. Additionally, this also has the effect of increasing link usage efficiency and reducing power consumption of the STA.

FIG. 22 shows an exemplary structure of a non-AP MLD.

Referring to FIG. 22, a non-AP MLD may be configured to have a structure having multiple links. In other words, a non-AP MLD may support multiple links. A non-AP MLD may include a plurality of STAs. The plurality of STAs may have a link per STA. Although FIG. 22 shows an exemplary structure of a non-AP MLD, the structure of an AP MLD may also be configured identically as the non-AP MLD structure shown in FIG. 22.

For example, a non-AP MLD may include STA 1, STA 2, and STA 3. STA 1 may operate on Link 1. Link 1 may be included within a 5 GHz band. STA 2 may operate on Link 2. Link 2 may be included within a 6 GHz band. STA 3 may operate on Link 3. Link 3 may be included within a 5 GHz band. The bands in which Link 1/2/3 are included are merely exemplary, and, therefore, the links may also be included within 2.4, 5, and 6 GHz.

As described above, in case of the AP/non-AP MLD supporting multi-link, each AP of the AP MLD and each STA of the non-AP MLD may be connected to each link through a link setup process. And, the link that is connected at this point may be switched or reconnected to another link, by the AP MLD or non-AP MLD, depending upon the circumstances.

Additionally, in the EHT specification, in order to reduce power consumption, the link may be divided into an anchored link and a non-anchored link. An anchored link or a non-anchored link may be referred to as various terms. For example, an anchored link may be referred to as a primary link. And, a non-anchored link may be referred to as a secondary link.

According to an embodiment, an AP MLD supporting multi-link may manage the links by designating each link as an anchored link or a non-anchored link. The AP MLD may support one or more links, among the plurality of links, as anchored links. The non-AP MLD may use anchored links by selecting one or more of its anchored links from an anchored link list (i.e., a list of anchored links that are supported by the AP MLD).

For example, an anchored link may not only be used in a frame exchange for synchronization but may also be used for a non-data frame exchange (i.e., beacon and management frame). Additionally, a non-Anchored link may be used only for a data frame exchange.

During an idle period, the non-AP MLD may perform monitoring on (or monitor) only the anchored links in order to receive a beacon and management frame. Therefore, in case of the non-AP MLD, the non-AP MLD should be connected to at least one anchored link in order to receive a beacon and management frame. The one or more anchored links should always maintain an enable state. Conversely, a non-anchored link is used only for data frame exchange. Therefore, an STA corresponding to a non-anchored link (or an STA that is connected to a non-anchored link) may enter a doze mode during an idle period that does not used a channel/link. By doing so, this has an effect of reducing power consumption.

Hereinafter, a protocol enabling the AP MLD or non-AP MLD to dynamically recommend or request link reconnection for an efficient link connection, depending upon the circumstances, may be proposed. Additionally, hereinafter, in the present specification, an anchored link reconnection protocol, which is based on an anchored link that is not only used as a general link but also used for the purpose of power reduction, may be additionally proposed.

Embodiment for Link Switching and Reconnection

According to an embodiment, each link between an AP MLD and a non-AP MLD may be determined during an association or (re)association process. The AP MLD and the non-AP MLD may perform frame exchange through a link that is connected at this point. A detailed embodiment of an AP MLD and a non-AP MLD being connected through a link setup process may be described with reference to FIG. 23.

Figure 23:
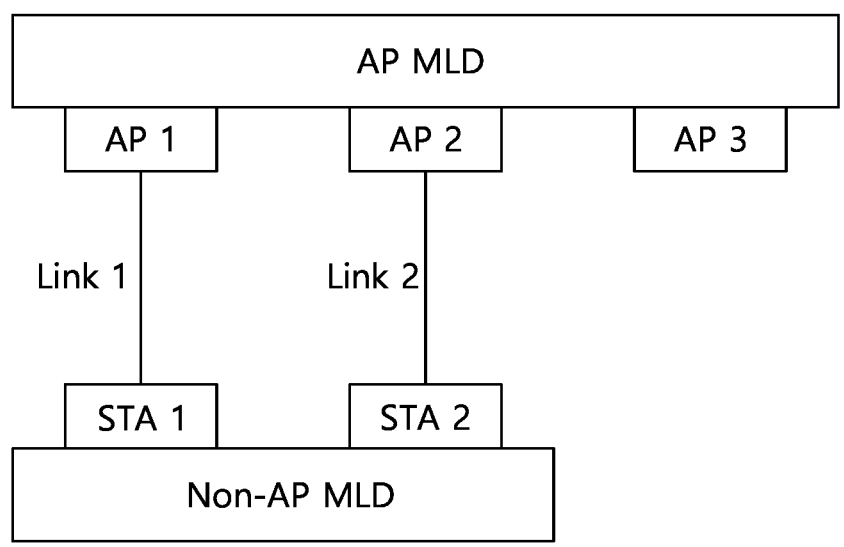
FIG. 23 shows an exemplary connection between an AP MLD and a non-AP MLD through a Link setup process.

FIG. 23 shows an exemplary connection between an AP MLD and a non-AP MLD through a Link setup process.

Referring to FIG. 23, an AP MLD may include AP 1, AP 2, and AP 3. And, a non-AP MLD may include STA 1 and STA 2. AP 1 and STA 1 may be connected through Link 1. And, AP 2 and STA 2 may be connected through Link 2.

For example, AP 1 and STA 1 may be connected by Link 1 through a first link setup process. AP 2 and STA 2 may be may be connected by Link 2 through a second link setup process. As another example, an AP MLD and a non-AP MLD may be connected through a single link setup process. In other words, an AP MLD and a non-AP MLD may be connected through Link 1 and Link 2 based on a single link setup process.

As described above, each AP and STA may perform frame exchange through its connected link. Additionally, information on other link(s) related to other APs or information on other link(s) related to other STAs may be transmitted and/or received through one link.

However, after performing the above-described link setup process, for a more efficient frame exchange (e.g., load balancing or interference avoiding, and so on) depending upon the circumstances/environment, the AP MLD or non-AP MLD may request a link switching or reconnection.

An embodiment related to link switching or reconnection may be described with reference to FIG. 24.

Figure 24:
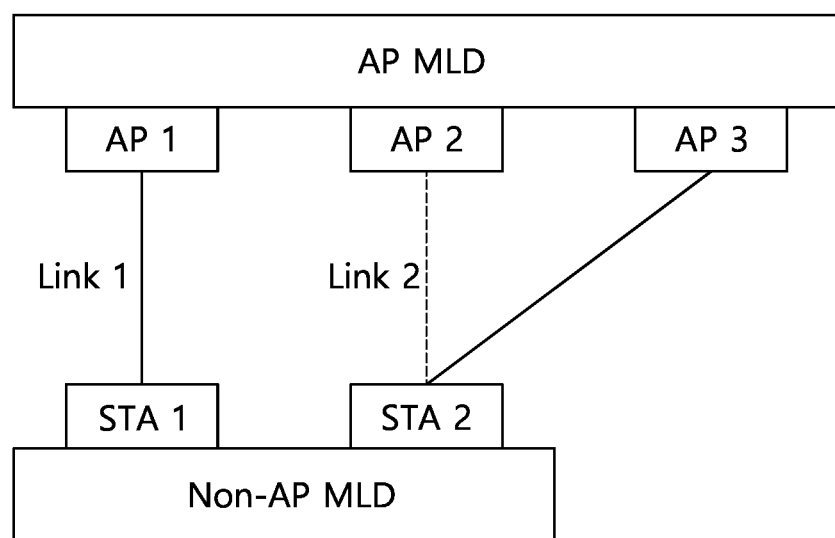
FIG. 24 shows an example of a link being switched or reconnected.

FIG. 24 shows an example of a link being switched or reconnected.

Referring to FIG. 24, in the existing structure, STA 2 is connected to AP 2. Thereafter, the data load of AP 2 may become excessive. Accordingly, STA 2 may be reconnected to AP 3, which has a comparatively smaller data load. In this case, this has an effect of enabling the AP MLD and the non-AP MLD to perform an efficient data exchange.

Figure 25:
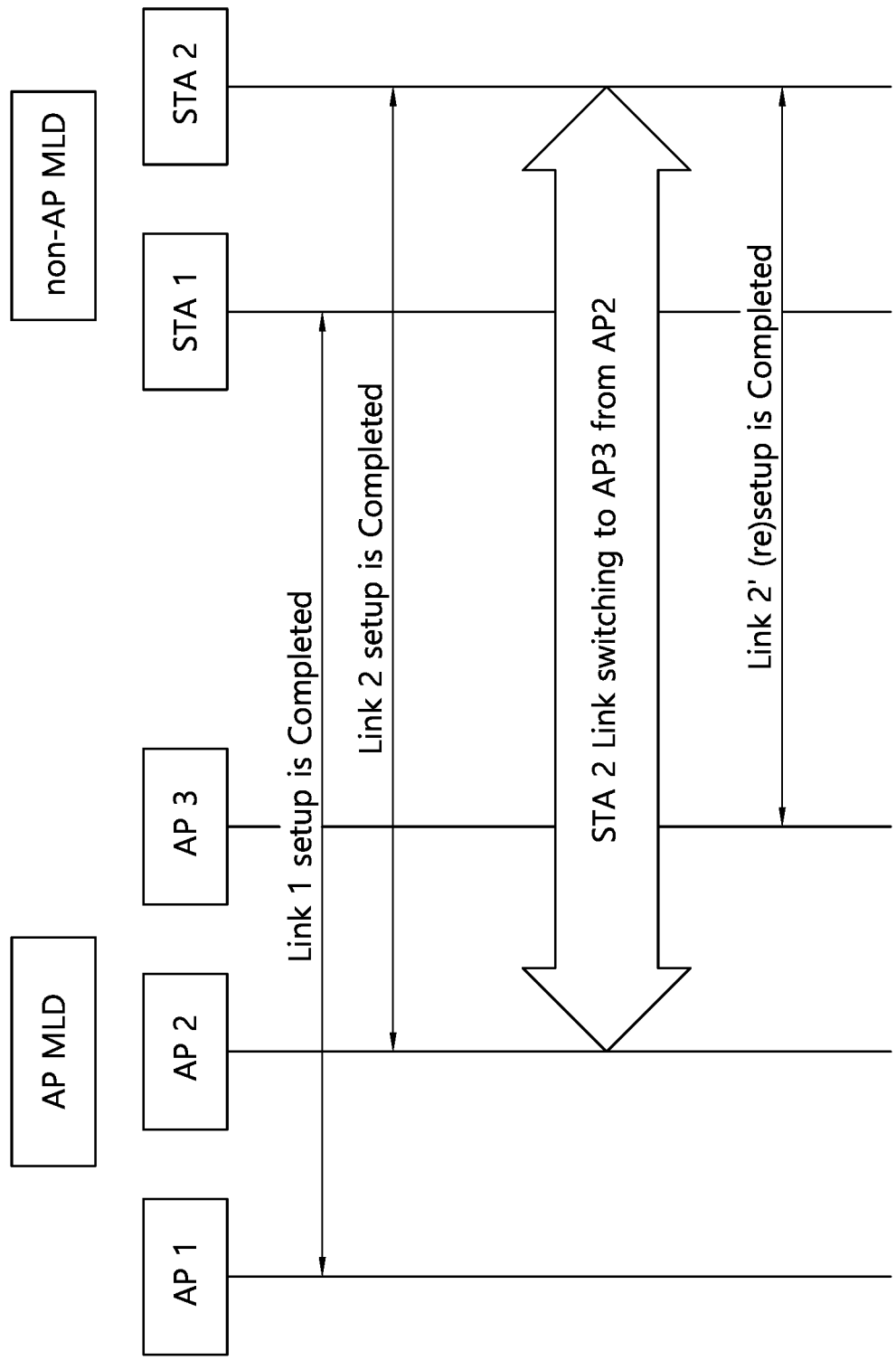
FIG. 25 shows a detailed example of a link being switched or reconnected.

FIG. 25 shows a detailed example of a link being switched or reconnected.

Referring to FIG. 25, AP 1 of the AP MLD may be connected to STA 1 of the non-AP MLD through Link 1. AP 2 of the AP MLD may be connected to STA 2 of the non-AP MLD through Link 2. Thereafter, STA 2 may attempt/request a connection to AP 3 through a link switching or reconnection, and STA 2 may be connected to AP 3 through Link 2, based on the link switching or reconnection.

According to an embodiment, the AP MLD and the non-AP MLD may transceive (or transmit and/or receive)/exchange various information per current link and information related to a link state. Therefore, the AP MLD and the non-AP MLD may select a link that is more appropriate (or adequate) for transmitting and/or receiving signals, based on the various information per current link and information related to the link state. For example, the various information per current link may include information on data traffic load per link and information on channel access capability between links. For example, the link state may be configured as disable or enable, and so on.

Hereinafter, in the present specification, a process during which an AP MLD/non-AP MLD negotiates with a non-AP MLD/AP MLD in order to request switching or reconnecting to a link other than the initially connected link, so as to increase its performance, may be referred to as "link switching negotiation". The term "Link switching negotiation" may also be referred to as many other terms, and, therefore, the term may also be changed.

Hereinafter, the link switching or reconnection process may be described by being divided into a case where the process is requested by an AP MLD and a case where the process is requested by a non-AP MLD.

Embodiment of an AP MLD Requesting Link Switching or Reconnection

According to an embodiment, an AP MLD may request a link switching or reconnection, to a non-AP MLD, for an efficient data transmission. For example, for load balancing, the AP MLD may request, to an STA, to switch or reconnect its link to a more efficient link based on data traffic of each AP.

For example, the AP MLD may calculate/verify/confirm (or finalize) a link that is appropriate for the STAs of the non-AP MLD, based on data traffic load information per AP and/or channel access capability information between each link (e.g., information related to Simultaneous TX/RX (STR) capability, and so on). Thereafter, the AP MLD may request, to the STA (or non-AP MLD), a link switching or reconnection, based on the data traffic load information per AP and/or channel access capability information between each link.

As described above, when requesting a link switching, the AP MLD may transmit information on a link that is considered to be the most appropriate link, to the AP MLD, through a request message. For example, the request message may include a beacon or management frame, and so on.

Regarding the above-described embodiment, an element or field including link information on the link that is considered to be most appropriate may be newly proposed. The newly proposed element or field may be defined as a "recommended link". The term "recommended link" is merely exemplary, and, therefore, the detailed term of the element or field may be changed.

recommend link (element/field): This is an element or field that enables the AP MLD to recommend a link that is most appropriate to an STA of the non-AP MLD, based on various information per link (e.g., data load per link, and so on). For example, the recommend link (element/field) may be indicated as link ID information of the AP MLD or AP BSS information, and so on. In other words, the recommend link (element/field) may include link ID information of the AP MLD or AP BSS information, and so on.

According to an embodiment, the recommend link (element/field) may be optionally included in a link switching response and may then be transmitted. For example, an STA may establish connection to the link that is recommended by the AP, based on the corresponding element/field (i.e., recommend link). As another example, an STA may also perform a connection request to a link other than the indicated link, based on the corresponding element/field (i.e., recommend Link) and additional information that the STA has (or possesses).

A detailed signal exchange process of the AP MLD and non-AP MLD according to the above-described embodiment may be described with reference to FIG. 26.

Figure 26:
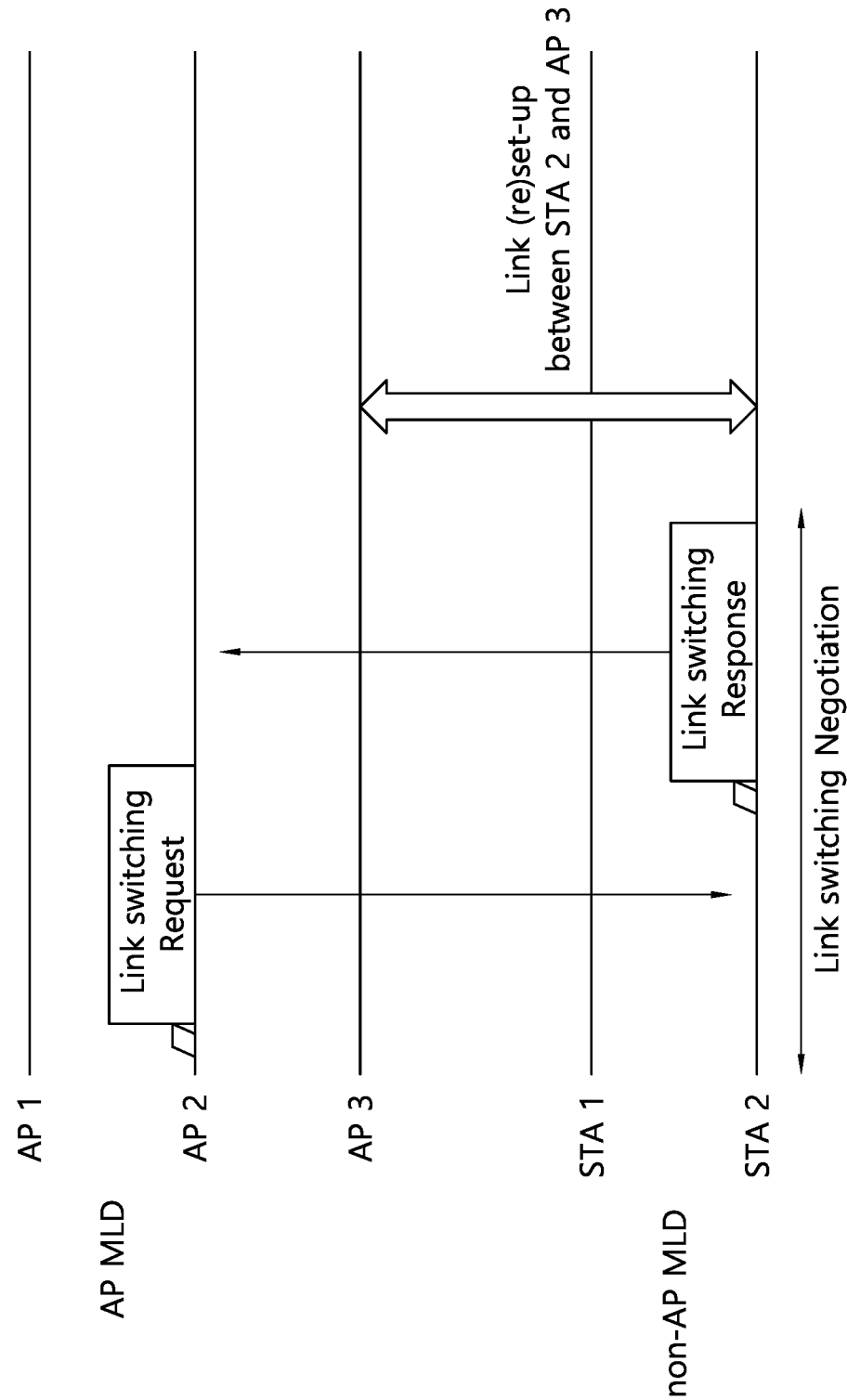
FIG. 26 shows operations of an AP MLD and a non-AP MLD for link switching or reconnection.

FIG. 26 shows operations of an AP MLD and a non-AP MLD for link switching or reconnection.

Referring to FIG. 26, in a situation where STA 2 is connected to AP 2 through Link 2, a large amount of data traffic may be concentrated to AP 2. In other words, in a situation where STA 2 is connected to AP 2 through Link 2, a large data traffic may occur in AP 2.

The AP MLD (or AP 2) may request, to the non-AP MLD (or STA 2), a reconnection to AP 3, which has a relatively smaller number of STA connections. Generally, a message for requesting reconnection is transmitted to an STA (i.e., STA 2) that wants to be reconnected. However, depending upon the situation (e.g., a channel situation or link state), the message may also be transmitted to any STA (i.e., other STA). In other words, an STA to which the request message for requesting reconnection (e.g., link switching request frame) is transmitted may be changed.

For example, when an STA that has received the request message for requesting the reconnection (i.e., STA 2) accepts the request, the STA may transmit a response message of "Accept" (e.g., link switching response frame). As another example, if the STA (i.e., STA 2) rejects (or declines) the request, the STA may transmit a response message of "Decline".

In case of the response message, the STA (i.e., STA 2) that accepts the reconnection generally transmits the response message to the initial link (the connection link before the reconnection). However, by using the characteristics of a multi-link, the response message may also be transmitted through any other link (i.e., other STA).

If STA 2 accepts the link reconnection request, after transmitting the response message, STA 2 may disconnect its initial connection to AP 2 and may request a link reconnection with AP 3. At this point, the reconnection request process may be performed identically as the existing link setup process between the MLDs. After completing the link setup process between AP 3 and STA 2, STA 2 may perform a frame exchange with AP 3 through Link 2.

Conversely, if STA 2 declines the link reconnection request, STA 2 and AP 2 may continue to use their initially connected link (i.e., Link 2) as it is.

According to an embodiment, when the AP request for a link switching to the STA, and when an adequate link is recommended, the STA may switch or may not switch the link to the recommended link. For example, in order to enable the AP to recommend an appropriate link to the STA, the above-described recommend link may be used.

For example, as a response message to the request message for requesting a reconnection of the AP, the STA may accept the link switching. The STA may accept/verify the link switching to the recommended link, and the STA may also request other link switching to the AP, based on other information apart from the information included in the request message.

Therefore, the AP needs to notify the STA of the acceptance or non-acceptance (or declination) of the response message. For this, the AP may transmit, to the STA, a confirmation message (e.g., link switching confirmation frame) corresponding to the response message (e.g., link switching response frame) of the STA.

Detailed operations of the AP MLD and the non-AP MLD according to the above-described embodiment may be described with reference to FIG. 27.

Figure 27:
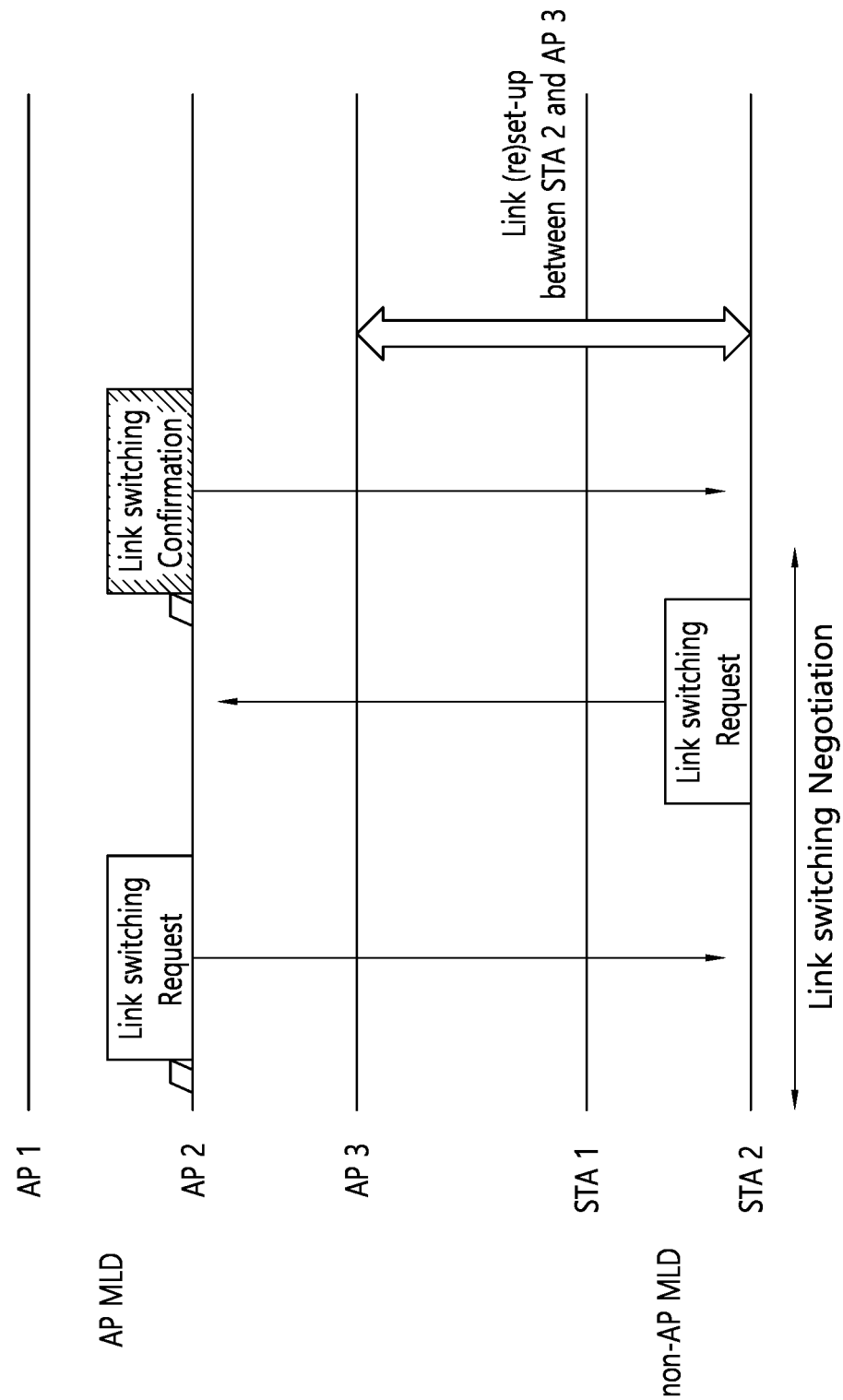
FIG. 27 shows operations of an AP MLD and a non-AP MLD for link switching or reconnection.

FIG. 27 shows operations of an AP MLD and a non-AP MLD for link switching or reconnection.

Referring to FIG. 27, AP 2 may request for a link switching to STA 2 including recommended link information. In other words, AP 2 may transmit, to STA 2, a link switching request frame including recommended link information.

STA 2 may transmit acceptance or declination of the link request through a link switching response frame.

For example, when the link switching is accepted, STA 2 may include information on the link that is to be switched to the link switching response frame and may then transmit the link switching response frame. At this point, the information on the link that is to be switched may be the same or may not be the same as the recommended link.

As another example, when STA 2 selects another link other than the recommended link that is provided by AP 2 and responds to the request through the link switching response frame, the AP may transmit a message corresponding to a final acceptance or non-acceptance to the response to the STA. The corresponding message may be referred to as a link switching confirmation frame.

For example, AP 2 may accept the link switching to the link designated by STA 2, through the link switching confirmation frame. STA 2 may attempt to perform the link switching to its designated link, based on the link switching confirmation frame.

As another example, AP 2 may decline the link switching to the link designed by STA 2, through the link switching confirmation frame. STA 2 and AP 2 may maintain their connections to their initial link without any link switching.

The embodiment shown in FIG. 27 may also be applied to a case where the AP has transmitted a link switching request frame without including the recommended link information. For example, when the AP (e.g., AP 2) has transmitted the link switching request frame to the STA (e.g., STA 2) without including any recommended link information, after directly designating the link that is to be switched, based on the information belonging to (or possessed by) the STA, the STA may response to the AP through the link switching response frame. In this case, also, the AP should transmit a link switching confirmation frame corresponding to a final acceptance. Therefore, an embodiment of the AP transmitting a link switching confirmation frame, even in a case where the recommended link information is not included in the link switching request frame, may be applied.

Embodiment of a Non-AP MLD Requesting Link Switching or Reconnection Non-AP MLD

According to an embodiment, a non-AP MLD may request link switching or reconnection to an AP MLD for efficient data transmission. For example, in order to use STR capability when performing data transmission, the non-AP MLD may request, to the AP MLD, switching or reconnection of the connected link.

Figure 28:
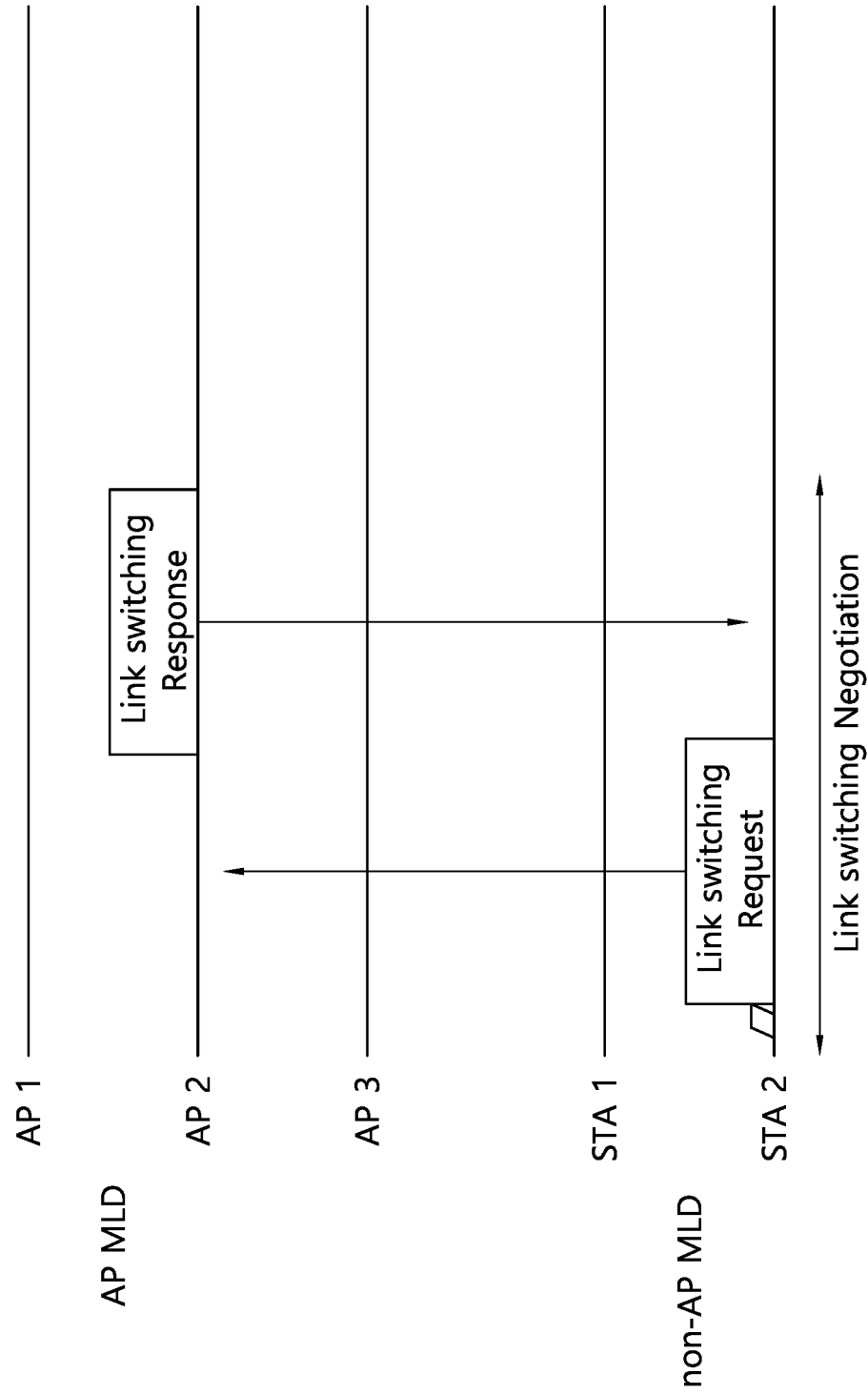
FIG. 28 shows operations of an AP MLD and a non-AP MLD for link switching or reconnection.

FIG. 28 shows operations of an AP MLD and a non-AP MLD for link switching or reconnection.

Referring to FIG. 28, an AP MLD and a non-AP MLD may perform link switching negotiation. STA 2 of the non-AP MLD may transmit a link switching request frame to AP 2 of the AP MLD. As a response to the link switching request frame, AP 2 of the AP MLD may transmit a link switching response frame to STA 2 of the non-AP MLD. Although the link switching request frame or link switching response frame may be transmitted and/or received through a link, which is the target of the switching, the present disclosure will not be limited only to this. The link switching request frame or link switching response frame may not only be transmitted/received through also be a link, which is the target of the switching, but may also be transmitted through other various links.

A non-AP MLD may request link switching or reconnection through various methods. Hereinafter, 3 different methods for requesting link switching or reconnection by the non-AP MLD may be proposed. More specifically, the 3 different methods may be described in the order of a solicited method, an unsolicited method, and a general method.

1) Solicited method: This is a method for requesting various information for link (re)selection, by a non-AP MLD to an AP MLD, and requesting link (re)selection, by the non-AP MLD, based on the received information. According to an embodiment, a method for requesting information of other APs of a connected AP MLD, by an STA, may not only be used for a case of reconfiguring a link but may also be used for various other cases. Therefore, the AP that has received an information request message may transmit all of capability information, BSS parameter information, critical parameters, and/or operation element information, and so on, for all APs within the AP MLD. The above-described example may all be applied to the embodiment that will be described as follows.

2) Unsolicited method: This is a method for transmitting various information for link (re)selection, by an AP, and requesting link (re)selection, by the AP, based on the received information, without having a non-AP MLD make any separate information request. According to an embodiment, a method for requesting information of other APs of a connected AP MLD, by an STA, may not only be used for a case of reconfiguring a link but may also be used for various other cases. Therefore, the AP that has received an information request message may transmit all of capability information, BSS parameter information, critical parameters, and/or operation element information, and so on, for all APs within the AP MLD. The above-described example may all be applied to the embodiment that will be described as follows.

3) General method: This is a method of requesting a link (re)selection, by a non-AP MLD, without additional information based on various information that are obtained through a previous beacon frame.

1) Solicited Method

Hereinafter, an embodiment related to the above-described solicited method may first be described.

According to the embodiment, a non-AP MLD may request, to an AP MLD, information for selecting an appropriate link before the link switching or reconnection. An STA may use data load information per AP or capability information per link (or information of other links) for selecting the appropriate link.

For example, the capability information per link may be included in a beacon frame, and so on, and periodically transmitted.

As another information, as optional information, the capability information per link may not be included in a beacon frame, which is transmitted at each cycle period. Alternatively, in order to reduce frame overhead, an STA may receive only the information of a connected link or the information of an associated part of a link. Alternatively, when a beacon reception cycle period is long due to the characteristics of a non-AP MLD (e.g., low-power device), the non-AP MLD may not be capable of receiving the capability information per link for selecting a more appropriate link.

In the above-described cases, the non-AP MLD may request recent information of the capability information per link and information per link of the AP MLD. The links corresponding to the capability information per link and information per link may not only include the link being transmitted and/or received but may also include other link(s). For example, a field of a QoS data frame (A-Control field of the 11ax specification), a management frame, a probe response frame, a PS-poll frame or a null frame may be used for requesting/transmitting recent information. Alternatively, in order to request/transmit recent information, a separate new frame may be defined.

According to an embodiment, in order to request recent information of the capability information per link and information per link of the AP MLD, the STA may transmit, to an AP, a request message requesting information needed for link reselection. For example, a probe request frame that is defined in the related art may be reused for the request message. As another example, a new frame for the request message may also be defined.

According to an embodiment, the STA may designate specific information that is needed and may request the designated information to the AP. The specific information that may be designated may be changed depending upon the circumstances. That is, the STA may request only the information corresponding to a specific link or may request only the information corresponding to a specific capability. For example, the information corresponding to a specific link may include information related to BSS load/parameters of a specific link. Additionally, the information corresponding to a capability may include BSS load information of all links or BSS load information of a specific link. In this case, the AP may transmit only the information designated by the STA through a response message. A detailed embodiment related to the specific information request and response may be described through an embodiment related to the definition and operation of IOM.

As another example, the STA may request all capability information (e.g., including information of other link(s)) currently carried by the AP MLD through the request message.

As described in the above-described example, an embodiment for transmitting all information carried by the AP or an embodiment for transmitting only specific information designated by the STA may be variously defined/configured. For example, the AP may transmit all information or designated information based on a separate field or bitmap, and so on.

Generally, although a message requesting information to the AP MLD may be transmitted through an STA requesting reconnection, the message may also be transmitted to any STA (i.e., other STA(s)) depending upon the circumstances (channel situation or link state).

The AP MLD that has received the request message may transmit, to the non-AP MLD, a response message (i.e., information message) including the recent information (e.g., data load information per link, STR capability information between links, and so on) that is needed for link reselection. For example, when a probe request frame of the prior art specification is reused for the request message, the AP (or AP MLD) should respond to the request message by using a probe response frame as the response message.

Although the response message may also be generally transmitted through the AP that has received the request message, the response message may also be transmitted to any AP (i.e., other AP(s)) by using the characteristics of a multi-link.

Optionally, the AP MLD may transmit a "recommend link" element, which recommends an appropriate link to the STA, together through a response message including the above-described various information (e.g., recent information needed for link reselection).

Hereinafter, in order to be differentiated from a request message for link switching and a response message for link switching, the above-described request message and response message may be described as an information request message and an information response message.

The STA may reselect an appropriate link and request a link switching or reconnection, to the AP MLD, through a request message for link switching, based on the information included in the above-described information response message. The request message for link switching may include information on the AP that is to be reconnected to the corresponding STA and link information.

When the AP MLD that has received the request message accepts the request, the AP MLD may transmit a response message of "Accept". And, when the AP MLD rejects (or declines) the request, the AP MLD may transmit a response message of "Decline".

When the request is accepted, the AP may perform link (re)setup based on a frame exchange through a link with a reselected AP starting from after the response message transmission. Conversely, when the request is declined, the STA may continue to use its initially connected link as it is.

An example of detailed AP MLD and non-AP MLD operations according to the solicited method may be described with reference to FIG. 29.

Figure 29:
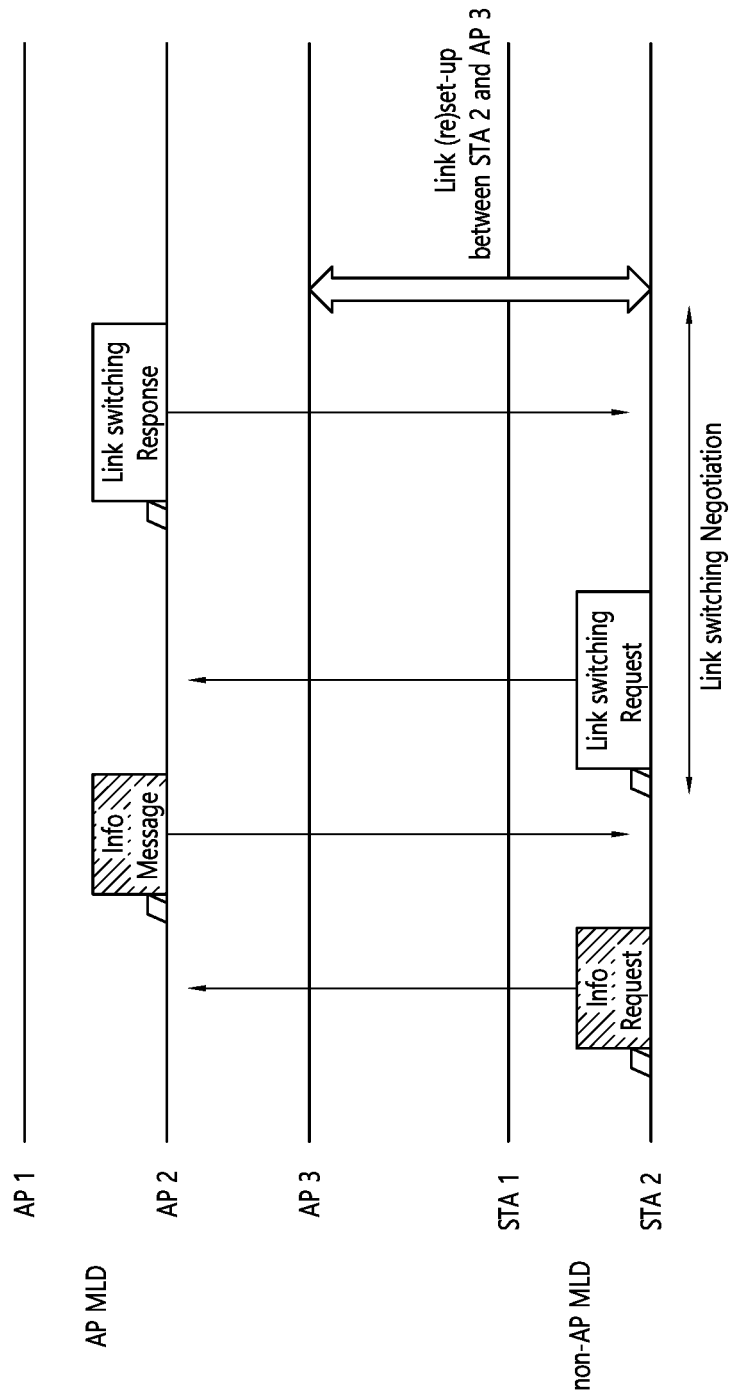
FIG. 29 shows operations of an AP MLD and a non-AP MLD for link switching or reconnection.

FIG. 29 shows operations of an AP MLD and a non-AP MLD for link switching or reconnection.

Referring to FIG. 29, when STA 2 of a non-AP MLD wants to reselect its connected link, STA 2 may transmit an info request message to the non-AP MLD through Link 2. After receiving the info request message, the AP MLD may transmit an info response message including information that is needed for the link reselection of the non-AP MLD. STA 2 of the non-AP MLD may transmit a request message for link switching (i.e., link switching request frame) to AP 2 of the AP MLD, based on the information included in the above-described info response message. Thereafter, STA 2 may receive a response message for link switching (i.e., link switching request frame) and may perform link (re)set-up for link switching.

The embodiment related to information request that is proposed in the present specification may also be used/applied to a case where the STA requests necessary (or needed) information to the AP. When the information included in the frame (e.g., beacon) received by the STA from the AP is insufficient, the STA may request the insufficient (or lacking) information to the AP. For example, when the AP transmits only the information on a connected link without including information on other link(s), or when the AP transmits only information related to update or non-update on information of other link(s), the STA may request the insufficient (or lacking) information to the AP.

A detailed example of the embodiment may be described with reference to FIG. 30.

Figure 30:
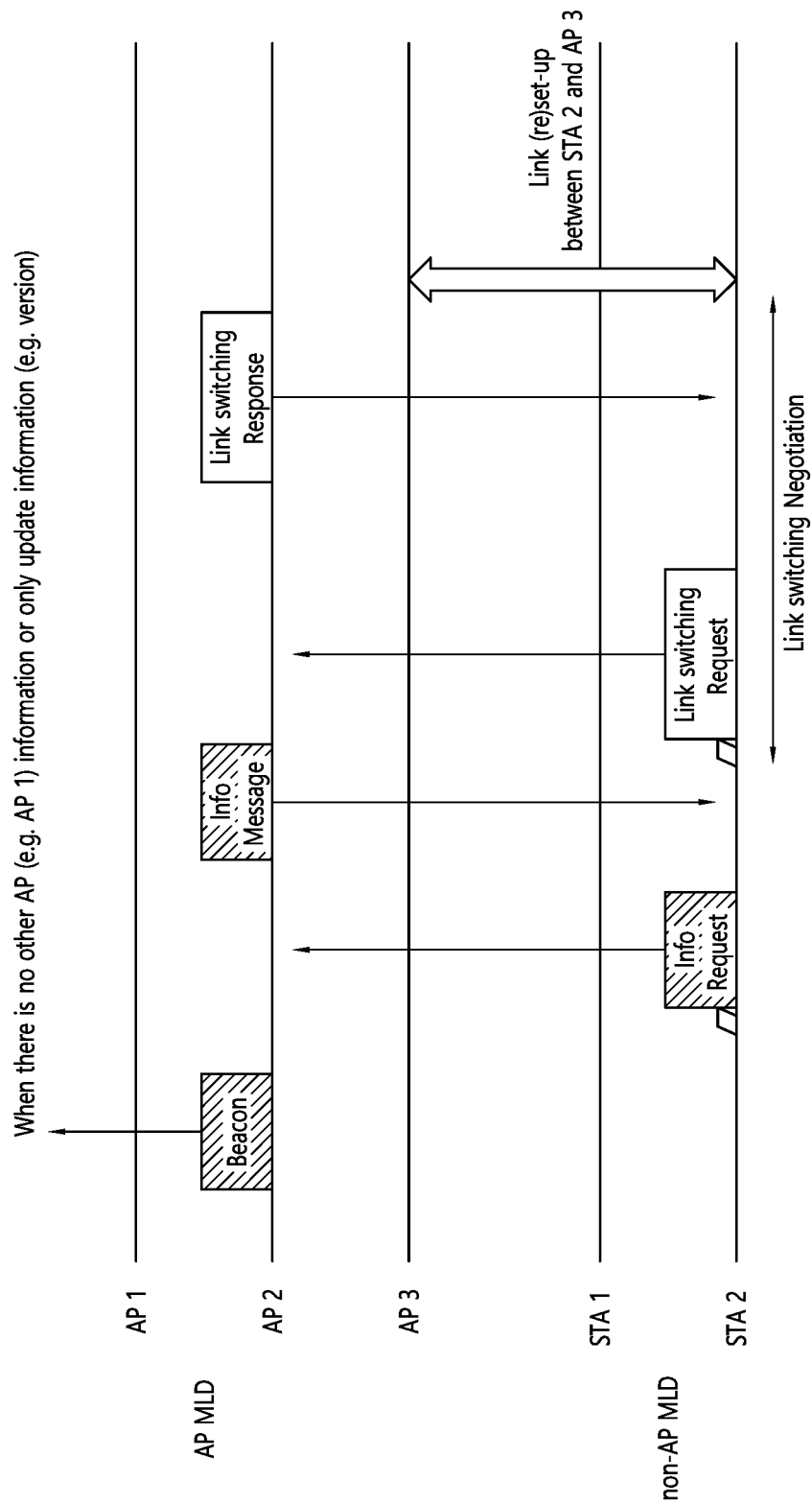
FIG. 30 shows an operation on a non-AP MLD for requesting information on other AP(s).

FIG. 30 shows an operation on a non-AP MLD for requesting information on other AP(s).

Referring to FIG. 30, an AP MLD (or AP 1 to AP 3) may transmit only information related to the update or non-update on information of other AP(s) (i.e., link(s)) to an STA through a beacon frame. Therefore, STA 2 may transmit an info request message (or info request frame) to AP 2. STA 2 may receive an info response message (or info message) based on the info request message. STA 2 may receive/obtain information related to other AP(s) based on the info response message.

For example, other AP information (e.g., BBS load, and so on) of the AP MLD may not be included in the beacon, or AP 2 may transmit only the information related to the update or non-update (e.g., version/update version) on the other AP information.

STA 2 may need information of AP 1 (or information related to AP 1). STA 2 may request the necessary information through AP 2. STA 2 may obtain information of AP 1 through a response message to the request. STA 2 may use the information of AP 1 for reselecting an appropriate link for link switching. For example, a frame for link switching may be variously configured.

Hereinafter, a new element/field including information for selecting an appropriate link, by an STA of the non-AP MLD, may be proposed.

For example, an "STA ratio per Link" (element/field) may be proposed. The "STA ratio per Link" may include information related to a number of connected STAs ratio per link. A detailed example of the "STA ratio per Link" may be described with reference to FIG. 31.

Figure 31:
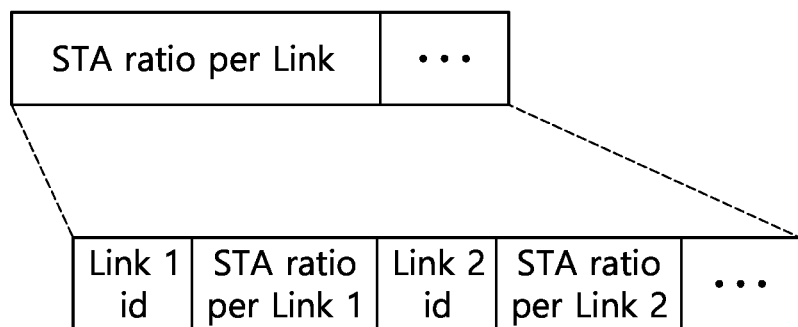
FIG. 31 shows a detailed example of an STA ratio per Link

FIG. 31 shows a detailed example of an STA ratio per Link.

Referring to FIG. 31, the STA ratio per Link (element/field) may include information related to a number of STAs or STA ratio being connected to each link in the entire AP MLD.

For example, when a total of 50 STAs are connected to an AP MLD having 3 links, 10 STAs may be connected to Link 1, and 20 STAs may be connected to Link 2. The AP MLD may transmit information on the connected STAs per link as information related to a value or ratio (%), to the non-AP MLD, through the STA ratio per Link (element/field).

For example, when information on the connected STAs per link is expressed as a value, Link 1 may be expressed/configured as 10, and Link 2 may be expressed/configured as 20. Therefore, the value of STA ratio per Link 1 may be configured to be equal to 10. Additionally, the value of STA ratio per Link 2 may be configured to be equal to 20.

As another example, when information on the connected STAs per link is expressed as a ratio, Link 1 may be expressed/configured as 20 (10/50)%, and Link 2 may be expressed/configured as 40 (20/50)%. Therefore, the value of STA ratio per Link 1 may be configured to be equal to 20. Additionally, the value of STA ratio per Link 2 may be configured to be equal to 40.

The above-described example is merely exemplary, and the information on the connected STAs per link may be variously configured. Apart from the above-described example, the information on the connected STAs per link may be configured to be equal to a relative value.

The STA may verify/obtain a number and ratio of STAs being connected per link, based on the above-described information on the connected STAs per link, and this may be used as information for link selection.

According to an embodiment, apart from the above-described "STA ratio per Link" (element/field), various information/element(s)/field(s) may be included in an information response message. For example, the following information/element(s)/field(s) may be included in an information response message.

BSS load information per AP
STR capability information between links
TXOP information per link
NAV information per link Recommended link information (i.e., "recommend Link" element)

Connected STA ratio information per link (i.e., "STA ratio per Link" element)

other

Apart from the above-described information/element(s)/field(s), various information needed for link selection may be included in the information response message and may then be transmitted.

The STA that has received information, such as the information described in the above-described example, selects an AP that the STA intends to switch or reconnect, based on the received information, and, then, the STA may transmit a request message for requesting reconnection of the link. When the AP MLD that has received the request message accepts the request, the AP MLD may transmit a response message of "Accept". And, when the AP MLD rejects (or declines) the request, the AP MLD may transmit a response message of "Decline".

When the request is accepted, the AP may perform a frame exchange through a link with the reselected AP starting from after the response message transmission. Conversely, when the request is declined, the STA may continue to use its initially connected link as it is.

2) Unsolicited Method

Unlike the solicited method, wherein the non-AP MLD directly requests additional information, according to the unsolicited method, the AP MLD may transmit additional information to the non-AP MLD through a beacon frame or a separate frame (e.g., field of a QoS data frame (A-Control field of the flax specification), management frame, FILS discovery frame, unsolicited probe response frame, PS-Poll frame or null frame, and so on) without any additional information request from the non-AP MLD. As another example, a new frame may be defined as a frame for transmitting additional information to the non-AP MLD.

For example, when a beacon period is rather long, the mandatory information needed for link switching by the non-AP MLD may be insufficient or may not be the recent information. Therefore, the AP may transmit a frame including link capability information of the AP MLD to the non-AP MLD. Thereafter, the non-AP STA may obtain recent information on the capability per link of the AP MLD. The frame may be periodically transmitted or may be aperiodically transmitted.

For example, when the frame is transmitted periodically, the AP may transmit a frame for sharing the recent information of the AP. At this point, the time interval should be shorter than the cycle period of the beacon that is transmitted by the AP. Additionally, when a FILS Discovery frame is used as the frame, the frame may be transmitted for each 20 us. As another example, a cycle period that is negotiated through a capability negotiation between the AP and the STA may also be used. For example, a transmission period may be indicated through "periodic" field and "interval" field/subfield values of an IOM capability element.

As another example, when the frame is transmitted aperiodically, the AP may transmit the frame each time an update event occurs in the information (capability, BSS parameter, operation element) of the AP. As a detailed example, each time the link capability of the AP changes, the changed information may be transmitted to the connected STA. In this case, the STA may maintain the recent information on the link capability.

According to the above-described example, since the non-AP STA does not transmit a separate request message for obtaining a link capability, this may have an effect of a frame exchange overhead occurring relatively less as compared to the solicited method. Additionally, since the STA may receive updated information each time main information is updated, this may have an effect of enabling the STA to usefully use the received information.

An example of detailed AP MLD and non-AP MLD operations according to the unsolicited method may be described with reference to FIG. 32.

Figure 32:
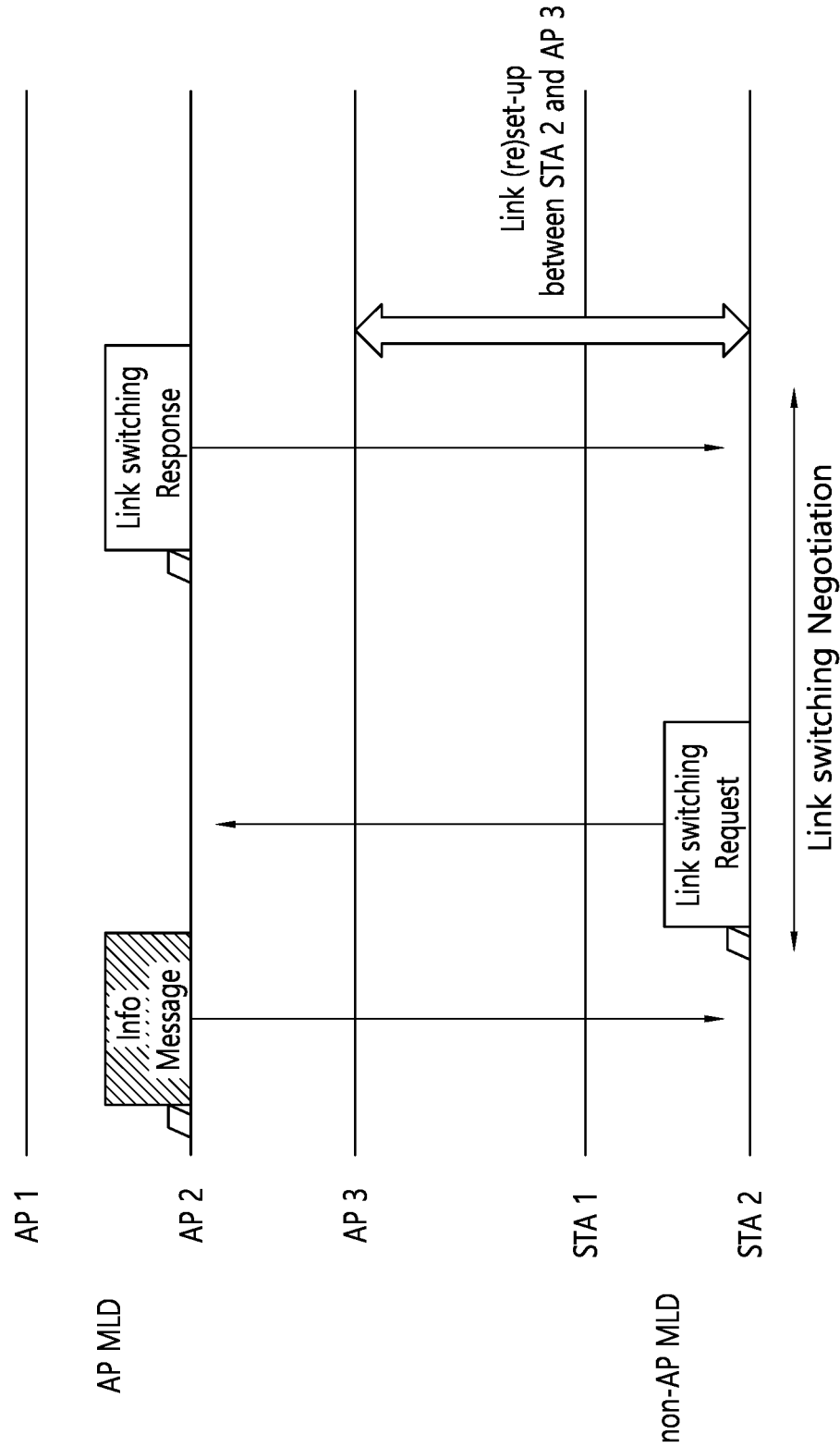
FIG. 32 shows operations of an AP MLD and a non-AP MLD for link switching or reconnection.

FIG. 32 shows operations of an AP MLD and a non-AP MLD for link switching or reconnection.

Referring to FIG. 32, the AP MLD may transmit mandatory information required for link reselection without any separate request message from the non-AP MLD to the non-AP MLD through a separate frame (e.g., info message).

According to an embodiment, unlike FIG. 32, the AP MLD may transmit, to an STA, information on link capability through a field of a DL frame (e.g., QoS data frame), which the AP MLD transmits to the non-AP MLD, without any separate request message from the non-AP MLD. The operations of the AP MLD and the non-AP MLD according to the embodiment may be described with reference to FIG. 33.

Figure 33:
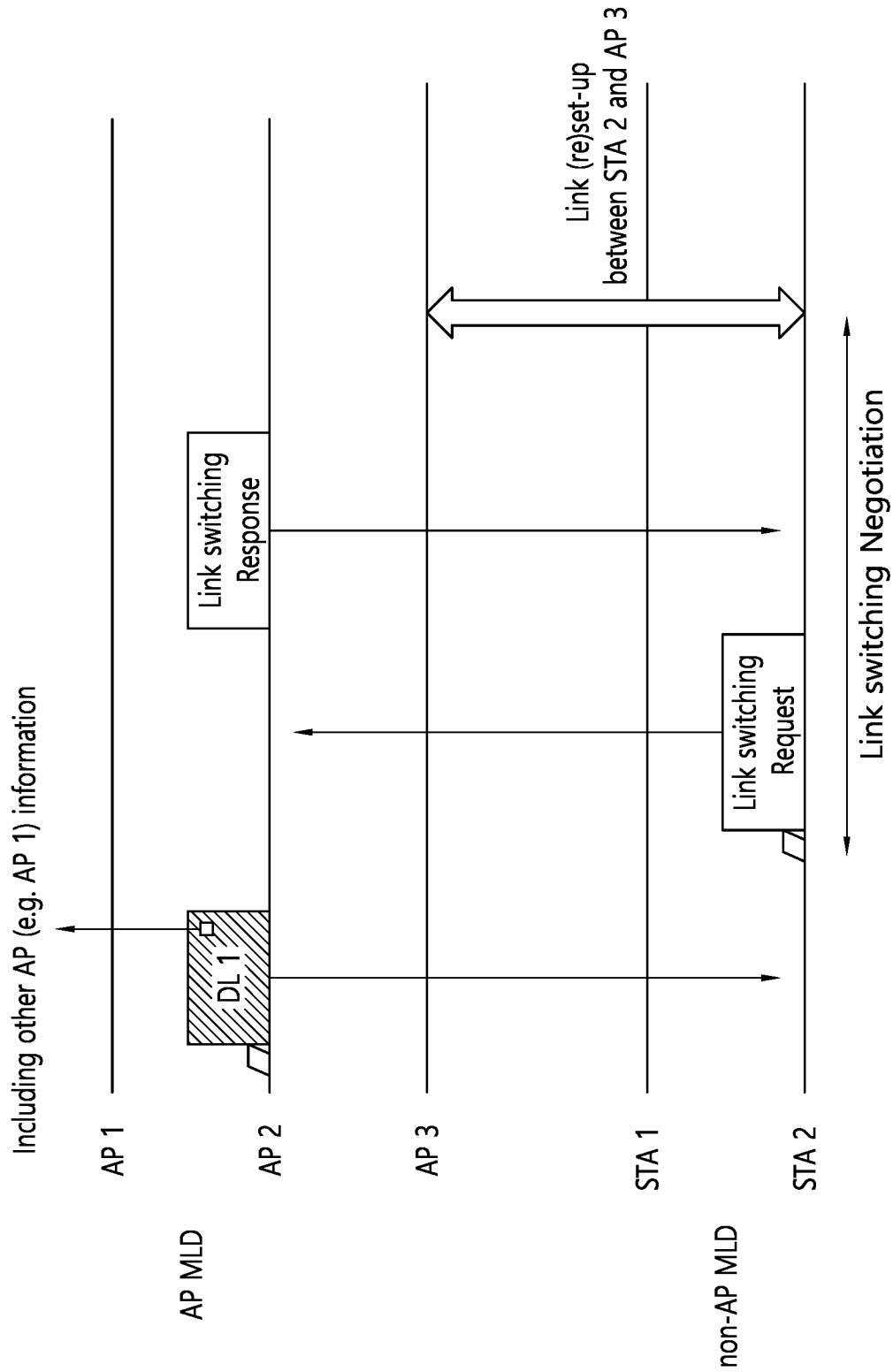
FIG. 33 shows operations of an AP MLD and a non-AP MLD for link switching or reconnection.

FIG. 33 shows operations of an AP MLD and a non-AP MLD for link switching or reconnection.

Referring to FIG. 33, AP 2 may transmit information of another AP (or information related to another AP) to STA 2, based on a DL frame (i.e., DL 1). In other words, the DL frame may include information related to another AP. For example, the information on the other AP may be included in an A-Control field, and so on, of the 802.11ax specification. According to the embodiment, since an existing DL frame is used without any separate message, this has an effect of reducing frame overhead. If real-time of the information is needed due to a change in critical information of the other AP, update information may be transmitted through a separate message as shown in the embodiment of FIG. 32.

For example, critical information of the AP may include A to Q, as follows.

A. Inclusion of a Channel Switch Announcement element

B. Inclusion of an Extended Channel Switch Announcement element

C. Modification of the EDCA parameters element

D. Inclusion of a Quiet element

E. Modification of the DSSS Parameter Set

F. Modification of the CF Parameter Set element

G. Modification of the HT Operation element

H. Inclusion of a Wide Bandwidth Channel Switch element

I. Inclusion of a Channel Switch Wrapper element

J. Inclusion of an Operating Mode Notification element

K. Inclusion of a Quiet Channel element

L. Modification of the VHT Operation element

M. Modification of the HE Operation element

N. Insertion of a Broadcast TWT element

O. Inclusion of the BSS Color Change Announcement element

P. Modification of the MU EDCA Parameter Set element

Q. Modification of the Spatial Reuse Parameter Set element

Therefore, the non-AP MLD may obtain recent link capability information regardless of the cycle period (or periodicity) of the beacon frame. The non-AP MLD may select an appropriate link when performing link switching, based on information that is received. The STA may reselect an appropriate link and may request the AP MLD for link switching or reselection, based on the received information. The request information may include information on the AP and information on the link to which the STA is to be reconnected. Additionally, when the AP MLD that has received the request message accepts the request, the AP MLD may transmit a response message of "Accept". And, when the AP MLD rejects (or declines) the request, the AP MLD may transmit a response message of "Decline".

When the request is accepted, the AP may perform link (re)setup through a frame exchange with a link of a reselected AP starting from after the response message transmission. Conversely, when the request is declined, the STA may continue to use its initially connected link as it is.

3) General Method

According to a general method, the non-AP MLD may request link switching or reconnection without any additional information request based on the information the non-AP MLD currently carries (or possesses). The information that is used at this point may include information on the AP MLD and information on the non-AP MLD (e.g., information on STR capability per link, information on link state (enable/disable), and so on) that are included in a previously received beacon or management frame, and so on.

Unlike the unsolicited method, the STA may transmit, to the APMLD, a request message for link switching or reselection without any separate information request to the AP MLD. The request message may include information on the AP and information on the link to which the STA is to be reconnected. When the AP MLD that has received the request message accepts the request, the AP MLD may transmit a response message of "Accept". And, when the AP MLD rejects (or declines) the request, the AP MLD may transmit a response message of "Decline".

When the request is accepted, the AP may perform link (re)setup through a frame exchange with a link of a reselected AP starting from after the response message transmission. Conversely, when the request is declined, the STA may continue to use its initially connected link as it is.

An example of detailed AP MLD and non-AP MLD operations according to the general method may be described with reference to FIG. 32.

Figure 34:
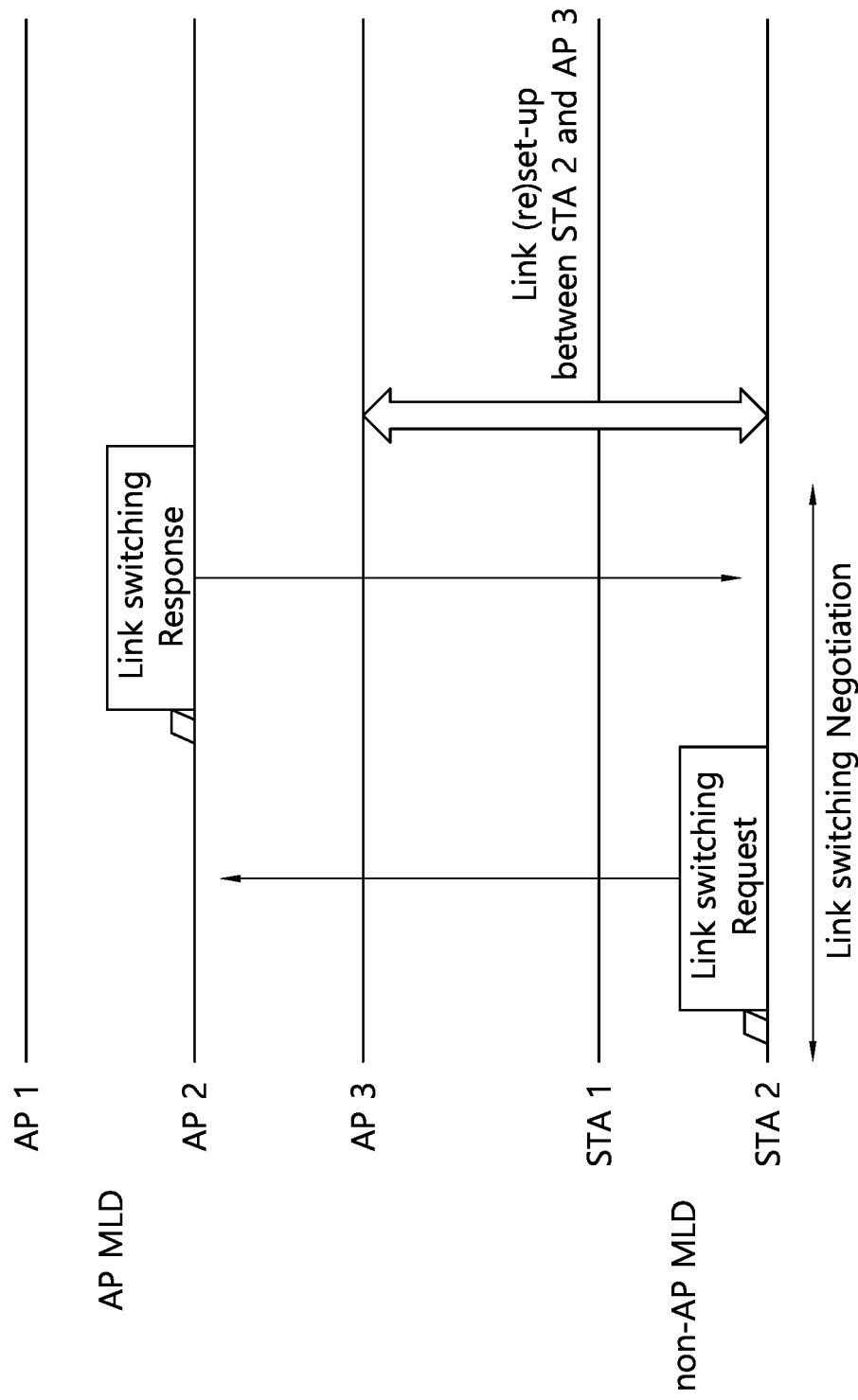
FIG. 34 shows operations of an AP MLD and a non-AP MLD for link switching or reconnection.

FIG. 34 shows operations of an AP MLD and a non-AP MLD for link switching or reconnection.

Referring to FIG. 34, STA 2 may want to directly switch its link for reasons of ensuring QoS. If STA 2 has existing information received from the AP MLD (e.g., information received through a beacon frame or management frame, and so on), or if STA 2 has already determined the link it wishes to be reconnected to, STA 2 may request link switching or reconnection without any separate information request.

STA 2 may transmit STA information (e.g., STA ID, and so on) and information on the link that is intended to be switched (e.g., Link ID or AP BSS information, and so on) by including the corresponding information in a link switching request frame. When the AP MLD that has received the request frame accepts the request, the AP MLD may transmit, to STA 3, a link switching response frame of "Accept" through the existing Link 2. Thereafter, after performing a link (re)setup process, STA 2 of the non-AP MLD may be reconnected to AP 3.

Embodiment for Anchored Link Switching and Reconnection

According to an embodiment, an AP MLD may support an anchored link. When the AP MLF supports an anchored link, additional detailed are considered in the above-described embodiment for link switching and reconnection.

The AP MLD may support one anchored link or more than one anchored links, and the AP MLD may provide information on the one anchored link or more than one anchored links to a non-AP MLD through an anchored link list information/element. The non-AP MLD may select one link or more than one links from the above-described anchored link list and may use the selected link(s). The remaining links that are not selected as the anchored link(s) may operate as non-anchored links.

The anchored link and the non-anchored link have a trade-off relation in the aspect of power consumption and in the aspect of data load. That is, when the non-AP MLD uses one anchored link, the amount of power consumption may be reduced. However, it may be difficult to ensure data (most particularly, data for beacon and management frame) transmission QoS. Conversely, when a plurality of anchored links are used, data transmission QoS may be ensured. However, the amount of power reduction may be reduced.

Therefore, the non-AP MLD should be capable of dynamically requesting reselection on an anchored link for efficient data exchange. Therefore, hereinafter, an embodiment for dynamically requesting anchored link switching/reselection, by a non-AP MLD may be proposed.

Firstly, an MLD structure supporting anchored link(s) may be described with reference to FIG. 35.

Figure 35:
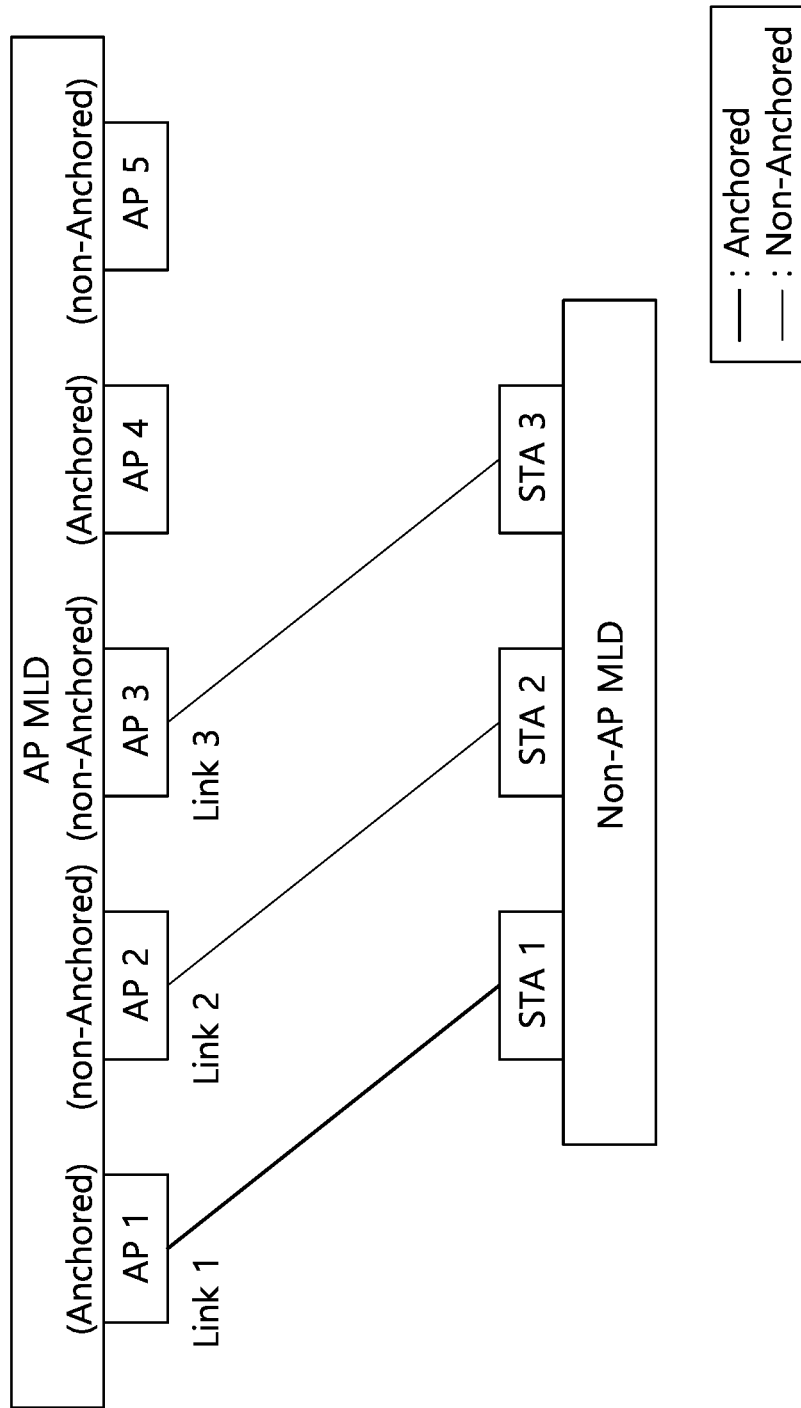
FIG. 35 shows an example of an MLD structure supporting anchored link(s).

FIG. 35 shows an example of an MLD structure supporting anchored link(s).

Referring to FIG. 35, an AP MLD may use 2 links (i.e., AP 1 and AP 4) as anchored links among 5 links. A non-AP MLD may use one anchored link by selecting Link 1 from the two links that are used as anchored links. The remaining links of the non-AP MLD may be connected to non-anchored links (Link 2, Link 3). That is, the non-AP MLD should always perform monitoring on Link 1 for beacon and management frame reception.

According to an embodiment, STA 1 may request the anchored link it was initially used from the anchored link of AP 1 to the anchored link of AP 4 for reasons of load balancing, and so on. In order to switch the anchored link, the above-described embodiment related to link switching may be applied.

However, among the links being supported by the AP MLD, the anchored link(s) is/are limited only to part of the links. Therefore, the AP MLD may have a separate anchored link list. The non-AP MLD (or STA) should select one link that is included in the anchored link list and may then request for switching or reconnection. Additionally, since the non-AP MLD should have at least one or more anchored links, when requesting for link switching or reconnection, the non-AP MLD should request for the anchored link switching while considering this requirement.

For the above-described embodiment, the AP MLD is required to additionally provide the non-AP MLD with "Anchored Link List" information. The aforementioned term "Anchored Link List" is merely exemplary and may, therefore, be configured/expressed by using other various terms.

"Anchored Link List" (element/field): This is information on a list of anchored links that are supported by the current AP MLD. For example, the information on the list of anchored links that are supported by the current AP MLD may be indicated/configured as/of one or more Link IDs or AP BSS values, and so on. A Non-AP MLD should be connected to at least one or more anchored lists, among the links included in the list.

The above-described information (e.g., "Anchored Link List" (element/field)) may be included in an existing beacon or management frame and then transmitted, or, in case of the above-described solicited method, the above-described information may be included in an info response message and may be transmitted together to the non-AP MLD.

Therefore, in case the non-AP MLD requests for a switching of the anchored link that it is using, the non-AP MLD should be informed in advance of the information on the currently supported anchored link list. However, if the non-AP MLD is not informed of (or does not know) the anchored link list information or wishes to obtain the most recent information, the non-AP MLD may obtain the corresponding information from the AP MLD by using the solicited method.

The STA may request for switching or reconnection to only one link in the Anchored Link List. If the STA requests for switching or reconnection to another link that is not included in the list, the AP MLD may transmit a reject message to the STA.

When requesting for an anchored link switching or reconnection, there are details that should be considered in addition to the existing link switching method. A case where an STA of the non-AP MLD switches its anchored list may be broadly divided into 2 cases.

A first case corresponds to a case where the STA that is already connected to an anchored link switches to another anchored link of the AP MLD (AP switch for an anchored link) for reasons of load balancing, and so on. A second case corresponds to a case where the STA that is (already) connected to an anchored link is disabled for reasons of power status, and so on, and, therefore, another STA of the non-AP MLD is reconnected to the anchored link (STA switching for an anchored link).

The first case may operate similarly/identically as the above-described embodiment for link switching and reconnection. However, when reselecting the link, the STA should only select the link from the anchored link list that is supported by the AP MLD. In case of selecting another link, the AP MLD may transmit a reject response message.

The second case needs additional consideration. The example for the second case may be described with reference to FIG. 34.

Figure 36:
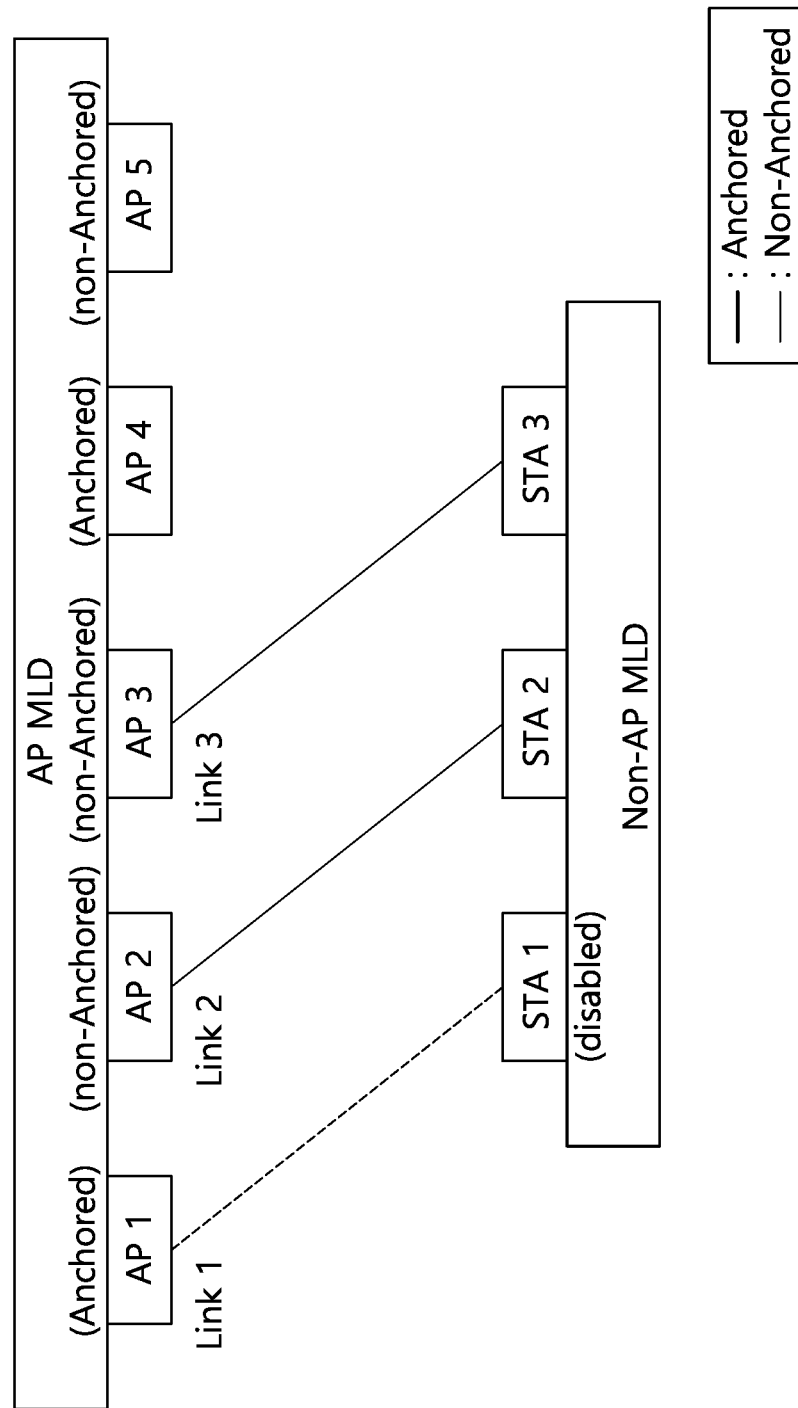
FIG. 36 shows an example of a situation where anchored link switching or reconnection is needed.

FIG. 36 shows an example of a situation where anchored link switching or reconnection is needed.

Referring to FIG. 36, in case of the STAs of the non-AP MLD, the state of STA 1 may be disabled for various reasons (e.g., power off, and so on). At this point, since STA 2 and STA 3 are currently both connected to non-anchored links, either one of the two STA should be reconnected to an anchored link.

As shown in FIG. 36, when the non-AP MLD is required to reconnect to an anchored link, the non-AP MLD may attempt to reconnect one STA, from either STA 2 or STA 3, to an anchored link.

For example, when the non-AP MLD knows (or has) the information on the anchored link list supported by the AP MLD, the non-AP MLD may select an appropriate link and may request link switching.

As another example, when the non-AP MLD does not have the information on the anchored link list supported by the AP MLD, the non-AP MLD may obtain the information through an info request to the AP MLD and may, then, select an appropriate link and request link switching.

An example of detailed AP MLD and non-AP MLD operations according to the above-described embodiment may be described with reference to FIG. 37.

Figure 37:
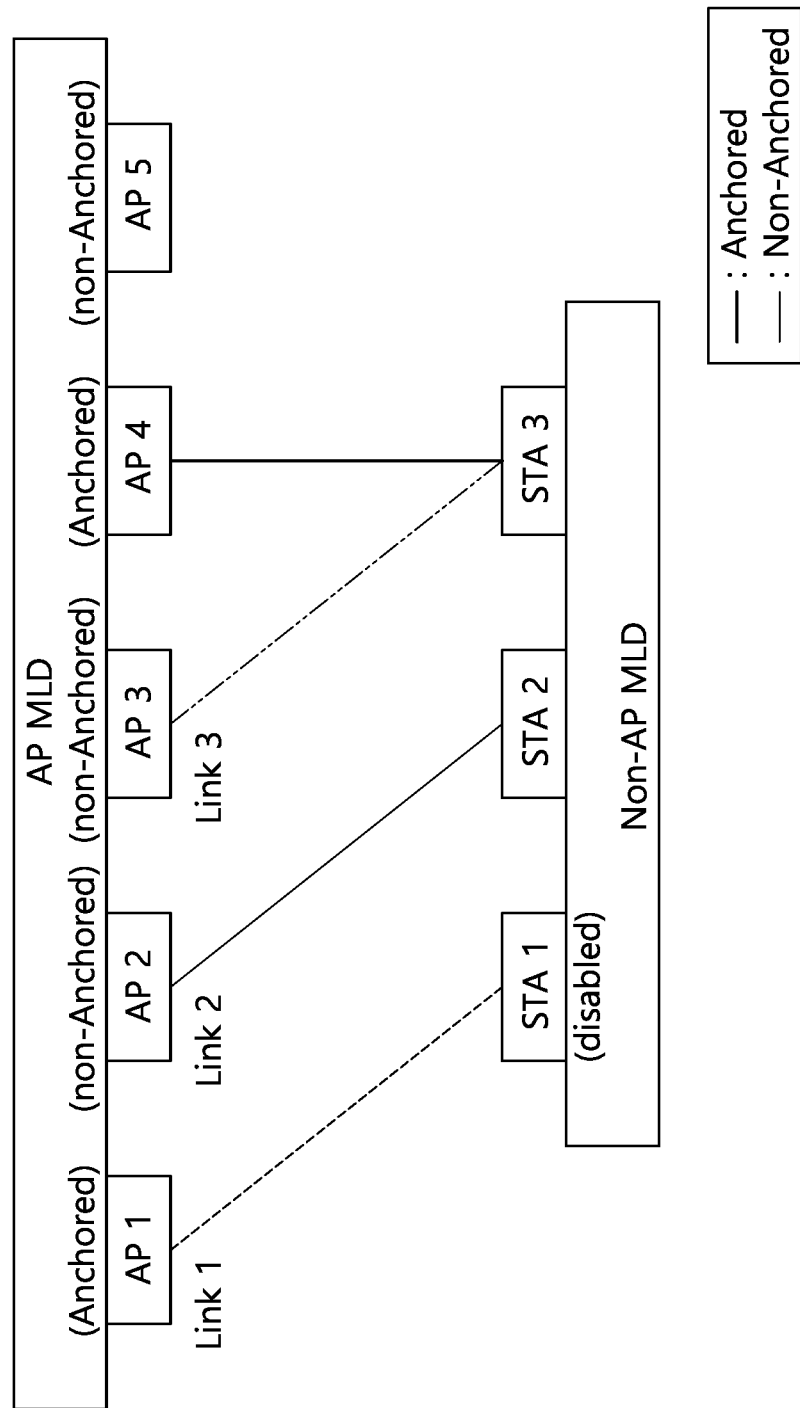
FIG. 37 shows operations of an AP MLD and a non-AP MLD for anchored link switching or reconnection.

FIG. 37 shows operations of an AP MLD and a non-AP MLD for anchored link switching or reconnection.

Referring to FIG. 37, in case STA 1 that was connected to an anchored link is disabled, the non-AP MLD needs a new anchored link connection. At this point, the non-AP MLD may disconnect the initial connection of STA 3 to AP 3 via non-anchored link and may attempt reconnection to an anchored link.

For example, STA 3 may attempt connection to AP 1, which was initially used as an anchored link. As another example, STA 3 may attempt to establish connection to a new AP 4, based on various information.

The process of selecting a new anchored link may be performed similarly/identically as the above-described embodiment for link switching and reconnection. For example, STA 3 may request reconnection by selecting an anchored link that is recommended by the AP, or by directly selecting an anchored link by STA 3 itself. After completing the anchored link reconnection, the link of STA 3 may operate as an anchored link.

Element/Field Including Information Related to an Anchored Link

According to an embodiment, when information related to an anchored link that is supported by the AP MLD is changed, or when the STA directly request information on an anchored link, the AP MLD may transmit the corresponding information (i.e., information related to the switched anchored link or information related to an anchored link that is request by the STA) to the non-AP MLD.

For example, the information may be included in a beacon frame as information related to an anchored link that is currently being used and may then be transmitted, or the information may be included in a separate management frame and may then be transmitted.

The information on an anchored link may include an "Anchored Link List" element indicating the above-described anchored link that is supported by the AP MLD and information indicating usage or non-usage of an anchored link per STA.

Hereinafter, new elements including the above-described information on an anchored link may be proposed. The newly proposed element may be configured as described below.

1) "Anchored Link Indication" element (or field): An "Anchored Link Indication" element may include information related to usage or non-usage of an anchored link each of the STAs being connected to the AP MLD. That is, the "Anchored Link Indication" element may be an element/field indicating the usage or non-usage of an anchored link per link or per STA of a non-AP MLD.

2) "STA ratio per Anchored Link" element (or field): An "STA ratio per Anchored Link" element may include information on a ratio or number of STA being connected per anchored link. Herein, however, only the STAs using anchored links as their links may be considered. In other words, even if an AP MLD supports a first link as an anchored link, an STA using the first link as a non-anchored link may not be included in the STAs being connected to each anchored link (or STAs being connected per anchored link).

According to an embodiment, in all of the processes of the above-described embodiment for anchored link switching or reconnection, when needed, the elements may be included in a frame as additional information.

Detailed examples of the elements may be described with reference to FIG. 36.

Figure 38:
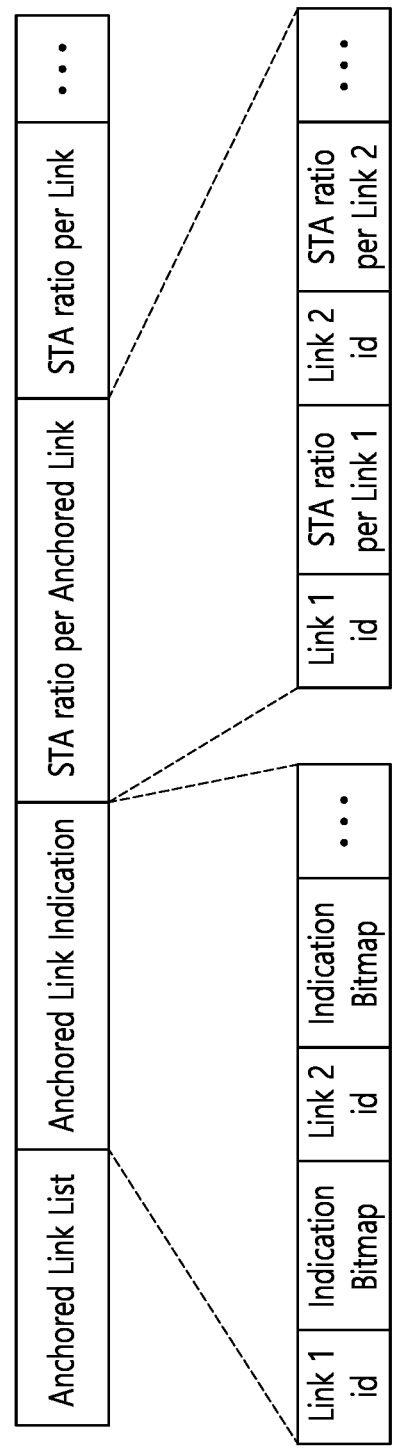
FIG. 38 and FIG. 39 respectively show detailed examples of elements for anchored link reconnection.
Figure 39:
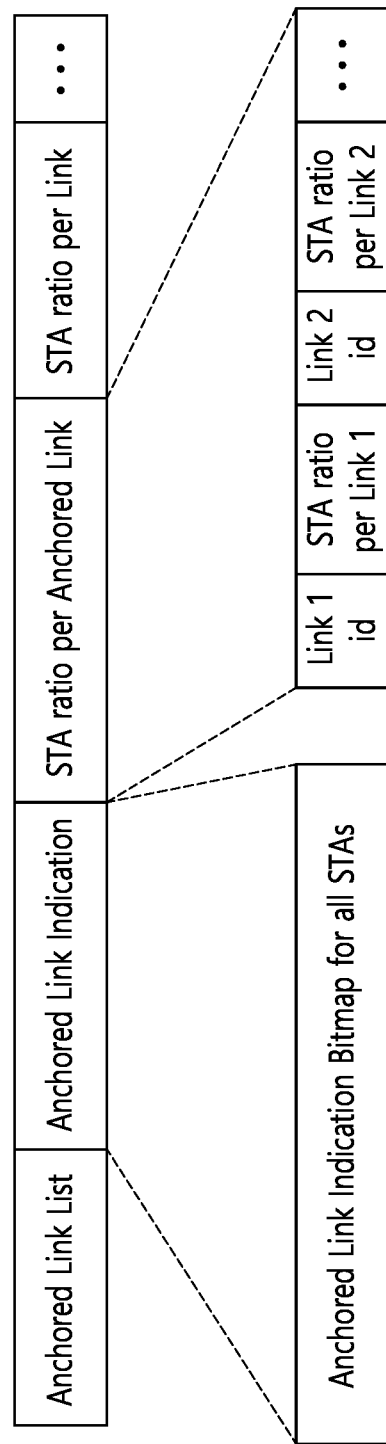

FIG. 38 and FIG. 39 respectively show detailed examples of elements for anchored link reconnection.

Referring to FIG. 38 and FIG. 39, the information related to an anchored link may be transmitted through an Anchored Link List element (or field), an Anchored Link Indication element (or field), and/or an STA ratio per Anchored Link element (or field). In other words, an element for anchored link reconnection may include an Anchored Link List element (or field), an Anchored Link Indication element (or field), and/or STA ratio per Anchored Link element (or field).

According to an embodiment, as described above, the Anchored Link List element may include information on a list of links currently supported by the AP MLD. For example, the information on the list of links currently supported by the AP MLD may be indicated based on Link ID or AP BSS information, and so on. In other words, the list of links currently supported by the AP MLD may be configured based on Link ID or AP BSS information.

According to an embodiment, the Anchored Link Indication element may include information related to the usage or non-usage of an anchored link per STA of a non-AP MLD. For example, the information related to the usage or non-usage of an anchored link per STA of a non-AP MLD may be indicated through an indication bitmap per link (i.e., FIG. 36). As another example, the usage or non-usage of an anchored link for all STAs may be indicated through one bitmap (i.e., FIG. 37).

As an example, when the information related to the usage or non-usage of an anchored link is indicated by an indication bitmap according to link IDs, the STA may verify the current anchored link(s) based on the Anchored Link List element value. Therefore, the STA may verify the ratio of STAs being connected to each anchored link. At this point, the Indication bitmap field for a non-anchored link may be omitted in order to reduce overhead.

In the bitmap, when the value of one of the bits is equal to 1, the one bit may denote that the link currently connected to the STA is an anchored link. When the value of one of the bits is equal to 0, the one bit may denote that the link currently connected to the STA is a non-anchored link. The embodiment wherein a bitmap is used in order to indicate the connection or non-connection of an anchored link per STA is merely exemplary. And, therefore, the information related to the connection or non-connection of an anchored link per STA may be transmitted through other various embodiments.

According to an embodiment, a ratio of STAs for all links being supported by the AP MLD may also be transmitted. According to an embodiment, the STA ratio per Anchored Link element may include information on a usage ratio or number of actual anchored links of the STA per anchored link. For example, by having the information indicated only for the anchored link(s) that are indicated in the Anchored Link List element, this has an effect of reducing overhead.

An example of configuring a value of the STA ratio per Anchored Link element may hereinafter be described.

For example, the AP MLD may include 5 APs (i.e., AP 1 to AP 5), and AP 1 may be connected to STAs through Link 1. AP 2 may be connected to STAs through Link 2. AP 3 may be connected to STAs through Link 3. AP 4 may be connected to STAs through Link 4. And, AP 5 may be connected to STAs through Link 5.

The AP MLD may support 2 links, among 5 links (i.e., Link 1 to Link 5), as anchored links. Link 1 and Link 4 may be supported/used as anchored links.

A total of 10 STAs may be connected to Link 1 (or AP 1), and 7 STAs may use Link 1 as the anchored link. This may be expressed as a ratio of 70%, and this may be expressed as a value of 7.

A total of 20 STAs may be connected to Link 4 (or AP 4), and 5 STAs may use Link 4 as the anchored link. This may be expressed as a ratio of 25%, and this may be expressed as a value of 5.

By having the STA ratio per Anchored Link element transmitted together with the above-described STA ratio per Link element information, more accurate information may be transmitted to the STA. Generally, since an anchored link may have a relatively larger amount of data traffic as compared to a non-anchored link, the STA ratio per Anchored Link element may be used as useful information for an STA intending to reselect its anchored link.

The non-AP MLD may verify whether or not the link to which the non-AP MLD is connected is an anchored link, a connection ratio of STAs per anchored link, and a ratio of anchored links that are actually being used, based on the above-described information (or elements).

Additionally, when the AP MLD transmits information on other links. i.e., all links, through the above-described elements, the STA may verify the connection ratio and actual usage ratio of each STA for all anchored links of the AP MLD, based on one frame. Therefore, the information (or elements) may be used when the STA reselects the anchored link that it intends to use.

Therefore, according to the embodiment for anchored link switching or reselection, by not only using the various link information (e.g., information on BSS load per AP or information on STR capability per link, and so on) used in the embodiment for link switching or reselection but also using the above-described information on anchored links (e.g., Anchored Link List information, information indicating the usage or non-usage of an anchored link per STA, or information on actual STA usage ratio per anchored link, and so on), a more appropriate anchored link switching or reconnection may be performed.

Signaling for Indicating a Link Switching and Reconnection Method

In order to indicate the methods proposed above, an agreement process between an AP MLD and a non-AP MLD may be needed through a negotiation between the AP MLD and the non-AP MLD. For this, a signaling method for enabling the methods that will hereinafter be proposed in the present specification may be proposed.

Firstly, in order to indicate the methods that are proposed above, a new element may be proposed. Hereinafter, although an embodiment related to signaling for indicating a link switching and reconnection method will be described, the corresponding embodiment may also be applied to an embodiment related to signaling for indicating an anchored link switching and reconnection method.

The signaling process for indicating a link switching and reconnection method may be performed during multi-link setup or after multi-link setup. Additionally, the new elements that will hereinafter be proposed may be used in the signaling process for indicating a link switching and reconnection method. For example, the elements may be included in a (re)association frame of the related art specification or in a new frame.

Information Obtain Method (IOM) Capability Element

An IOM Capability Element may include information related to enabling or disabling of a method for additionally obtaining information for a multi-link. For example, in a process of exchanging messages for an operation negotiation (or agreement) (e.g., a capability negotiation process) between an AP MLD and a non-AP MLD during a multi-link setup process, an IOM capability value may be present in an element of the message. And, the presence of an IOM capability value in an element of the message may denote that the IOM capability is supported.

According to an embodiment, when the AP MLD supports the IOM capability, an AP may be provided with internally shared information of other AP and may have (or possess) information of other AP. The MLD that does not have any shared information of other AP cannot support the IOM capability.

According to an embodiment, when the value of the IOM capability element is configured to a first value (e.g., 1), this may mean that the IOM capability element enables the IOM and that the IOM is operated by using the indicated capability. Conversely, when the value of the IOM capability element is configured to a second value (e.g., 0), this may mean that IOM capability element disables the IOM.

According to the embodiment, the IOM capability element may include various fields/elements for indicating various operations. For example, the IOM capability element may also include various fields/elements that will hereinafter be described. However, depending upon a case where the AP MLD requests link switching and a case where the non-AP MLD requests link switching, the fields/elements that are added to the IOM capability element may be differently configured. Additionally, among the fields/elements that are added to the IOM capability element, at least part of the fields/elements may be omitted. For example, among the fields/elements that are added to the IOM capability element, fields/elements that include information that does not need to be indicated may be omitted.

Hereinafter, examples of various fields/elements being defined/configured for obtaining additional information related to a multi-link may hereinafter be described. The various fields/elements that will hereinafter be described may be independently configured, or two or more fields/elements may be combined, and may then be transmitted through various frames.

Method Type (or Method) Field/Element

A Method Type field/element (hereinafter referred to as Method field/element) may include information related to an operation method of an IOM. In other words, the Method field/element may indicate an operation method of the IOM. For example, when a non-AP MLD enables (or activates) an IOM method for obtaining information from an AP, the non-AP MLD may select and indicate a method that is to be used, among the methods proposed above (e.g., solicited method, unsolicited method, general method).

For example, the solicited method may be indicated/used, based on the value of the Method field/element being equal to a first value (e.g., 0). The unsolicited method may be indicated/used, based on the value of the Method field/element being equal to a second value (e.g., 1). The general method may be indicated/used, based on the value of the Method field/element being equal to a third value (e.g., 2). And, both the solicited method and the unsolicited method may be indicated/used, based on the value of the Method field/element being equal to a fourth value (e.g., 3).

As another example, 1 bit may be used as the Method field/element. In this case, the solicited method may be indicated/used, based on the value of the Method field/element being equal to a first value (e.g., 0). The unsolicited method may be indicated/used, based on the value of the Method field/element being equal to a second value (e.g., 1).

As another example, 2 bits may be used as the Method field/element. In this case, single usage or multiple usage of each method may be indicated.

Info Range Field/Element

An Info range field may be used for indicating the range of information, when information is provided to a non-AP MLD via IOM. In other words, the Info range field may include information related to the information range, when information is provided to the non-AP MLD via IOM.

For example, when a value of the Info range field is equal to a first value (e.g., 0), the Info range field may indicate that only part of the information is provided. And, when a value of the Info range field is equal to a second value (e.g., 1), the Info range field may indicate that all of the information (or the whole information) is provided.

According to an embodiment, a subfield for indicating the range of information that is to be provided (e.g., all information or partial information) may also be included in the Info range field. For example, a subfield for indicating the range of information that is to be provided may be defined/configured as all/partial subfields.

According to an embodiment, a subfield for indicating whether all information is to be provided or whether only changed information among all of the information is to be provided may be newly proposed. In other words, the newly proposed subfield may indicate whether all information is to be provided or whether only changed information among all of the information is to be provided.

For example, the subfield for indicating whether all information is to be provided or whether only changed information among all of the information is to be provided may be defined/configured as an only updated subfield.

When the STA wishes to receive only the changed (or updated) information, a value of the only updated subfield may be configured as 1. In other words, when the STA wishes to receive only the changed (or updated) information, the STA may set the only updated subfield value to 1. For example, in case of the solicited method, when the STA requests information, the AP (or AP MLD) may transmit only the changed information (i.e., updated information), among the requested information. As another example, in case of the unsolicited method, the AP may notify only the changed information in the information range (or info range) that is configured by the STA.

According to the above-described example, in order to receive only the changed information, an only updated subfield has been proposed within the Info range field. However, the present disclosure will not be limited only to this. And, therefore, in order to receive only the changed information, a separate field or element may be defined/configured.

According to the above-described embodiment, a range of the information that may be requested by the STA may be configured as updated information or all information. In this case, the STA, which does not wish a large amount of frame overhead, may request reception of only the changed information. Therefore, various overhead may be reduced.

Link Condition Field/Element

Link condition field may be used for indicating a specific link that is being requested. In other words, the Link condition field may include information on a specific link that is being requested. The Link condition field may be used when the STA wishes to received only the information on a specific link from the AP.

The Link condition field may be marked (or indicated) by a link identifier (e.g., Link ID, BSS ID). In other words, the Link condition field may include information related to a link identifier (e.g., Link ID, BSS ID). In other words, in order to specify a link for obtaining information, a link identifier may be used.

For example, when an STA being connected to Link 1 wishes to request only the information on Link 2 and Link 3, to the AP, the STA may indicate Link 2 and Link 3 to the Link condition field, so as to request information on Link 2 and Link 3 to the AP. For example, when the above-described info range field value is equal to 1, all information corresponding to Link 2 and Link 3 may be transmitted. As another example, when the above-described info range field value is equal to 0, only partial information designated by the STA in Link 2 and Link 3 may be transmitted. According to an embodiment, the partial information designated by the STA may be determined through the Info condition field, which will be described below.

According to an embodiment, when there is no Link condition field value, or when the Link condition field value is equal to 0, the AP may determine that there is no link condition. Therefore, the AP may provide/transmit information related to all links to the STA.

Info Condition Field/Element

The Info condition field may be used for indicating a specific information type that is being requested. In other words, the Info condition field may be used in a case where the STA wishes to receive only specific information from the AP.

For example, the Info condition field may be used only when the Info range field is set to 0. As another example, the Info condition field may be used to allow the STA to indicate specific information even when there is no info range field.

For example, information that can be designated by the STA (e.g., BSS Load, STR Capability, and so on) may be indicated by a bitmap, within the Info condition field. For example, the type of information indicated by the AP, indication method or order within a bit, and so on, may be variously configured.

According to an embodiment, the Info condition field may be used together with the above-described Link condition field. According to an embodiment, the Info condition field may transmit request information of various conditions to the STA (or AP) based on a combination of various fields/elements.

According to an embodiment, in order to allow the STA to request specific information, an element of the existing specification may be re-used. For example, in order to allow the STA to request specific information, a Request IE or an Extended Request IE may be used. Hereinafter, a detailed example of the Request IE or Extended Request IE may be described.

FIG. 40 shows a detailed example of a Request element format.

Referring to FIG. 40, a Request element may include an element ID field, a length field, and/or a Requested Element IDs field. For example, the element ID field may include information indicating that the element is a request element. The length field may include information related to a number of octets after the length field. The Requested Element IDs field may include information on an element ID that is to be requested.

FIG. 41 shows a detailed example of an Extended Request element format.

Referring to FIG. 40, an Extended Request element may include an element ID field, a length field, an Element ID extension field, a Requested Element ID field, and/or a Requested Element IDs Extensions field. The element ID field and the length field may be configured similarly as the element ID field and the length field of FIG. 40. The Element ID extension field may be combined with the Element ID field, so as to configure the Extended Element ID. The Requested Element ID field may include one of the element IDs that are used for indicating the extended element. The Requested Element IDs Extensions field may include an element ID extension value of 1 octet.

Referring to FIG. 40 and FIG. 41, the element (request element or Extended Request element) may be used for requesting specific information to a probe request frame or an information request frame.

For example, when the STA indicates a list of information for which it wishes to receive a response by using requested element IDs, the AP may include and transmit the corresponding information in a probe response frame or an information response frame.

Therefore, according to the embodiment of the present specification, the element (request element or Extended Request element) may be reused/used as an indicator for requesting specific information. For example, the element may be used for requesting wanted information of a wanted link together with a link identifier (e.g., Link identifier).

For example, in order to request BSS load information of AP 2, the STA may use a request element and Link identifier. The STA may include an element ID for the BSS load information through the Request element. And, the STA may indicate AP 2 through the Link identifier. Therefore, the STA may request BSS load information of AP 2 based on the Request element and the Link identifier.

According to an embodiment, the above-described element ID information may be used for indicating specific information of a specific AP through various combinations along with (or together with) Link identifier information. According to an embodiment, even in a case where a new frame for requesting information is defined, instead of an existing frame, the above-described Request element and/or Extended Request element may be used/reused.

In the prior art specification, a PV1 Probe Response Option element was used in order to request specific information. Therefore, in an embodiment for indicating specific information, a PV1 Probe Response Option element may be used.

FIG. 42 shows a detailed example of a PV1 Probe Response Option element format.

Referring to FIG. 42, a PV1 Probe Response Option element may be used for requesting optional information by using information wanted by the STA as a Probe request. For frequently used information, each set of information may be indicated by using a Probe response option bitmap.

However, the EHT specification should be capable of providing information of a multi-link while considering an MLD. Therefore, the STA may request specific information of various combinations of specific links by using a bitmap indicator along with a link identifier, as shown in Table 21 to Table 26.

According to an embodiment, in the EHT specification, optional information (e.g., STR capability) may be newly defined along with a multi-link. Therefore, when the PV1 Probe response option element is used/re-used, bitmaps for information that needs to be newly defined or additionally obtained may be newly defined or additionally defined in the EHT specification. The Probe response option bitmap may be configured as shown below in Table 21 to Table 26.

When an i-th bit of the Probe response group bitmap is configured as 1, probe response option bitmap subfield i may be included in the PV1 Probe Response Option element.

Table 21 shows an example of Probe Response Option Bitmap subfield 0.

Table 22 shows an example of Probe Response Option Bitmap subfield 1.

Table 23 shows an example of Probe Response Option Bitmap subfield 2.

Table 24 shows an example of Probe Response Option Bitmap subfield 3.

Table 25 shows an example of Probe Response Option Bitmap subfield 4.

Table 26 shows an example of Probe Response Option Bitmap subfield 5.

TABLE 21

| Bit Position | Subfield | Item requested | Reference |
|---|---|---|---|
| 0 | Request Full SSID | Full SSID element if the bit is set to 1, and Compressed SSID field if the bit is set to 0 | SSID element and PV1 Probe Response frame format |
| 1 | Request Next TBTT | Next TBTT field | PV1 Probe Response frame format |
| 2 | Request Access Network Options | Access Network Options field | Interworking element |
| 3 | Request S1G Beacon Compatibility | S1G Beacon Compatibility element | S1G Beacon Compatibility element |
| 4 | Request Supported Rates | Supported Rates and BSS Membership Selectors element | Supported Rates and BSS Membership Selectors element |
| 5 | Request S1G Capability | S1G Capabilities element | S1G Capabilities element |
| 6 | Request S1G Operation | S1G Operation element | S1G Operation element |
| 7 | Request RSN | RSN element | RSNE |

TABLE 22

| Bit Position | Subfield | Item requested | Reference |
|---|---|---|---|
| 0 | Request RPS | RPS element | RPS element |
| 1 | Request Page Slice | Page Slice element | Page Slice element |
| 2 | Request TSF Timer Accuracy | TSF Timer Accuracy element | TSF Timer Accuracy element |
| 3 | Request S1G Relay Discovery | S1G Relay Discovery element | S1G Relay Discovery element |
| 4 | Request S1G Sector Operation | S1G Sector Operation element | S1G Sector Operation element |
| 5 | Request Short Beacon Interval | Short Beacon interval element | Short Beacon Interval element |
| 6-7 | Reserved | | |

TABLE 23

| Bit Position | Subfield | Item requested | Reference |
|---|---|---|---|
| 0 | Request Country | Country element | Country element |
| 1 | Request Power Constraint | Power Constraint element | Power Constraint element |
| 2 | Request TPC Report | TPC Report element | TPC Report element |
| 3 | Request Extended Supported Rates | Extended Supported Rates element | Extended Supported Rates and BSS Membership Selectors element |
| 4 | Request Extended Capabilities | Extended Capabilities element | Extended Capabilities element |
| 5 | Request BSS Load | BSS Load element | BSS Load element |
| 6 | Request EDCA Parameter Set | EDCA Parameter Set element | EDCA Parameter Set element |
| 7 | Request Supported Operating Classes | Supported Operating Classes element | Supported Operating Classes element |

TABLE 24

| Bit Position | Subfield | Item requested | Reference |
|---|---|---|---|
| 0 | Request Measurement Pilot Transmission | Measurement Pilot Transmission element | MeasurementPilot Transmission element |
| 1 | Request Multiple BSSID | Multiple BSSID element | Multiple BSSID element |
| 2 | Request RM Enabled Capabilities | RM Enabled Capabilities element | RM Enabled Capabilities element |

TABLE 24-continued

| Bit Position | Subfield | Item requested | Reference |
|---|---|---|---|
| 3 | Request AP Channel Report | AP Channel Report element | AP Channel Report element |
| 4 | Request BSS Average Access Delay | BSS Average Access Delay element | BSS Average Access Delay element |
| 5 | Request Antenna | Antenna element | Antenna element |
| 6 | Request BSS Available Admission Capacity | BSS Available Admission Capacity element | BSS Available Admission Capacity element |
| 7 | Request BSS AC Access Delay | BSS AC Access Delay element | BSS AC Access Delay element |

TABLE 25

| Bit Position | Subfield | Item requested | Reference |
|---|---|---|---|
| 0 | Request Mobility Domain | Mobility Domain element | Mobility Domain element |
| 1 | Request QoS Traffic Capability | QoS Traffic Capability element | QoS Traffic Capability element |
| 2 | Request Channel Usage | Channel Usage element | Channel Usage element |
| 3 | Request Time Advertisement | Time Advertisement element | Time Advertisement element |
| 4 | Request Time Zone | Request Time Zone element | Request Time Zone element |
| 5 | Request IBSS Parameter Set | IBSS Parameter Set element | IBSS Parameter Set element |
| 6-7 | Reserved | Reserved | |

TABLE 26

| Bit Position | Subfield | Item requested | Reference |
|---|---|---|---|
| 0 | Request Interworking | Interworking element | Interworking element |
| 1 | Request Advertisement Protocol | Advertisement Protocol element | Advertisement Protocol element |
| 2 | Request Roaming Consortium | Roaming Consortium element | Roaming Consortium element |
| 3 | Request Emergency Alert Identifier | Emergency Alert Identifier element | Emergency Alert Identifier element |
| 4 | Request QLoad Report | QLoad Report element | QLoad Report element |
| 5 | Request Multi-band | Multi-band element | Multi-band element |
| 6 | Request Multiple MAC Sublayers | Multiple MAC Sublayers element | Multiple MAC Sublayers element |
| 7 | Request Reduced Neighbor Report | Reduced Neighbor Report element | Reduced Neighbor Report element |

According to an embodiment, in order to request specific information on a multi-link, Probe Response Option Bitmap subfield 6 or 7 may be newly defined/configured.

Transmission Periodic Field/Element

When the STA wishes to receive information by using the unsolicited method, whether the STA is to periodically receive or aperiodically receive a message including the information may be indicated through the Transmission periodic field.

For example, when the STA wishes to receive the information aperiodically, the AP may inform updated information each time an update occurs in the information of another AP.

As another example, when the STA indicates the information to be periodically received, a message including the information may be received at a periodic interval that is configured by the STA.

According to the embodiment, the transmission periodic field may be configured on 1 bit. When the value of the transmission periodic field is set to 1, the STA may receive/obtain information through a periodic method, which periodically receives a message. When the value of the transmission periodic field is set to 0, the STA may receive/obtain information through an aperiodic method, which aperiodically receives a message.

Transmission Interval Field/Element

According to an embodiment, when the STA wishes to periodically receive information of another AP, the STA may directly configure the interval (or transmission cycle period). The STA may transmit information on an interval at which information on another AP is to be received, based on the transmission interval field. Herein, however, the interval should be configured to be shorter than the beacon transmission interval. For example, when the FILS Discovery frame is used, the interval should be configured as 20 us.

As described above, a transmission interval may be defined as a separate field within an element indicating the transmission interval, and may also be defined as a subfield within the transmission periodic field.

According to an embodiment, a field/element that is defined/configured for obtaining additional information related to a multi-link will not be limited to the above-described field/element, and other various field(s)/element(s) may be further configured.

Therefore, during the multi-link setup process, the MLD (AP MLD or non-AP MLD) may use at least one of the above-described elements/fields so as to indicate an IOM capability through a negotiation between the AP MLD and the non-AP MLD. Additionally, after completing the multi-link setup process, the MDL may update the negotiation details between the MLDs through a separate message exchange.

According to an embodiment, when the IOM capability is enabled, the AP MLD and the non-AP MLD may operate based on the embodiment for the link switching and reconnection.

Hereinafter, exemplary operations of the AP MLD and the non-AP MLD when the IO capability is enabled may be described. For example, by having the non-AP MLD transmit the above-described fields/elements to the AP MLD, the non-AP MLD may request additional information for a multi-link to the AP MLD. The non-AP MLD may transmit the above-described fields/elements including the IOM Capability element to the AP MLD. The fields/elements including the IOM Capability element is merely exemplary. And, therefore, the IOM Capability element may also be transmitted through an independent field/element.

For example, during a multi-link setup process, the non-AP MLD may transmit an IOM Capability element including "Method field=0" and "Info range field=1" to the AP MLD, and the non-AP MLD may negotiate this with the AP MLD. In this case, the non-AP MLD may operate by using the solicited method, after the multi-link setup. Then, when requesting information, the non-AP MLD may request information for a multi-link (e.g., information on other AP) including all information being included in a beacon. Therefore, the AP MLD may provide/transmit information on a link to a response message only when the AP MLD has received a request message from the STA. When receiving the request message, the AP MLD may transmit a response message including information on all links within the AP MLD to the STA. The information on all links within the AP MLD may include all information included in a beacon.

As another example, the non-AP MLD may transmit an IOM Capability element including "Method field=1", "Info range field=0", "Link range=Link id 2", "Info condition field=(value indicating BSS load through bitmap)" to the AP MLD, and the non-AP MLD may negotiate this with the AP MLD. In this case, the non-AP MLD may operate by using the unsolicited method, after the multi-link setup. Therefore, the AP may transmit BSS load information of Link 2 to the STA through a separate message, even without a separate request message.

As yet another example, the non-AP MLD may transmit an IOM Capability element including "Method field=0", "Info range field=0", "only updated field or subfield=1", "Info condition field=(value indicating BSS load through bitmap)" to the AP MLD, and the non-AP MLD may negotiate this with the AP MLD. In this case, the non-AP MLD may operate by using the solicited method, after the multi-link setup. Therefore, the AP MLD (or AP) may include only the updated (or changed) information, among the BSS load information of all APs of the AP MLD, which was connected at the time the STA requested the information, in a response message, and may then transmit the message to the STA.

According to an embodiment, the AP MLD and the non-AP MLD may enable the IOM method, which is proposed through the signaling method proposed in the present specification, during the multi-link setup or after the multi-link setup. Additionally, the AP MLD and the non-AP MLD may restrict (or limit) the range and type of the requested information through various field values within the IOM Capability element.

According to an embodiment, although the IOM operation may be performed after establishing an accurate operation negotiation between the MLDs through the above-described IOM signaling method, the IOM operation may also be performed by an MLD implementation without any separate signaling process. This may mean that the IOM may be operated by an AP MLD implementation or a non-AP MLD implementation without any negotiation between the AP MLD and the non-AP MLD.

Based on the above-described embodiments, although the AP MLD and the non-AP MLD may operate, when an MLD performs the IOM operation without any separate signaling exchange, the following restrictions may occur.

1) Restrictions on the solicited method: When info sharing between APs of the AP MLD is not supported, and when the STA has requested information on another link, response cannot be made (or transmitted).

2) Restrictions on the unsolicited method: the AP may autonomously determine the STA that needs additional link information and may provide a separate message (e.g., beacon interval, and so on) to the corresponding STA. Therefore, the STA cannot predict whether or not to receive this information.

When the MLD implements an IOM without any separate signaling method, the operation process may be simplified. However, the above-described restrictions may occur.

According to an embodiment, a method for requesting information related to a multi-link may be configured based on a negotiation between an AP MLD and a non-AP MLD that is performed by using the above-described IOM capability element. On the other hand, in case of the solicited method, the STA may indicate specific information other than the negotiated information and may temporarily wish to obtain the corresponding information. In this case, when the STA dynamically sends a request message, the request may be made while including the indications (e.g., IOM capability information).

For example, during the multi-link setup or after the multi-link setup, although the ST may receive information the AP based on the negotiated details according to the negotiation between the AP MLD and the non-AP MLD, the STA may temporarily wish to request information of a specific AP or specific parameter information of APs. In this case, when requesting information, the STA may include instructions on the information, which the STA wishes to request, in the "IOM capability" element within the request frame (e.g., probe request frame or (re)association frame or new frame, and so on) and may transmit the request frame. The AP may transmit/provide a response message including the information, which the STA wishes to request, to the STA based on the request frame. According to the embodiment, when a field within the IOM capability element is omitted, the AP may provide information to the STA based on previously (or existing) negotiated details.

Therefore, during the multi-link setup process or after the multi-link setup process, the MLD (AP MLD or non-AP MLD) may use the above-described element so as to perform a negotiation between the AP MLD and the non-AP MLD. The non-AP MLD may perform a negotiation on the information that is to be provided (or information that is to be received), based on the negotiation, and may then receive the corresponding information. Additionally, by including instructions of the information, for which the STA wishes to receive a request, in the request message, and transmitting the request message, the STA may temporarily receive only the requested information. Herein, however, when the specific instructions are omitted from the request message, the non-AP MLD and the AP MLD may operate based on the previously (or existing) negotiated instructions.

According to an embodiment, when the non-AP MLD and the AP MLD wish to change the negotiated details after completing the multi-link setup, the non-AP MLD and the AP MLD may update the negotiated details between the MLDs through a separate message exchange.

Figure 43:
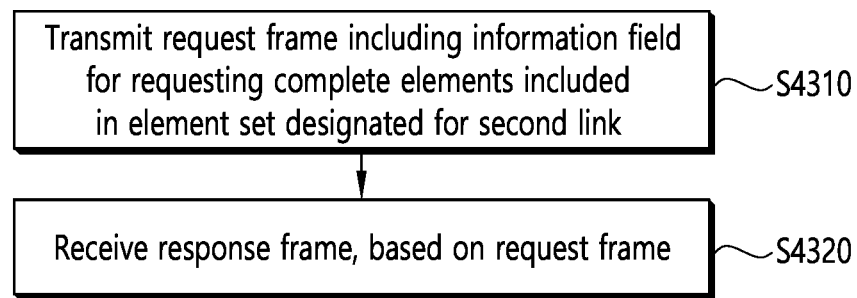
FIG. 43 is a flowchart describing operations of a multi-link device.

FIG. 43 is a flowchart describing operations of a multi-link device.

Referring to FIG. 43, in step S4310, a multi-link device (MLD) may transmit a request frame including an information field for requesting complete elements included in an element set that is designated for a second link. According to an embodiment, the multi-link device (MLD) may transmit a request frame including an information field for requesting complete elements included in an element set that is designated for a second link, to a first AP of an access point (AP) multi-link device, through a first STA.

For example, the multi-link device may be connected to an AP multi-link device through a plurality of links including a first link. The multi-link device may include a plurality of STAs related to the plurality of links. For example, among the plurality of STAs, the first STA may be connected to the first link. In other words, the first STA may operate on the first link. Additionally, the first STA may be connected to a first AP of the AP multi-link device through the first link.

For example, the plurality of links and a second link may be included within 2.4 GHz, 5 GHz, and 6 GHz bands.

According to an embodiment, the request frame may include identifier (ID) information on the second link. The identifier information on the second link may be configured of 4-bit information. For example, an identifier for the first link and an identifier for the second link may be expressed in 4 bits.

According to an embodiment, a set of elements that may be requested through the request frame may be referred to as an element set. Therefore, complete elements included in the element set may mean complete elements that may be requested through the request frame. In other words, the multi-link device may request all information related to the second link based on the request frame.

For example, an element set that is designated for the second link may include an element related to a capability of the second link or an element related to a parameter of the second link.

According to an embodiment, the request frame may include first bit information for indicating that complete elements included in the designated element set are requested. In other words, an information field for requesting complete elements included in the element set designated for the second link may be configured as 1-bit information.

For example, the 1-bit information may be configured to have a first value. In other words, by configuring the 1-bit information as a first value (e.g., 1), the multi-link device may indicate that complete elements included in the designated element set are requested.

Additionally, by configuring the 1-bit information as a second value (e.g., 0), the multi-link device may indicate that part of the elements (or partial elements) included in the designated element set are requested.

According to an embodiment, the request frame may further include an information field for requesting complete elements included in an element set designated for a third link, among the plurality of links. That is, the multi-link device may request complete elements included in the element set designated for the second link and complete elements included in the element set designated for the third link through the request frame.

In step S4320, the multi-link device may receive a response frame, based on the request frame. According to an embodiment, the multi-link device may receive the response frame from the first AP through the first STA, based on the request frame.

According to an embodiment, the response frame may include complete elements included in the element set designated for the second link.

According to an embodiment, the second link may be differentiated from the plurality of links. When the second link is differentiated from the plurality of links, the multi-link device may transmit the request frame for requesting elements related to a link that is currently not connected to the multi-link device. The multi-link device may receive the elements related to the link that is currently not connected to the multi-link device through a response frame, based on the request frame.

The multi-link device may transmit a second request frame for requesting the link connected to the first STA to be switched from the first link to the second link, based on the response message. Thereafter, the multi-link device may perform a procedure of switching the link that is to be connected to the first STA from the first link to the second link, based on the second request frame.

The multi-link device may establish a connection between the first STA and a second AP of the AP multi-link device, based on the procedure for switching the link connected to the first STA from the first link to the second link. For example, the second AP may operate on the second link. Additionally, the first STA may also operate on the second link. In other words, the first STA may establish a connection with the second AP through the second link, based on the above-described procedure.

According to an embodiment, the second link may be included in the plurality of links. When the second link is included in the plurality of links, the multi-link device may transmit the request frame for requesting elements related to the link that is currently connected to the multi-link device through the first link. In other words, the multi-link device may transmit a request frame for requesting elements related to another link through the first link. The multi-link device may receive elements related to a link excluding the first link, among the links currently connected to the multi-link device, through a response frame, based on the request frame.

Figure 44:
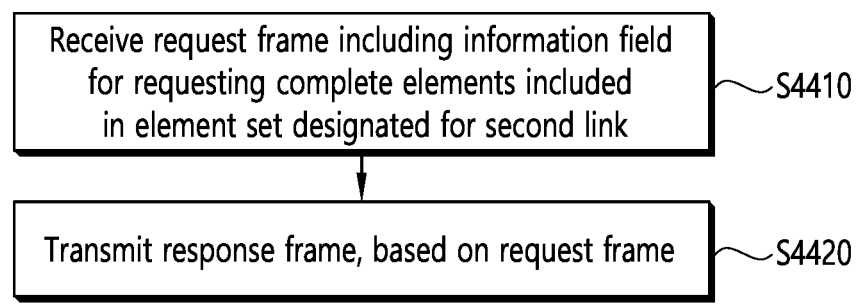
FIG. 44 is a flowchart describing operations of an AP multi-link device.

FIG. 44 is a flowchart describing operations of an AP multi-link device.

Referring to FIG. 44, an AP multi-link device (MLD) may receive a request frame including an information field for requesting complete elements included in an element set that is designated for a second link. According to an embodiment, the AP multi-link device (MLD) may receive a request frame including an information field for requesting complete elements included in an element set that is designated for a second link, to a first STA of a multi-link device, through a first AP.

According to an embodiment, the AP multi-link device may be connected to a multi-link device through a plurality of links. For example, a second link may be included in the plurality of links. As another example, the second link may be differentiated from the plurality of links.

For example, the AP multi-link device may be connected to the multi-link device through a plurality of links including a first link. The AP multi-link device may include a plurality of APs related to the plurality of links. For example, among the plurality of APs, the first AP may be connected to the first link. In other words, the first AP may operate on the first link. Additionally, the first AP may be connected to the first STA of the multi-link device through the first link.

For example, the plurality of links and a second link may be included within 2.4 GHz, 5 GHz, and 6 GHz bands.

According to an embodiment, the request frame may include identifier (ID) information on the second link. The identifier information on the second link may be configured of 4-bit information. For example, an identifier for the first link and an identifier for the second link may be expressed in 4 bits.

According to an embodiment, a set of elements that may be requested through the request frame may be referred to as an element set. Therefore, complete elements included in the element set may mean complete elements that may be requested through the request frame.

For example, an element set that is designated for the second link may include an element related to a capability of the second link or an element related to a parameter of the second link.

According to an embodiment, the request frame may include first bit information for indicating that complete elements included in the designated element set are requested. In other words, an information field for requesting complete elements included in the element set designated for the second link may be configured as 1-bit information.

For example, the 1-bit information may be configured to have a first value. In other words, by configuring the 1-bit information as a first value (e.g., 1), the multi-link device may indicate that complete elements included in the designated element set are requested.

Therefore, the AP multi-link device may verify that the multi-link device has requested complete elements included in the designated element set, based on the 1-bit information.

According to an embodiment, the request frame may further include an information field for requesting complete elements included in an element set designated for a third link, among the plurality of links.

In step S4420, the AP multi-link device may transmit a response frame, based on the request frame. According to an embodiment, the AP multi-link device may transmit the response frame to the first STA through the first AP, based on the request frame.

According to an embodiment, the response frame may include complete elements included in the element set designated for the second link.

According to an embodiment, the second link may be differentiated from the plurality of links. When the second link is differentiated from the plurality of links, the AP multi-link device may receive the request frame for requesting elements related to a link that is currently not connected to the AP multi-link device. The AP multi-link device may transmit the elements related to the link that is currently not connected to the AP multi-link device through a response frame, based on the request frame.

According to an embodiment, the AP multi-link device may receive a second request frame for requesting the link connected to the first STA to be switched from the first link to the second link, based on the response message. Thereafter, the AP multi-link device may perform a procedure of switching the link that is to be connected to the first STA from the first link to the second link, based on the second request frame.

A second AP of the AP multi-link device may establish a connection with the first STA, based on the procedure for switching the link connected to the first STA from the first link to the second link. For example, the second AP may operate on the second link. Additionally, the first STA may also operate on the second link. In other words, the first AP may establish a connection with the first STA through the second link, based on the above-described procedure.

According to an embodiment, the second link may be included in the plurality of links. When the second link is included in the plurality of links, the AP multi-link device may receive a request frame for requesting elements related to remaining links excluding the first link through the first link, among the plurality of links. The AP multi-link device may transmit elements related to the links excluding the first link, among the links currently connected to the AP multi-link device, through a response frame, based on the request frame.

The above-described technical features of the present specification may be applied to various device and methods. For example, the above-described technical features of the present specification may be performed/supported through FIG. 1 and/or FIG. 19. For example, the above-described technical features of the present specification may be applied to only part of FIG. 1 and/or FIG. 19. For example, the above-described technical features of the present specification may be implemented based on the processing chip(s) (114, 124) of FIG. 1, or implemented based on the processor(s) (111, 121) and the memory(s) (112, 122), or implemented based on the processor (610) and the memory (620) of FIG. 19. For example, a device of the present specification may include a processor, and a memory being operatively connected to the processor, wherein the processor may be configured to transmit a request frame including an information field for requesting complete elements included in an element set designated for a second link to a first access point (AP) of an AP multi-link device, through a first station (STA) operating on a first link, and to receive a response frame from the first AP through the first STA, based on the request frame, wherein the response frame includes complete elements included in the element set designated for the second link.

The technical features of the present specification may be implemented based on a computer readable medium (CRM). For example, the CRM that is proposed in the present specification may encoded as at least one computer program including instructions. When executed by at least one processor, the instructions may perform operations including the steps of transmitting a request frame including an information field for requesting complete elements included in an element set designated for a second link to a first access point (AP) of an AP multi-link device, through a first station (STA) operating on a first link, and receiving a response frame from the first AP through the first STA, based on the request frame, wherein the response frame includes complete elements included in the element set designated for the second link. The instructions that are stored in the CRM of the present specification may be executed by at least one processor. At least one processor being related to the CRM of the present specification may be the processor(s) (111, 121) or processing chip(s) (114, 124) of FIG. 1, or the processor (610) of FIG. 19. Meanwhile, the CRM of the present specification may be the memory(s) (112, 122) of FIG. 1, or the memory (620) of FIG. 19, or a separate external memory/storage medium/disc, and so on.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless local area network (WLAN) system, the method comprising:

transmitting, by a multi-link device (MLD) connected to a plurality of links including a first link and a second link, a request frame including an information field for requesting complete elements included in an element set designated for the second link to a first access point (AP) of an AP MLD, through a first station (STA) included in the MLD, wherein the first STA operates on the first link; and receiving, by the MLD, a response frame from the first AP through the first STA, based on the request frame, wherein the response frame includes complete elements included in the element set designated for the second link, wherein the request frame includes 1-bit information on whether the complete elements or partial elements of a second AP are requested, wherein based on the 1-bit information being set to 1, the complete elements of the second AP are requested, and wherein based on the 1-bit information being set to 0, the partial elements of the second AP are requested.

2. The method of claim 1, wherein the request frame includes identifier information related to the second link.

3. The method of claim 1, wherein the element set designated for the second link includes an element related to a capability of the second link or an element related to a parameter of the second link.

4. The method of claim 1, wherein the second link is differentiated from the plurality of links.

5. The method of claim 4, further comprising:
transmitting a second request frame for requesting switching of a link connected to the first STA from the first link to the second link, based on the response frame;
receiving a second response frame, based on the second request frame; and
performing a procedure of switching the link connected to the first STA from the first link to the second link, based on the second response frame.

6. The method of claim 5, wherein the first STA is connected to a second AP of the AP MLD, based on the procedure of switching the link connected to the first STA from the first link to the second link, and
wherein the second AP operates on the second link.

7. The method of claim 1, wherein the request frame further includes an information field for requesting complete elements included in an element set designated for a third link, among the plurality of links.

8. The method of claim 1, wherein the plurality of links and the second link are included in 2.4 GHz, 5 GHZ, and 6 GHz bands.

9. A multi-link device (MLD) operating on a plurality of links including a first link and a second link of a wireless local area network (WLAN) system, the MLD comprising:
a first station (STA) operating on the first link;
a second STA operating on the second link;
a transceiver transmitting and/or receiving a wireless signal; and
a processor being operatively connected to the transceiver,
wherein the processor is configured to:
transmit a request frame including an information field for requesting complete elements included in an element set designated for a second link to a first access point (AP) of an AP MLD, through the first STA, and
receive a response frame from the first AP through the first STA, based on the request frame, wherein the response frame includes complete elements included in the element set designated for the second link,
wherein the request frame includes 1-bit information on whether the complete elements or partial elements of a second AP are requested,
wherein based on the 1-bit information being set to 1, the complete elements of the second AP are requested, and
wherein based on the 1-bit information being set to 0, the partial elements of the second AP are requested.

10. The multi-link device of claim 9, wherein the request frame includes identifier information related to the second link.

11. The multi-link device of claim 9, wherein the element set designated for the second link includes an element related to a capability of the second link or an element related to a parameter of the second link.

12. The multi-link device of claim 9, wherein the second link is differentiated from the plurality of links.

13. The multi-link device of claim 12, wherein the processor is further configured to:
transmit a second request frame for requesting switching of a link connected to the first STA from the first link to the second link, based on the response frame
receive a second response frame, based on the second request frame, and
perform a procedure of switching the link connected to the first STA from the first link to the second link, based on the second response frame.

14. The multi-link device of claim 13, wherein the first STA is connected to a second AP of the AP MLD, based on the procedure of switching the link connected to the first STA from the first link to the second link, and
wherein the second AP operates on the second link.

15. The multi-link device of claim 9, wherein the request frame further includes an information field for requesting complete elements included in an element set designated for a third link, among the plurality of links.

16. The multi-link device of claim 9, wherein the plurality of links and the second link are included in 2.4 GHz, 5 GHZ, and 6 GHz bands.

* * * * *